(12) United States Patent
Crutchfield, Jr.

(10) Patent No.: US 10,977,701 B2
(45) Date of Patent: Apr. 13, 2021

(54) TECHNIQUES FOR PROVIDING RETAIL CUSTOMERS A SEAMLESS, INDIVIDUALIZED DISCOVERY AND SHOPPING EXPERIENCE BETWEEN ONLINE AND BRICK AND MORTAR RETAIL LOCATIONS

(71) Applicant: Crutchfield Corporation, Charlottesville, VA (US)

(72) Inventor: William G. Crutchfield, Jr., Charlottesville, VA (US)

(73) Assignee: Crutchfield Corporation, Charlottesville, VA (US)

( * ) Notice: Subject to any disclaimer, the term of this patent is extended or adjusted under 35 U.S.C. 154(b) by 949 days.

(21) Appl. No.: 14/580,373

(22) Filed: Dec. 23, 2014

(65) Prior Publication Data
US 2015/0112826 A1    Apr. 23, 2015

Related U.S. Application Data

(63) Continuation-in-part of application No. 13/889,067, filed on May 7, 2013, now abandoned.

(60) Provisional application No. 61/922,920, filed on Dec. 31, 2013, provisional application No. 61/733,346, filed on Dec. 4, 2012.

(51) Int. Cl.
  *G06Q 30/06*    (2012.01)
(52) U.S. Cl.
  CPC ..... *G06Q 30/0601* (2013.01); *G06Q 30/0623* (2013.01); *G06Q 30/0641* (2013.01); *G06Q 30/0643* (2013.01); *G06Q 30/0621* (2013.01); *G06Q 30/0631* (2013.01)

(58) Field of Classification Search
  CPC ........ G06Q 30/06–0645; G06Q 30/08; G06Q 50/01
  See application file for complete search history.

(56) References Cited

U.S. PATENT DOCUMENTS

| 8,983,864 B2 * | 3/2015 | Prindle | G06Q 30/0617 705/26.8 |
| 2003/0132298 A1 * | 7/2003 | Swartz | G07G 3/00 235/472.02 |

(Continued)

OTHER PUBLICATIONS

Patents; Agency Reviews Patent Application Approval Request for "Systems, Methods and Apparatus for Identifying Links among Interactional Digital Data," Marketing Weekly News, Atlanta, Sep. 21, 2013: 311. (Year: 2013).*

(Continued)

*Primary Examiner* — Adam L Levine
(74) *Attorney, Agent, or Firm* — Stephen T. Schreiner

(57) ABSTRACT

The present invention is directed to techniques for providing retail customers a seamless, individualized discovery and shopping experience. With an improved shopper/customer accounting system, along with other technologies such as intelligent fixtures, mobile devices, and product simulations, a shopper's product discovery, purchase, and post-sale experience can be highly integrated and personalized. For example, the shopper's out-of-store (online) and in-store product discovery sessions may be seamlessly linked and analyzed to provide the shopper with customized recommendations and assistance. Other variations and enhancements are disclosed.

11 Claims, 26 Drawing Sheets

(56) References Cited

U.S. PATENT DOCUMENTS

| | | | | |
|---|---|---|---|---|
| 2013/0041837 A1* | 2/2013 | Dempski | ............. | G06Q 10/101 |
| | | | | 705/345 |
| 2013/0110666 A1* | 5/2013 | Aubrey | ............. | G06Q 30/0269 |
| | | | | 705/26.5 |
| 2013/0124261 A1* | 5/2013 | Wilder | ............... | G06Q 30/0201 |
| | | | | 705/7.31 |
| 2013/0317916 A1* | 11/2013 | Gopalakrishnan | ............................ | |
| | | | | G06Q 30/0261 |
| | | | | 705/14.66 |
| 2014/0363059 A1* | 12/2014 | Hurewitz | ........... | G06Q 30/0201 |
| | | | | 382/118 |
| 2015/0379618 A1* | 12/2015 | Neumann | .......... | G06Q 30/0639 |
| | | | | 705/14.55 |

OTHER PUBLICATIONS

Choi, "The Study of Interior Design for Interactive Retail Store 'Space Canyon,'" Department of Design California State University, Long Beach, Bell & Howell Information and Learning Company, Ann Arbor, MI; Dec. 2000; 46pp. (Year: 2000).*
International Search Report (dated Apr. 16, 2015).
Written Opinion (dated Apr. 16, 2015).

* cited by examiner

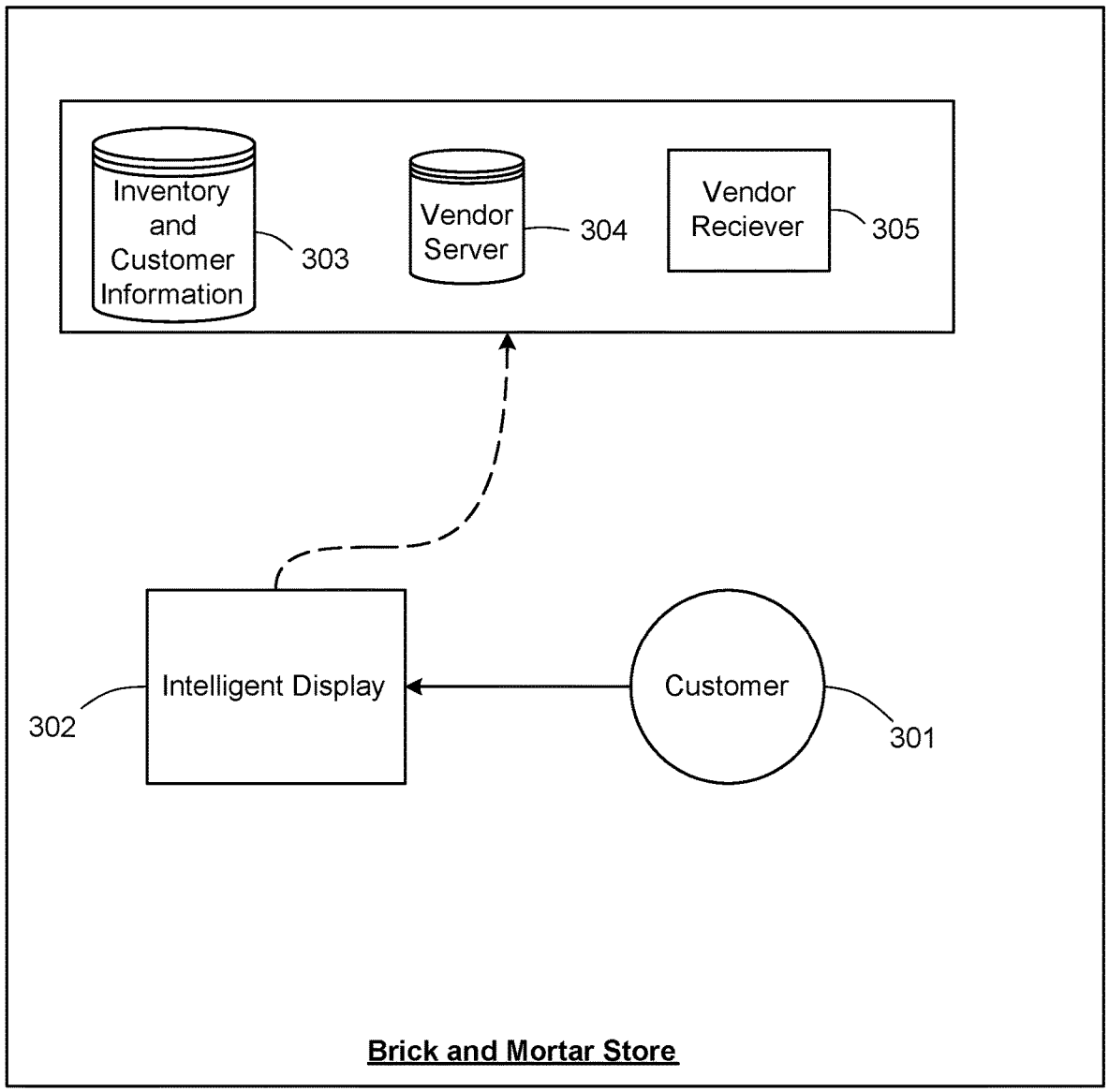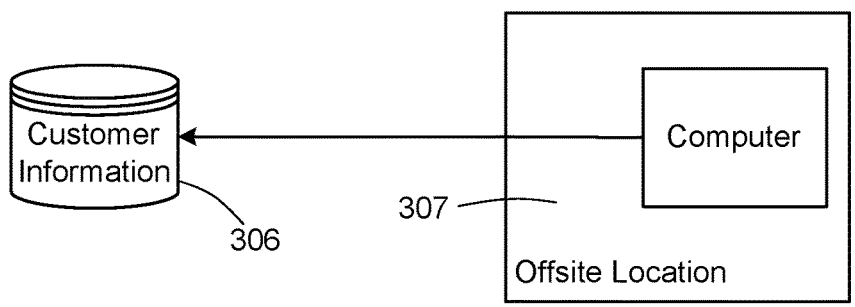
FIG. 3

TECHNIQUES FOR PROVIDING RETAIL CUSTOMERS A SEAMLESS, INDIVIDUALIZED DISCOVERY AND SHOPPING EXPERIENCE BETWEEN ONLINE AND BRICK AND MORTAR RETAIL LOCATIONS

CROSS-REFERENCE TO RELATED APPLICATIONS

This application claims priority to U.S. Provisional Application No. 61/922,620, of the same tile, filed on Dec. 31, 2013. This application is also a continuation-in-part of U.S. Utility patent application Ser. No. 13/889,067, filed on May 7, 2013, which asserted priority to U.S. Provisional Patent Application No. 61/733,346, filed on Dec. 4, 2012, both entitled "System and Method for Customizing Sales Processes with Virtual Simulations and Psychographic Processing." All of these prior applications are incorporated by reference herein in their entireties.

FIELD OF THE INVENTION

The present invention relates generally to sale systems, and more particularly, to techniques for providing retail customers a seamless, individualized discovery and shopping experience.

BACKGROUND OF THE INVENTION

Today, retailers with large inventories and limited resources find it difficult to provide customers with a customized sales experience. The physical constraints of the size of physical (e.g., "brick and mortar") stores typically limit the amount of products retailers can physically shelve and store on site. These physical constraints also typically impact the retailer's ability to effectively display and demonstrate their products to their customers. Other limitations, such as limitations on the number of customers sales representatives retailers can employ on site, typically impact a retailer's ability to answer customer questions, collect information about the customer, and make recommendations for products or services.

Retail stores with large inventories of products typically require a large amount of physical space to shelve, and store their goods. As a result, retail stores with limited amounts of physical space typically do not have the benefit of displaying most of their inventory. These retail stores may resort to shelving or displaying only a fraction of their entire line of goods, which may only appeal to a small subset of the vendor's customer base. This is problematic for vendors because it limits a vendor's ability to customize the sales process to the particular needs and traits of a customer. For example, after a vendor has determined that a particular good would be suited to a customer's needs or traits, the vendor could create a sales experience by displaying or demonstrating that particular product to the customer while in the retail store. However, this creates a problem for vendors who do not have enough physical space to keep that product stored or shelved in inventory; those vendors may not have the advantage of providing a truly customized sales experience to the customer. That is, retail stores with limited physical space may not have the capability of customizing the sales experience to every segment of their customer base. Accordingly, there is a need for retail stores to display and demonstrate the full range of their inventory of goods, thereby enabling retail stores to display and demonstrate particular products in their inventory and to target every customer segment.

Retail stores typically display their goods for customers to visually inspect for themselves. This allows customers to obtain a tangible familiarity with the product. For example, this allows customers to feel a product's texture, and see the product's dimensions, allowing the customer to visualize how the product may look in their home. However, retail stores with limited physical space find it difficult to provide a tangible, interactive experience for the full range of their products in terms of look-and-feel within the home. Although retail stores sometimes provide product catalogs that describe most of their goods, these catalogs do not provide the same tangible experience as being able to physically interact with a product; customers normally will not have the benefit of estimating how the product may look, feel, or integrate in their home. Accordingly, there is a need for retail stores to allow customers to visually inspect most of a vendor's line of goods in an interactive and instructive manner, using a limited amount of physical space.

Some retail stores display images or videos of products from their product catalogs on in-store displays, such as flat-screens or television monitors. Generally, retail stores do not typically provide an intuitive interface that allows customers to interact with in-store displays. Research has shown that customers respond to in-store shopping experiences that offer an intuitive shopping interface while simultaneously providing visually compelling images and videos, and similar content. For example, customers typically find touch or gesture interfaces commonly used for tablets, PCs, smartphones and other mobile devices offer an intuitive interface for browsing and shopping for products. However, touch screen interfaces for these mobile devices are not suitable for the in-store shopping experiences because of their smaller size and limited display capabilities. Thus, retailers find it difficult to adapt the intuitive touch or gesture interfaces used for mobile devices to large in-store displays.

Generally, retail stores that integrate sensors and other input devices into retail displays typically design and install retail fixtures that are unique to each retail layout space. For example, interactive retail fixtures built for fashion and department stores typically require designing a fixture and installing sensors that are unique to the physical layout of each store. Interactive retail fixtures may use projected light and motion sensors for user to interact with display products positioned on retail tabletop counters. While these displays can sense when and where a product is touched and examined, these sensors are usually installed based on the physical layout of the store, tabletop and products. Thus, retailers typically design an interactive fixture for every store, without reusing the designs for fixtures already created. Accordingly, retailers find it difficult to create retail fixtures that integrate sensors and retail devices in a reusable and modular manner.

Retail stores typically employ sales representatives to provide customers in-store sales assistance. These representatives engage the customer in the sales process, ask customers questions about their needs or preferences, and answer any questions the customer may have. This benefits the customer by providing individualized, targeted information, and also benefits the vendor by allowing the vendor to qualify the customer according to the customer's personal, demographic, or psychographic information. For example, by interacting with the customer, the store sales representative may determine the customer's age, marital status, personal preferences, and opinions on certain products. This information may allow the sales representative to make a recommendation for a particular product to the customer, based on these customer features. However, retail stores are typically limited in the number of skilled, career-oriented sales representatives they can employ to assist and engage with customers. Sometimes, high turnover or transient career opportunities at retail stores causes sales representatives to have little training and limited experience. Thus, retail stores usually only provide truly individualized assistance to a fraction of potential buyers who enter the store. Similarly, retail stores usually obtain specific information from and make customized recommendations to only a fraction of the vendor's customers. Accordingly, there is a need to provide individualized assistance and make customized recommendations for products to any number of customers that enter a store without relying entirely on the use of in-store sales representatives.

Retail stores that have enough physical space to demonstrate some of their inventory typically demonstrate their products in a generic way. That is, the retail stores typically demonstrate their products, such as televisions or speakers, in a standard showroom, playing non-specific music or video content. However, these demonstration spaces typically do not reflect the environment the customer intends on using the products accurately. For example, the dimensions or layout of the room where a customer actually intends on using a television or set of speakers may be drastically different from the retail store's showroom, significantly changing the way the television or speakers may look or sound. Thus, the customers do not typically appreciate how a particular product, such as a television or speaker, may look or feel in their particular intended environment while at the retail store. Accordingly, there is a need to provide customers with a way of accurately simulating how a vendor's products would perform and integrate into the customer's intended environment.

As noted above, in-stores sales representatives often perform the role of providing recommendations or suggestions to customers for products that are tailored to the customer's particular demographic or psychographic traits. That is, sales representatives typically base their recommendations and suggestions on information about the customer that the sales representative can directly observe. Normally, sales representatives do not have access to any other information about the customer other than what they can directly observe, limiting their ability to provide customized recommendations for products. For example, a vendor may have information about the make and model of a customer's automobile; with this information, a sales representative would be enabled to recommend audio equipment that is compatible with the customer's particular automobile. While this information would improve the sales process, vendors generally find it difficult to provide this non-observable, previously stored customer information to the sales representatives during the in-store sales process. Accordingly, there is a need to better integrate stored information about a customer into the in-store sales process in a manner that allows such targeted marketing in smaller stores with fewer in-store sales representatives.

Often, sales representatives detect physical and social cues from a customer's body language to make a recommendation for a product. Analogous information can be collected using optical or motion sensor technology. But as of yet, such customer information has not been truly integrated into the sales process so as to improve the relevance and appeal of the vendor's recommendations to its customers in a manner that accommodates reductions in floor space and the number of in-store representatives. Accordingly, there is a need to better integrate in-store monitored information about a customer into the sales process.

Moreover, to the extent retail stores use information about a customer, retail stores typically do not incorporate this information into the sales process in real-time. For example, while some retail stores may monitor foot traffic in a store, stores frequently only use this information in time-late off-line analysis to change the physical placement of products in a store. Retail stores typically do not use current or real-time foot traffic information to make recommendations for a particular product or solution while the customer is still shopping in the store. Accordingly, there is a need to better integrate monitored information about a customer into the sales process in real-time.

To mitigate the problems posed by the physical limitations of physical stores described above, retail stores often sell their inventory through an internet website. While online retail stores may avoid some of these problems, online retail stores typically do not allow vendors to monitor the customers or provide in-person assistance the same way they could as with a physical store. For example, the information presented to a customer on an online retail website may be overwhelming or difficult for the customer to digest without a personal sales representative. Moreover, vendors typically cannot monitor a customer's body language or social cues while the customer is shopping online, limiting the amount of information the vendor has to make a recommendation for a particular product to the customer. Accordingly, there is a need for a customized retail experience that bridges the gap between online retail stores and physical stores.

For example, if a customer likes a product they viewed in a store, retail stores typically do not provide a way to track this information so that the consumer can later decide to learn more about the product or purchase the product after leaving the store. Likewise, retail stores typically do not integrate customer information collected from their online website, such as the customer's online shopping history, into the in-store sales process. For example, retail stores do not typically access a customer's online shopping history to recommend a product when the customer makes a visit to the physical store. Accordingly, there is a deficiency in terms of the lack of integration or synthesis of information from online retail stores and physical stores to improve the sales process.

Typically, online retail websites require a customer to register an account with the vendor, or to allow the vendor to store information about the customer locally in the customer's browser cache. Because vendors usually require a customer to create an account, vendors typically cannot make recommendations to new customers visiting their online website for their first time, or who have not yet registered an account with the vendor. Similarly, because vendors usually require a customer to allow the website to store information locally to a browser's cache, vendors typically cannot make recommendations to new customers with strict privacy control settings that forbid websites to store information to their cache. Usually, online retail websites will gather information about new customers by directly prompting the customers on their website. However, online retail websites generally do not have a way to gather information that may be used for determining a customer's demographic or psychographic information without directly asking the customer for this information.

Similarly, vendors have difficulty in deriving helpful psychographic and demographic characteristics in other alternative channels of commerce. For example, vendors may allow customers to shop for their products via kiosks, telephone call centers, interactive television services, mobile software applications, social networks, and the like, in addition to their physical stores. However, vendors are typically limited in the manner they may determine a customer's psychographic or demographic characteristics shopping via these alternative channels of commerce. Unlike the physical store context, these channels of commerce typically do not allow vendors to visually determine these characteristics with sales representatives, or detect these characteristics through the use of sensors.

In physical retail stores, i.e., physical stores, vendors often do not guide customers through the sale process from a single location. For example, the location where a customer demonstrates a product is typically different from the location where a customer may ask questions to a store sales representative, which is also typically different from the location where a customer provides their payment information to finalize a sale, or request post-sale services such as product installation or delivery. Performing the different steps of the sales process at different locations and by different store personnel can create various costs and inefficiencies as the person of ordinary skill will readily appreciate. For the customer, it can provide a fragmented sales experience that undermines customer satisfaction and repeat sales.

The inability to guide a customer through the stages of the sales process from a single location is further problematic because it places a limit on the vendor's ability to operate in a confined space. That is, physical retail stores usually require at least enough space to allow vendors to engage a customer, store and demonstrate various inventory, consummate a sale, and setup installation and delivery. Thus, vendors often cannot provide this entire range of services in retail locations that require a small amount of space, such as an information kiosk at an air airport. This, in turn, typically limits the range of locations vendors can create a physical retail presence. Accordingly, there is a need for a system that would allow a retailer to perform a full range of services from a reduced amount of physical space and/or at various locations within the store.

Furthermore, the purchase of complex products involves much more intellectual interaction between shoppers and retailers than is commonly appreciated. This complex interaction has been greatly magnified by the Internet revolution. Today's shoppers often begin their discovery process by researching products on the Internet. They may continue this discovery process by visiting retail stores. And, they may conclude it with additional discovery over the Internet. This discovery may include researching the benefits of the type of products, learning about individual products, studying the reputation of individual manufacturers and retailers (e.g., Consumer Reports, Biz-Rate, etc.), reviewing shopper comments, making the technical and aesthetic judgments regarding their individual product application (e.g., installation, room décor issues, etc.), comparing prices, and so on.

As the discovery process becomes more refined, it leads to purchase decisions that are highly individualized. This is very different than when products were bought more on generic factors like price and availability. Instead of doing a simple Internet search for a product, today's sophisticated shoppers may conduct their initial discovery on the Internet, go to store for more discovery, return to the Internet for their final phase of discovery, and then make their actual purchase either online or in a store. Invariably, this complicated process will lead to purchases that are much better suited for their individual taste, application, and budget.

Unfortunately, despite the great advances in computing and Internet technologies, today's retail shopping process still resembles what it was like in the $20^{th}$ century and does not provide for a seamless, individualized discovery and shopping experience.

For example, today's retail stores have a number of structural problems that frustrate shoppers. Such problems include but are not limited to: inability to seamlessly integrate discovery from home with additional in-store discovery and shopping; inability to seamlessly integrate in-store discovery with additional in-home discovery and shopping; poorly trained salespeople; a vast selection of merchandise spread over a large area; the need to travel to store to check-out and to determine the availability of post-sale services (in addition to the need to travel to store to shop); products grouped by type (e.g., TV receivers, men's sports coats, etc.) and not grouped by solution (e.g., home theaters, men's outfits, etc.); inability to perform cross-departmental product demonstrations (e.g., take a picture with a particular camera and display it on a particular TV in the store); merchandise being displayed for a generic shopper and not for the individual shopper; merchandise being displayed and demonstrated in the store environment as opposed to the users' actual environments; inability to see products in detail (e.g., rear panel of a TV set or AV receiver, cut-away of competitive oil filters, etc.); inability to obtain customized product content, including displayed comparisons of selected products; and inability to by-pass a sales advisor when greater technical expertise is immediately required (e.g., Apple Store's Genius Bar requires an appointment).

Today's retail stores also have several structural problems that are very problematic for the retailers themselves. Such problems include but are not limited to: difficulty retaining experienced and knowledgeable salespeople, resulting in a poorly trained sales force; the need to carry more merchandise as product manufacturers, categories and assortments grow; the need to reduce the size of stores; difficulty providing adequate store staffing during peak seasonal periods; inability to offer a customized sales experience that targets the shoppers' individual demographic and psychographic profile; inability to understand shoppers' in-home discovery, often with little to no knowledge of shoppers' past shopping and buying history; inability to provide shoppers with individualized information which they can reference in making additional in-home discovery and/or deferred shopping decisions, including detailed technical comparisons of products that are of particular interest to an individual shopper; difficulty of sales advisors to access a company's vast database of product and educational information without leaving the customer; inability to demonstrate products in the shoppers' exact user environment (e.g., how a particular speaker will sound in their living room or car); inability to offer shoppers with a virtual shopping cart that fully integrates their in-home and in-store discovery shopping processes; inability to schedule post-sales services at the point of sale; inability for sales advisors to control the discovery and shopping environments from their portable smart devices; inability to post real-time price changes and customer reviews; and inability to obtain real-time analytics regarding their shoppers' discovery and shopping behavior.

Other problems and drawbacks also exist.

SUMMARY OF THE INVENTION

Some embodiments of the present invention are directed to systems and methods for adapting intuitive user interfaces to in-store displays for providing intuitive and visually compelling in-store shopping experience. The system having features of the present invention comprises intelligent displays for interacting with customers. The system may include touch screen devices, and gesture and voice recognition sensors for receiving input from customers. An intelligent display processor may be coupled to the intelligent displays, touch screen devices, and gesture and voice recognition sensors. The intelligent display processor may be programmed to control the monitor display based on input received from the touch screen devices and gesture and voice recognition sensors.

Other embodiments of the present invention are directed to apparatus for providing retail fixtures that integrate sensors and retail devices in a reusable and modular manner. An apparatus having features of the present invention may comprises an intelligent display, a touch panel, an intelligent display stand for supporting an intelligent display, a touch panel stand, a product stand, an intelligent display base for supporting the intelligent display stand, a touch panel base for supporting the touch panel stand, and a product base for supporting the product stand. The intelligent display has a rectangular-shaped stand vertically disposed and extending upwardly from a floor, opposing broadsides for mounting intelligent displays, and opposing narrow lateral sides. The touch panel stand for supporting a touch panel has a first beam horizontally disposed, extending laterally from the intelligent display stand, a second beam for supporting the first beam vertically disposed, extending upwardly from a floor, and secured to a base for stabilizing and securing the second beam to the floor, and a mount attached to the end of the first beam. The touch panel stand may be affixed to one or more touch panel stands one or more product stands. The product stand has a first beam horizontally disposed, extending laterally from the intelligent display stand, a second beam for supporting the first beam, vertically disposed, extending upwardly from a floor, and secured to a base for stabilizing and securing the second beam to the floor, a third beam transversely affixed across the end of the first beam, a fourth and fifth beam for supporting the third beam, vertically disposed, extending upwardly from a floor, secured to a base for stabilizing and securing the second beam to the floor, a first mount attached to the end of the first beam, and second and third mounts attached to the opposing ends of the third beam.

Another embodiment of the present invention comprises a system for customizing a sales experience provided to a customer. According to some embodiments of the invention, this may also be referred to as technology-enabled personalized shopping (TEPS). According to one embodiment of the invention, the invention comprises a mobile application running on a mobile device and a simulation apparatus that simulates the physical characteristics of a real-world environment. The customer interfaces with the mobile device to provide information about himself or herself, control the simulation apparatus, and simulate products according to the characteristics of a real-world environment. The mobile device tailors the sales process to the customer, making recommendations based on customer information.

Another embodiment of the present invention comprises a method for customizing a vendor's sales experience for a customer, comprising the steps of identifying a customer, collecting information about the customer, recommending a product to the customer based on this information, engaging a simulation apparatus, and simulating a product with the simulation apparatus.

According to one aspect of the invention, the customer may use their mobile device to identify himself or herself to the simulation apparatus.

In another aspect of the invention, the customer may use a radio frequency enabled device, for communicating in formats such as RFID, Bluetooth, or Wi-Fi, to identify himself or herself to the simulation apparatus.

In another aspect of the invention, the sales process includes the introduction, qualification, demonstration, requalification, validation, recommendation, purchase, delivery, and/or installation phase of a sale. In yet another aspect of the invention, the recommendation phase recommends at least one product based on how the customer responds during a demonstration phase using simulation. In another aspect of the invention, the recommendation may be based on previously stored customer information. In one embodiment of the invention, the previously stored information may be personal information the customer provided while registering for an account with the vendor. In yet another embodiment of the invention, this information may be collected from a customer's browser or similar application for accessing web sites or other information over networks.

In another aspect of the invention, the simulation apparatus simulates a real-world environment that is defined by the customer. For example, the simulated environment may simulate the physical characteristics and dimensions of a customer's living room, garage or bedroom.

In another aspect of the invention, the vendor may monitor the customer's location throughout the store by monitoring the location of the customer's mobile device, or by monitoring the location of a sales representative's mobile device. This information may be used by the vendor to analyze the customer's foot traffic patterns and tailor recommendations for products or solutions to the customer. In another aspect of the invention, the system may monitor a customer with optical and motion sensors. This information may also be used to customize a recommendation for a product to a customer.

In one aspect of the invention, the mobile device interactively displays images of a product. Customers may zoom, pan, or rotate a virtual representation of a product using the mobile device. In yet another aspect of the invention, the mobile device displays information about the product. Customers may view technical details, product descriptions, and product reviews of the product by interfacing with the mobile device.

In another aspect of the invention, the mobile device may be used to store products viewed by the customer. The customer may then retrieve these products at a later time, to review or purchase.

It is an object of the invention to provide a system and method for retail stores to display and demonstrate their inventory of goods using a minimal amount of physical space.

It is another object of the invention to provide a system and method for retail stores to visually inspect a vendor's full line of inventory in an interactive and instructive manner, using a limited amount of physical space.

It is another object of the invention to provide a system and method for retail stores to provide individualized assistance and make customized recommendations for products to customers.

It is another object of the invention to provide a system and method for retail stores to provide customers with a way of simulating how a vendor's products would perform and integrate into their intended environment.

It is another object of the invention to provide a system and method for retail stores to integrate stored information about a customer into the in-store sales process.

It is another object of the invention to provide a system and method for retail stores to integrate in-store monitored information about a customer into the sales process.

It is another object of the invention to provide a system and method for retail stores to integrate stored information and in-store monitored information about a customer into the sales process in real-time.

It is another object of the invention to enable online retail stores and physical stores to integrate and exchange customer information.

It is another object of the invention to provide a system and method for retail stores to guide customers through the various stages of the sale process from a single location.

It is another object of the invention to provide a system and method for retail stores to perform a full range of services from a limited amount of physical space.

Further embodiments of the present invention provides for a $21^{st}$ century, seamless and individualized discovery and shopping experience. More particularly, these embodiments of the present invention will greatly improve retail shopping experience for shoppers and greatly improve the efficiency and effectiveness of selling process for a retailer by providing techniques that provide one or more of the following technical effects, benefits, and/or advantages: (a) allow sales advisors to access a company's vast database of product and educational information without leaving the customer and to perform all the store's sales and service function at one location; (b) greatly reduce the training requirements of sales advisors since an Advisor Tablet apparatus becomes the complete information resource for both the sales advisor and shopper, such that, with little training, a sales advisor can perform with the same level of professionalism and expertise that a highly experienced sales advisor performs in a conventional retail environment; (c) allow retailers to provide better sales coverage during peak times by allowing video conferencing with additional sales people at a central location; (d) allow retailers to provide immediate technical support which may be beyond the skills of the store sales advisors by allowing video conferencing with specialists at a central location; (e) allow retailers to sell vastly more products in significantly less space; (f) allow shoppers and retailers to seamlessly integrate individualized online discovery and purchasing processes with in-store ones; (g) serve as a hub for disseminating individualized shopping information and simulations, for launching distributive virtual shopping (virtual shopping cart), and for the collection of important demographic and psychographic information; (h) allow sales advisors to control the discovery and shopping environments from their portable smart devices; (i) post real-time price changes and customer reviews; (j) provide real-time analytics regarding their shoppers' discovery and shopping behavior.

Properly implemented, the present invention may provide both retailers and consumers with technology that brings retail into the $21^{st}$ century.

BRIEF DESCRIPTION OF THE DRAWINGS

The objectives and advantages of the present invention will be apparent to those of skill in the art from the following detailed description in conjunction with the appended drawings in which like reference characters are used to indicate like elements, and in which:

FIG. 3 is an exemplary system for customizing a vendor's sales experience for a customer without a mobile device and simulation apparatus according to yet another embodiment of the invention.

FIG. 6 is an illustration of a user interface for interacting with an intelligent display according to another embodiment of the invention.

FIG. 10 is an illustration of a user interface for interacting with an intelligent display according to another embodiment of the invention.

DETAILED DESCRIPTION OF THE INVENTION

As a general overview, the system and method customizes and preferably, substantially facilitates, each step in the sales process. According to some embodiments of the invention, this may also be referred to as technology-enabled personalized shopping (TEPS). The method starts at step 101 where a customer enters a vending location. As described in more detail below, the vendor begins the sale process by identifying the customer. If the customer has registered an account with the vendor, the vendor may then retrieve information about the customer stored in the account. This information may include, for example, personal information such as the customer's address, or phone number, psychographic information, such as the customer's interests, activities, subject matter expertise, and opinions, or demographic information such as the customer's age, financial status (e.g., affluence), or gender. If the customer does not have an account with the vendor, or there is no such information stored in the customer's account, the vendor may collect this information in real-time at the vendor's store. For example, a store sales representative may collect this information by engaging and interacting with the customer. As described in more detail below, the vendor may facilitate this interaction with the customer by providing a software application that can be executed on the customer's mobile device. As described in more detail below, after a customer downloads the vendor's software application to their mobile device, the software application engages the customer in a similar manner as the store sales representative, and collects personal, demographic, or psychographic information about the customer through an interactive mobile interface.

It should be understood that identifying the customer 102 may simply be detecting or acknowledging the customer without having information that identifies the customer as a particular individual (e.g., name, etc.).

The vendor may further collect this information through the use of sensors located throughout the store that collect in-store data reflecting the customer's activity. For example, these sensors may monitor a customer's body language, or foot traffic patterns throughout the store. As described in more detail below, the vendor may use this information to engage the customer in a customized sales process. The vendor recommends products or solutions to the customer based on personal, demographic, and/or psychographic information the vendor has collected. For example, if the vendor has collected information about the customer's age, gender, residence, or personal preferences, the vendor may recommend a package of audio equipment that is tailored to these customer traits. The vendor may use previously-stored customer data (e.g., from an existing account with the vendor or prior visits to the vendor's web site) in conjunction with in-store customer data collected while the customer is shopping.

Figure 1:
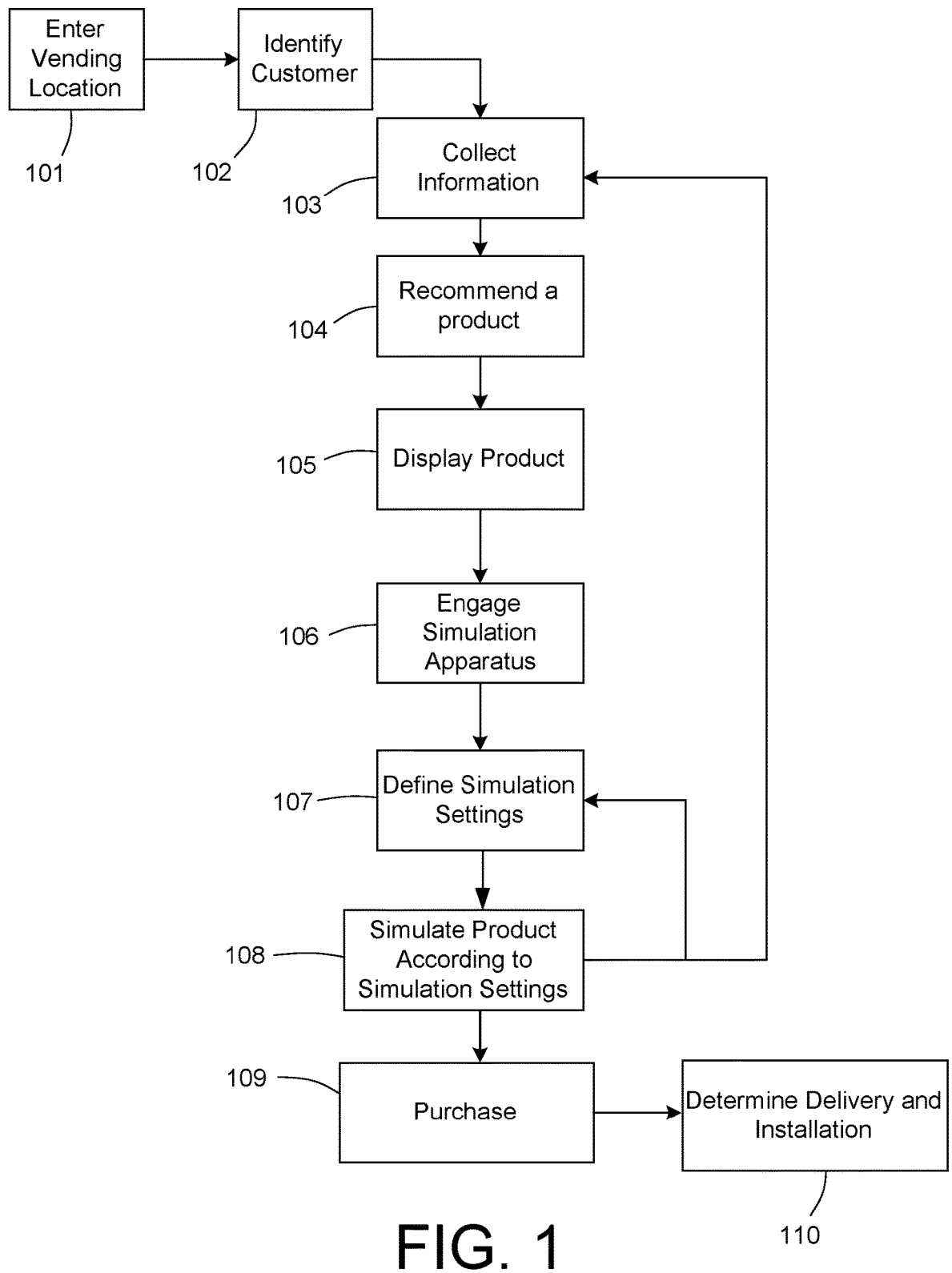
FIG. 1 is a flow diagram of a method for customizing a vendor's sales experience delivered to a customer according to one embodiment of the invention.

As steps 104-106 of FIG. 1 show, the vendor may then demonstrate the recommended products or solutions to the customer using the software application running on the customer's mobile device and/or a store simulation apparatus. As described in more detail below, the software application provides an interface for the customer to view and interact with images of the vendor's products. The software application also provides an interface for the customer to view detailed information about of the vendor's products. After viewing information about the products, the customer may interact with the store simulation apparatus to simulate how the recommended products or solutions would look, feel, and/or sound in a particular environment. For example, the simulation apparatus may simulate how the recommended audio equipment would sound in a vehicle. In one aspect of the invention, the simulation apparatus may be configured to simulate an environment defined or selected by the customer. For example, the simulation apparatus may be configured to simulate the acoustic characteristics of the specific make and model of the customer's car. The vendor may then simulate how recommended audio equipment would sound in the customer's car.

For example, the vendor may simulate the performance of audio speakers using an audio simulation as described and/or claimed in U.S. Pat. Nos. 7,069,169 and 7,899,656, each entitled "Virtual Speaker Demonstration System and Virtual Noise Simulation" and assigned to Crutchfield Corp. The vendor might simulate the performance of display units using a display simulation as described and/or claimed in U.S. Pat. No. 7,487,118, entitled "System and Method of Image Display Simulation", assigned to Crutchfield Corp. The vendor might simulate the performance of image capture devices (cameras, camcorders, etc.) using an image capture simulation as described and/or claimed in U.S. Pat. No. 7,676,403, also assigned to Crutchfield Corp. Each of the aforementioned patents is incorporated herein by reference in its entirety.

After demonstrating the recommended products and solutions, the vendor may then close the sale directly from the mobile device or simulation apparatus. As described in more detail below, the mobile device can function as a virtual shopping bag, storing products and solutions that the customer decides to purchase. After deciding on a product or solution, the customer may then provide purchase information, such as the customer's credit card information, to the mobile device or simulation apparatus and complete the sale. The mobile device and simulation apparatus may further allow the customer to configure post-sale services, such as product delivery and installation.

The mobile device can take various forms. In one approach, the mobile device may be a personal device that the customer owns, such as a personal smartphone or tablet, and brings into the physical store. In another approach, the physical store may provide customers with a mobile device. In this way, vendors may customize the sales process to more customers, including those who do not own mobile devices may. In another approach, the system can support the delivery of customized sales experiences using both customer-owned mobile devices and store-provided mobile devices. As described in more detail below, mobile devices may include mobile personal computers, such as laptops, notebooks, netbooks, tablets, PDAs (personal digital assistants), smart phones (e.g., the iPhone, Samsung Galaxy, Amazon Kindle and Kindle Fire, etc.), and other forms of portable computer devices.

The method and system for providing a customized sales process, as shown in FIGS. 1-16 will now be explained in more detail.

FIG. 1 is a flow diagram of a method for providing a customized sales experience according to an embodiment of the invention. The method starts at step 101 where a customer enters a vending location. When a customer enters the vending location, the vendor may identify the customer, as depicted in step 102. The vendor may then begin the qualification stages of the sales process by collecting information about the customer, as depicted in step 103. Using the customer information collected in step 103, the vendor may then recommend a product(s) or solution(s) to the customer based on the information the vendor has collected, as shown in step 104. The method then provides the customer with information about the recommended product(s) or solution(s), as depicted in step 105. The method also enables the customer to simulate the performance of the product(s) or solution(s) by engaging a simulation apparatus 106, defining simulation settings 107, and simulating the product(s) or solution(s) according to the simulation settings. The method then enables the customer to close the sale by purchasing the recommended product(s) or solution(s) 109, and set post-sale terms, such as the delivery and installation of the recommended product(s) or solution(s) 110.

In one embodiment of the invention, the vending location of step 101 is a physical retail store, having physical space for storing, stocking, demonstrating, and/or displaying products offered by a vendor. The physical retail store may have enough physical space to store, stock, demonstrate, or display its catalogue of products. Alternatively, the physical size of the retail store may only have enough physical space to store, stock, demonstrate, or display a fraction of the store's line of products.

In another embodiment of the invention, the vending location is an intelligent display system, having no physical space to store, stock, demonstrate, or display actual (i.e., tangible) products from inventory. As explained in more detail below, a vendor may simulate and display information about the vendor's entire line of products with a software application running on a mobile device and a simulation apparatus. Thus, a vendor can guide a customer through the entire sales process without the need for any physical space for storing actual inventory.

Referring now to step 102 in FIG. 1, after a customer enters the vending location, the vendor may identify the customer. In one embodiment of the invention the vendor identifies the customer using previously stored customer information. For example, the customer may have provided their personal information, such as their name, address, phone number, e-mail, username and the like, when registering for an account with the vendor. Customers may identify themselves by providing this information to a mobile device, sales representative, simulation apparatus, or intelligent display system. In another embodiment, the customer may have created a unique customer ID or user name when registering for an account with the vendor's website. In another embodiment, the customer may provide a code or information from a cookie established during a customer interaction with the vendor's website. In one embodiment, the code may be a Connect ID number as used by Crutchfield Corp. on the website at www.crutchfield.com. Similarly, customers may identify themselves by providing this information to a mobile device, sales representative, simulation apparatus, or intelligent display system. In yet another embodiment of the invention, the customer may use loyalty program identifiers, such as loyalty club cards, magnetic stripe cards, or smart cards and the like. Loyalty card readers at the vendor location identify customers by reading the customer identification information stored on the loyalty card. The information provided by the customer can be provided verbally or by appropriate device, such as a loyalty card or rewards card, credit card/debit card/other payment card, or mobile device such as by reading the identification information from a customer's smart phone or tablet.

In other embodiments, vendors may identify customers with wireless communication devices such as RFID or near-field communication ("NFC") compatible devices. These devices may be active or passive devices that digitally communicate and exchange data between devices in close proximity or from afar. These devices may store customer identification information, and identify customers by digitally communicating the stored information to NFC enabled receivers at the store. For example, an NFC device may be a Bluetooth or Wi-Fi compatible device that can communicate customer data over short distances to the vendor using short-wavelength radio transmissions. An RFID device may be a smartcard or fob that can communicate customer identification information stored on the device to the vendor using radio transmissions. RFID or NFC compatible receivers at the vendor location receive the customer identification information transmitted by the customers' NFC or RFID enabled devices. RFID and NFC enabled devices may include smart phones and/or tablets having those capabilities.

In one embodiment of the invention, the customer uses a mobile device to identify himself or herself to the vendor. Mobile devices include personal computers, laptops, notebooks, netbooks, tablets, PDAs (personal digital assistants), smart phones (e.g., the iPhone, Samsung Galaxy, Amazon Kindle and Kindle Fire, etc.), and other forms of portable computer devices. Mobile devices that can support wireless communications such as NFC or RFID can communicate the customer identification to the vendor using any method described above. In another embodiment, the mobile device can use its cellular capability to connect to a network such as the internet and communicate customer identification information to the vendor over the network. For example, the mobile device may send an HTTP request to a vendor server and identify the customer as having entered the store.

The mobile device may be programmed with a software application that enables the mobile device to communicate to the vendor. In one embodiment, the software application may be a mobile app developed by the vendor, and distributed to customers through an app store such as Apple iTunes, or Google Play. In other embodiments of the invention, the software application may be a third-party application, such as a mobile browser, connected to a web app hosted by the vendor. For example, the software application may be a mobile browser such as the Safari Mobile Browser, connected to Crutchfield's mobile-friendly online website. In other embodiments, the software application may also be specialized native software designed for use on mobile devices, or intelligent display systems operated by sales representatives and vendors. In these embodiments, the software applications may be installed and maintained privately, without being distributed through a public third party app distributor, such as Apple iTunes, or Google Play.

The mobile device may use a variety of different sources of information to identify the customer. For example, the information the mobile device communicates to the vendor may be personal identification information, such as their name, address, phone number, e-mail, username and the like, or a unique customer ID stored in memory on the phone. This information may be stored in non-volatile or volatile memory. For example, this information may be a file stored in non-volatile memory on the mobile device, or it may be information stored in volatile memory such as a mobile Web browser's cache. In one aspect of the invention, a software application running on the mobile device can communicate this information to the vendor with its cellular or Wi-Fi capability. For example, upon entering the store, the customer can use the software application on their mobile device to send a message to a server or receiver at the store, that checks the customer into the store. The software application then communicates the customer's identity to the vendor using any of the methods described above, such as Bluetooth, Wi-Fi or the mobile device's cellular connection.

In other embodiments of the invention, the vendor may identify the customer without using personally-identifying information. For example, the vendor may identify the customer simply based on the customer's entrance into the store. The vendor may identify a customer entering the store using sensors located at the store, or using software on the customer's mobile device. For example, motion detection sensors may be installed near the entrance of the store that enable a vendor to identify a customer when a customer has entered the store. A customer's mobile device may similarly be used to identify a customer without communicating personally-identifiable customer information. For example, the vendor may provide mobile device software that merely communicates to the vendor when the mobile device is located at a vendor location.

In another aspect of the invention, the software application can communicate this information to the vendor without any active customer involvement. That is, upon entering the store, the vendor or the mobile device may automatically detect the customer's identification information on the mobile device. For example, the customer's mobile device may be programmed to use its geo-location capabilities, such as GPS or cell tower triangulation, to detect when a customer has entered a store. The mobile device may then automatically communicate the customer's identification information to a receiver or server at the vendor using any of the methods described above, such as Bluetooth, Wi-Fi or the mobile device's cellular connection. Thus, a sales representative may greet the customer by name as soon as the customer enters the store, without the customer ever introducing himself or herself.

In one embodiment of the invention, the customer may be identified by their personal information, such as name, address, or telephone number. Upon entering a store, a sales representative may ask for this information from the customer, and enter this information into their mobile device (e.g., Advisor Tablet) or a store computer to retrieve the customer's account information.

Referring now to step 103, after the vendor has identified the customer, the vendor begins the qualification stage of the sales process by collecting information about the customer. The qualification process is a recognition process in which the vendor determines information about the customer's needs, preferences, and traits. The qualification process may be implemented by retrieving a customer's personal, demographic, or psychographic information stored in a vendor's databases 205 or 206. This information may be information that the customer has previously provided when registering an account with the vendor. For example, when registering for an account with the vendor, the customer may provide information that identifies personal features about the customer, such as their name, address, phone number and the like. Personal information may also include information about the customer's car, home, or any intended place of use for the products. For example, Crutchfield Corp. may collect data about the cars a person drives when registering at www.crutchfield.com. The vendor may store information about the make and model of the customer's car, which may later be used to recommend products that are compatible with the customer's car make and model type. This information may also include demographic information about the customer, such as their gender, race, age, disabilities, mobility, home ownership, financial status (e.g., affluence), employment status, and the like. This information may further include psychographic information about the customer's personality, values, subject matter expertise, attitudes, interests, lifestyles, and the like. In another aspect of the invention, this information may also be information from previous transactions with the customer that the vendor has stored, such as the customer's purchase history, browsing history, and history associated with one or more Connect IDs as previously described. As explained in more detail below, such information is used to make customized recommendations for products or solutions to the customer.

If there is no personal, demographic, or psychographic information about the customer stored in the vendor's database, such as when the customer does not have an account with the vendor, the vendor may collect information in real-time at the vendor's store. The vendor may collect this information from the store sales representatives or from sensors installed throughout the store. In one aspect of the invention, a store sales representative may collect this information from general observations about the customer and by engaging and interacting with the customer. For example, the representative can determine a customer's demographic information such as age or gender visually, while determining a customer's psychographic information, such as preferences or tastes, after interacting with the customer. That information can be entered into the Advisor's Tablet. In another aspect of the invention, sensors may be installed throughout the store to monitor the customer and electronically determine information about a customer using a computer. As described in more detail below, these sensors may comprise part of a sensing system that may include motion detection or optical sensors.

According to some embodiments of the invention, sensors may include facial recognition programs enabling vendors to determine demographic information about the customer. As described in more detail below, these sensors may record and analyze video and audio information of customers to determine demographic customer information such as age range, gender, and race.

According to one embodiment, programs on the vendor's computers may similarly analyze information received from sensors located throughout a stored to determine or derive or project demographic or psychographic information about the customer. Sensors may be used to determine demographic customer information such as age range, gender, race, number of people and time spent of the customers. Additionally, sensors may also determine what products or solutions the customer may be interested in based on the information, such as the customer's foot traffic patterns. This information may be stored by the vendor, or communicated directly to the software application running on the customer's mobile device to make a customized recommendation or a product or solution to the customer.

The vendor may facilitate the interaction between the sales representative and the customer by providing a software application that can be executed on a customer's mobile device. As described above, customer may download the software application from the vendor's website or from a centralized software provider, such as Apple iTunes or Google Play. In accordance with embodiments of the invention, the application comprises one or more sequences of processor executable instructions or program modules. These instructions may be stored in a volatile or non-volatile memory in the mobile device. The mobile devices include at least one processor with the capability to execute the software applications, computer programs, or executable code downloaded from the vendor's website or from the centralized software provider. The processor executable instructions stored in volatile or non-volatile memory are executed by the processor on the mobile device to perform the functions and specific operations described herein. In other embodiments, hard-wired circuitry may be used in place of or in combination with software instructions to implement the methods described herein.

After a customer has downloaded the software application to the customer's mobile device, the software application engages the customer in a similar manner as the store sales representative, and collects personal, demographic, and/or psychographic information about the customer through an interactive mobile interface. For example, the software application may ask the customer questions about the customer's musical interests, preferences in music, or listening habits, such as where in the customer's house the customer prefers to listen to music. The customer may provide his or her musical interests by entering the name of an artist or song into the mobile device interface. In one aspect of the invention, the customer may describe how he/she prefers to listen to music by interacting with a blueprint of the customer's home on the mobile device. For example, the software application may allow the customer to describe the architectural layout of the customer's home, such as the location and dimensions of their bedrooms, living rooms, and entertainment areas. Using this blueprint, the customer may then visually specify where and how the customer would like to listen to music. For example, the customer may specify that they would like to have control over the music being played from their living room, but would like to listen to this music in common areas such as the pool and garage. In other embodiments of the invention, the software application may qualify other features about the customer and the customer's environment, such as what types of electronic capabilities they have in their house, what type of internet connectivity they have, where they listen to music, where they get their music, what devices they listen to music on in their house, and what type of computer systems and devices they have. The software application may store this information in the vendor's databases for making recommendations for products or solutions to the customer.

According to one embodiment of the invention, the vendors may provide customers with mobile software applications that customers may use before in-store shopping for the vendor's products (i.e., "pre-shopping apps"). For example, the pre-shopping app may be a software application that allows customers to view or simulate products, learn information about particular products, view current vendor sales, receive marketing discounts, or find out information about the vendor (such as retail store locations and hours), before entering the store. In some instances, customers may provide the pre-shopping app with personal, demographic, or psychographic customer information. This information can be collected by the vendor's website or otherwise at a vendor server. Thus, this pre-shopping app may allow vendors to capture demographic and/or psychographic information about the customer, before the customer enters the physical store.

In another aspect of the invention, the vendor may determine demographic or psychographic information about the customer by collecting information from the mobile device itself, without directly asking the customer for this information. Typically, vendors determine a customer's demographic or psychographic characteristics by directly asking the customer for this information, for example, during a customer account registration process. Vendors typically store this demographic and psychographic information about the customer, for vendors to later use as the basis for a recommendation for a product. However, because vendors typically require a customer to create an account, vendors usually cannot make a recommendation to new customers who have not yet registered an account with the vendor.

In an online retail website context, vendors similarly find it problematic to make customized recommendations to new customers visiting the vendor's online retail website for the first time. Typically, vendors make customized recommendations to online customers by storing information about the customer, such as shopping or web browsing history, locally in the customer's web browser cache. However, vendors typically cannot make a customized recommendation to a new customer, or to customers with strict privacy control settings that forbid or restrict websites from storing information to their cache.

According to one embodiment of the invention, instead of directly asking customers for demographic or psychographic information, vendors may determine or derive or estimate this information from a customer's web browsing behavior and hardware information, without requiring a customer to create an account or to store that information in a web browser's cache. A customer's web browsing behavior and hardware information may provide useful information that vendors may leverage for making recommendations for specific products.

According to another embodiment of the invention, the vendor may gather information about a customer's computer or mobile device, such as the computer or mobile device's make and model, software applications installed on the computer or mobile device, music or movies stored on the computer or mobile device, computer or mobile device processing capabilities, and the like. Using this device information, the vendor may determine demographic or psychographic information about the customer. For example, if the vendor determines that the mobile device or computer is a new model of an Apple iPhone or MacBook, the vendor may make demographic or psychographic approximations about the customer that usually distinguish Apple users from other computer users, such as PC users. Studies suggest that self-identified Apple users are more likely to be younger, more politically progressive, and more artistic than PC users. Other demographic and psychographic differences between Apple and PC users studied by researchers include fashion (e.g., Apple users identify themselves as designer, chic, upscale and unique, or retro, whereas PC users are likely to identify their styles as casual and trending toward jeans), aesthetics (Apple users prefer modern art and are design enthusiasts), taste (Apple users prefer bistro-style fries as opposed to McDonald's fries), media consumption (Apple users prefer watching HBO and 60 minutes, reading MacWorld, and browsing Huffington Post), and technological comfort (Apple users are less likely to consider themselves tech-savvy). Thus, by identifying that a customer's computer or mobile device is a new Apple iPhone or Mac, the vendor may estimate that the customer is young, liberal, and has a more artistic personality than, for example, PC users. Likewise, reports suggest differences between users of Apple mobile devices and Android-based mobile devices, such as the latter tending to be younger and/or more technologically savvy. With this demographic and psychographic information, the vendor may make a recommendation for a particular product customized to these particular characteristics.

In another example, if the vendor determines that the customer's mobile device is a luxury brand (or otherwise high-end or costly device, or on the other hand, a low-end basic device) mobile device, the vendor may estimate or predict demographic information, such as a customer's financial status or income information. In yet another example, if the mobile device has a large amount of classical music stored in memory, the software application may estimate psychographic information, such as musical preferences, about the customer. In this way, the mobile device may be used to gather psychographic or demographic information about the customer, without prompting the customer for information or using previously-stored information about the customer. This improves the vendor's ability to make recommendations of products to new customers who have no prior information stored with the vendor. By collecting information about the customer's device, the vendor may estimate or predict the customer's psychographic or demographic and make recommendations without using any prior customer information.

In one embodiment of the invention, the vendor may determine demographic or psychographic information about the customer through a retail website. As with mobile devices discussed above, the retail website may collect this information by prompting the customer from the web for responses. However, in another aspect of the invention, the vendor may gather this information about the customer by collecting information about the customer's browser, user access device (tablet versus PC, iOS-based v. Android-based, etc.), and/or the internet connection itself, without prompting the customer for information. By gathering information about the customer's browser, device, and internet connection, such as the customer's Internet Service Provider ("ISP"), the vendor may estimate demographic or psychographic information about the customer. This information may, in turn, be used to improve the vendor's ability to make recommendations for specific products or solutions. For example, the vendor website may detect a customer's general IP address by analyzing a customer's HTTP request. With this information, the vendor may determine a customer's ISP and general location. Metadata in HTTP requests may also be used to identify the device type. If the vendor website determines that the customer has a general address located in Florida or Hawaii, the vendor may recommend car audio solutions that require installation, whereas if the general address were located in Michigan or Maine, the vendor may recommend car audio solutions that do not require installation, because car audio installations are typically difficult to complete in cold climates. Other information in the HTTP request may be used to approximate demographic or psychographic information about the customer. For example, vendors may determine what language a customer speaks by identifying the language field in a HTTP header. This may further be used to guess a customer's nationality or origin. Vendors may also determine which document a customer has requested, which web page the customer came from to get to the destination page, and other information that may be stored in a cookie.

In another aspect of the invention, the vendor may collect information about the customer's real time browsing behavior of products sold on the website, such as the speed with which a customer views particular web pages, which parts of a web page the customer has viewed, which links, audio clips and video clips the customer has played, or any other type of browsing behavior. The vendor may then determine a customer's interests or preferences based on the browsing behavior of the web pages the customer viewed. For example, the vendor website may detect that a customer is scrolling quickly through car audio solutions priced below $100 without auxiliary or built-in iPhone connections, while pausing at car audio solutions priced between $200-$400 with auxiliary or built-in iPhone connections. With this information, the vendor may recommend audio solutions with these particular features, i.e., priced between $200-$400 with auxiliary or built-in iPhone connections. The vendor may detect a customer's scrolling speed, cursor position, and similar browsing behavior with the use of JavaScript or scripting software packages such as jQuery.

In this way, the mobile device may gather psychographic or demographic information about the customer, without prompting the customer for information, or using any prior information about the customer. The vendor may then use this information to make recommendations for products or solutions on the website. In another aspect of the invention, this information may be saved, and used to make a recommendation to the customer, if the customer later decides to visit the store. As described in more detail below, the information from the online website may be saved by the customer and taken to a vendor's site. This improves the vendor's ability to make recommendations for products to new customers, and in particular, new customers who would have no prior information other than the online stored with the vendor. By collecting information about the customer's browser behavior, access device or internet connection, the vendor may determine the customer's psychographic or demographic characteristics and make recommendations without ever directly asking the customer for this information.

In one aspect of the invention, vendors may extend the use of information about a customer's device to any alternative channel of commerce, and serve as the basis for vendors to determine a customer's demographic or psychographic characteristics. For example, vendors may allow customers to shop for their products via intelligent display systems, telephone call centers, interactive television services, mobile software applications, social networks, and the like, in addition to their physical stores. As in the online retail context, vendors are typically limited in the manner they may determine a customer's psychographic or demographic characteristics when customers shop via such alternative channels of commerce. Unlike the physical store context, these alternative channels of commerce typically do not allow vendors to visually determine these characteristics with sales representatives. However, vendors may detect information about the device the customer is using to shop in the alternative channel of commerce. For example, if the customer is shopping via a software application on their mobile device, the vendor may gather information such as the computer or mobile device's make and model, age, processing capabilities, and the like. Using this device information, the vendor may determine demographic or psychographic information about the customer. For example, if the vendor determines that the customer is using a new model of an Apple iPhone or MacBook, the vendor may make demographic or psychographic approximations about the customer that usually distinguish Apple users from other computer users, such as PC users. As discussed above, studies suggest that self-identified Apple users are more likely to be younger, more liberal, and more artistic than PC users. Thus, if a vendor determines that a customer is using an Apple product, the vendor may recommend products targeted to young, liberal, and artistic consumers. As another example, if the customer is shopping via telephone call center, the vendor may gather information about the customer's phone number to determine the customer's geographic location. Using a customer's device information allows vendors to profile a customer's demographic and psychographic characteristics in any channel of commerce. Thus, whether a customer is shopping via a physical store, intelligent display system, online website, software application, social network, etc., the vendor may make a recommendation to the customer tailored to the customer's particular demographic and psychographic characteristics.

In another aspect of the invention, the vendor may collect information from sensors already installed on the customer's device to analyze and use in determining a customer's demographic or psychographic characteristics. For example, vendors may record audio from customers shopping via telephone call centers, and analyze different components of a customer's voice and speech, such as phonation, resonance, intonation, pitch, respiration, phonology, language, morphology, syntax, grammar, semantics, pragmatics, and the like, to determine the customer's demographic and psychographic characteristics. Specifically, certain phrases or tones that a customer may use, may be used to guess or predict the customer's age, gender, socioeconomic status, etc. As another example, a vendor may install cameras and audio recorders at an intelligent display system to monitor and analyze the customer in a similar manner as the EyeSee Mannequin, described below. The vendor may then use this information in the same manner as described above to profile a customer's demographic and psychographic characteristics in any channel of commerce, and make a recommendation tailored to these characteristics.

In another aspect of the invention, the vendor may bridge the gap between physical retail stores and alternative channels of commerce, such as online retail websites, by allowing the software application to access information about the customer's out-of-store shopping history. This shopping history may include, without limitation, the customer's online browsing and purchase history, and the history of any communications made to the vendor, such as by telephone or e-mail. In one embodiment of the invention, a vendor may store a customer's browsing history when the customer visits their website from a computer located off-site from the vending location. This information may include products or solutions the customer viewed, or questions the customer may have asked to an online customer service representative. When the customer has been identified by the system, the vendor may then retrieve the customer's browsing information from the vendor's database. This information may then be used to engage the customer during the sales process. For example, if the customer has been viewing a particular line of speakers or asked a particular question about the speakers on the vendor's website, a sales representative may use this information to skip over the introduction or qualification steps of the sales process and directly engage the customer on the speakers the customer viewed and inquired about on the vendor's web site. In other embodiments of the invention, the customer's browser history may be stored locally on the customer's mobile device, instead of on the vendor's database. The software application may retrieve this information and communicate it to the system using the NFC, RFID, or cellular capabilities described above.

As a general matter, the software application may be operated to navigate to any stage of the sales process. For example, the customer may iteratively cycle through the qualification and recommendation stages until the customer is satisfied with a product or solution. The software application may also be used to bookmark the stages of the sales process that the customer completed. Thus, if the customer was only able to provide the application with demographic information, leaving the psychographic information incomplete, the customer could bookmark their place in the application (or the software could automatically bookmark the location) such that the next time the customer launched the application, the application would bring the customer to the interface for entering their psychographic information.

In another aspect of the invention, a sales representative may also supplement the customer information collected by the software application running on the customer's mobile device. The sales representative may have a separate mobile device (Advisor Tablet) running a software application that he or she may use while engaging a customer in the sales process. As with the customer's mobile device, the software application running on the sales representative's mobile device may allow the sales representative to provide personal, demographic, or psychographic information about the customer to the vendor. For example, if the sales representative learns about the customer's specific taste in a particular kind of music, the sales representative may enter this information onto his or her mobile device, which may then be communicated directly to the vendor's database or customer's mobile device for making a customized recommendation of products or solutions.

The sales representative's mobile device may be referred to herein as an "Advisor Tablet", although the person of ordinary skill will appreciate that the device can be a tablet, min-tablet, smart phone, netbook, lap top, personal computer, and so forth, as appropriate for the particular environment and application. The mobile device used by the customer, whether the customer's own device or a store-provided device, may be referred to herein as the "Customer Tablet", and take various forms as with the Advisor Tablet.

Referring now to step 104 of FIG. 1, after the software application receives the customer information, the software application recommends products or solutions to the customer based on the personal, demographic, and/or psychographic information the vendor has collected. For example, if the vendor has collected information about the customer's age, gender, residence, financial status, expertise, or personal tastes, the vendor may recommend a package of audio equipment that is tailored to the customer's specific age, gender, financial status, expertise or personal taste. In one aspect of the invention, the vendor may use information stored in its sales records to tailor a recommendation to the customer. That is, the vendor may use information about what types of products and solutions customers with similar demographic and psychographic profiles have purchased in the past to recommend a product tailored to the customer's specific age, gender, financial status, expertise and taste. For example, if the vendor has determined that the customer is a 25 year old, single, upper middle class male, who enjoys listening to pop music in his living room, with significant experience and expertise with home audio electronics, the vendor may search its sales history for purchases made by customers with similar profiles and determine what audio equipment this particular segment of customers enjoys. This is sometimes referred to as "collaborative analysis" or "like-minded filtering." One of ordinary skill in the art would appreciate that the software application may base its recommendation off previous sales history using statistical or probabilistic algorithms. For example, the software application may use Bayesian probability to determine the likelihood the customer would purchase particular audio equipment, given the fact that the customer is 25, male, and single.

The demonstration of a product may include either or both of steps 105 and 106.

Referring now to step 105, the software application visually displays the recommended product or solution to the customer on the mobile device. The software application interface may allow the customer to zoom and pan to different parts of the product or solution. The software application interface may also allow the customer to rotate the image of the product or solution enabling the customer to view the product from different angles. Using the software application running on the mobile device, a customer can virtually inspect a vendor's entire line of products or solutions without using any physical space in the store.

In another aspect of the invention, the application may display the product or solution as a holographic or 3-D display. Devices and techniques exist for displaying content on mobile devices in three dimensions. Such devices and techniques output video and sometimes involve the use of special glasses for resolves 3-D images displayed on a screen. Displaying products or solutions in 3-D or as holograms provides a more tangible and meaningful simulation experience for the customer.

In another aspect of the invention, the software application may visually display detailed information about the recommended product or solution to the customer on the mobile device. This information may include a product description, features, specifications, dimensions, reviews, and category information. The software application interface may allow the customer view details about the product or solution that a customer would not otherwise be able to view on a physical embodiment of the product. For example, a customer viewing information about a set of speakers can view the speaker's frequency response, power range, sensitivity, and customer or expert reviews of the product. By providing information about a recommended a product or solution tailored to the customer's personal, demographic, and psychographic features, the customer may discover new products or solutions, or new capabilities of previously known products and solutions.

Referring now to steps 106-108 of FIG. 1, after the customer has viewed the product or solution, and the detailed information about the product or solution, the vendor may then demonstrate the recommended products or solutions to the customer using the software application running on the customer's mobile device or a store simulation apparatus. The store may have a simulation apparatus that is configured to simulate an environment defined by the customer. For example, the simulation apparatus may simulate how the recommended audio equipment would sound in a bedroom, living room, or vehicle. In one embodiment of the invention, the apparatus is a physical console that resembles the environment the customer is attempting to simulate. For example, a simulation apparatus simulating the audio characteristics of a car may include an automotive interior, car seats, and dashboard. As another example, a simulation apparatus simulating the user's home theatre may include a room with a projection screen and theatre seating, mimicking the layout of the customer's home theatre room. Providing a physical setting to simulate a particular environment assists the customer visualize how a product or solution may look and feel in their intended environment.

As described above, the vendor may simulate the performance of audio speakers using an audio simulation as described and/or claimed in U.S. Pat. Nos. 7,069,169 and 7,899,656, each entitled "Virtual Speaker Demonstration System and Virtual Noise Simulation" and assigned to Crutchfield Corp. The vendor might simulate the performance of display units using a display simulation as described and/or claimed in U.S. Pat. No. 7,487,118, entitled "System and Method of Image Display Simulation", assigned to Crutchfield Corp. The vendor might simulate the performance of image capture devices (cameras, camcorders, etc.) using an image capture simulation as described and/or claimed in U.S. Pat. No. 7,676,403, also assigned to Crutchfield Corp. Each of the aforementioned patents is incorporated herein by reference in its entirety.

In step 106, the customer engages a simulation apparatus. According to some embodiments of the invention, the simulation apparatus may include reference equipment for simulating the characteristics of various different brands and models of product. For example, a simulation apparatus for simulating a set of speakers may include reference speakers that may be programmed to simulate the audio characteristics of different brands and models of speakers. The simulation apparatus may further include a user display for showing the customer information about the product being simulated. For example, the simulation apparatus user display may show the customer the audio characteristics and product information about the speakers being simulated. In some embodiments of the invention, the simulation apparatus user display may be controlled by a software application running on the user's mobile device. The software application running on the mobile device may further enable the customer to control the simulation apparatus. For example, the customer may select which speakers to simulate using the software application running on the mobile device.

Whereas the embodiment described above allows customers to control the simulation apparatus using a software application running on a mobile device, other embodiments allow the simulation apparatus to be controlled with a user interface directly affixed to the reference equipment. For example, a set of reference speakers may have a touch screen user interface affixed onto the front side of the speakers. A customer may select which speakers to simulate by interacting with the user interface directly affixed to the speakers.

According to one embodiment of the invention, the simulation apparatus may include reference equipment to simulate the sound system inside an automobile. According to this and similar embodiments, the simulation apparatus may include a steering wheel, car seats, reference speakers, and a dashboard with a user interface, emulating a car-like environment. In this and similar embodiments, the simulation apparatus may be engaged by interacting with the user interface on the car dashboard.

Referring now to step 107, the characteristics of the simulation apparatus can be programmed to reflect the physical characteristics of the customer's particular environment. For example, a simulation apparatus simulating a customer's bedroom can be programmed to simulate how audio equipment would actually sound in the customer's bedroom. By analyzing the physical dimensions of the customer's particular environment, the vendor may determine the acoustic characteristics of the customer's environment.

Referring to step 108, the simulation apparatus may then apply these acoustic characteristics to an audio input, such as a music track, reproducing how the audio input would sound in the customer's particular environment.

In one aspect of the invention, the customer may control how the products or solutions are being simulated with the software application running on the mobile device. The customer may use the software application interface to select which products or solutions to simulate, and which physical environment the products or solutions are to be simulated in. For example, the customer may use the software application interface to select a set of speakers to simulate in a bedroom. In one aspect of the invention, the customer may load a blueprint layout of the customer's bedroom onto the mobile device. Using the layout of the customer's bedroom, the customer can simulate how the set of speakers would sound depending on where the speakers are placed.

In one embodiment of the invention, the customer interfaces with the simulation apparatus by interfacing with the mobile device's touch screen. In other embodiments of the invention, the customer may interact with the simulation apparatus through an interface directly connected to the simulation apparatus.

In yet another aspect of the invention, the simulation apparatus may engage the customer automatically when the customer approaches the apparatus with their mobile device. For example, when a customer walks into a bedroom simulator, the simulation apparatus will automatically display information tailored to the customer, without the customer initiating any interaction. The simulation apparatus may display the customer's name, home layout, and recently viewed products and solutions. The simulation apparatus may receive this information from the software application running on the customer's mobile device. The mobile device may communicate to the simulation apparatus using its NFC, RFID, or cellular capabilities described above. Similarly, the simulation apparatus may be automatically triggered when the customer approaches by the mobile device's NFC or RFID proximity capabilities, or the store's optical and motion sensors.

Using a simulation apparatus provides the ability to demonstrate a line of products in a wide variety of environments using a minimal amount of physical space. As noted above, this allows vendors to demonstrate a large amount of inventory while avoiding the cost of consuming a large amount of physical space. For example, vendors can demonstrate products to consumers in vending locations as small as a kiosk at an airport.

Referring now to step 109, after demonstrating the recommended products and solutions, the vendor may then close the sale and purchase the product or solution directly from the mobile device or simulation apparatus. The mobile device allows the customer to store products and solutions that the customer decides to purchase in a virtual shopping bag. In one embodiment of the invention, the selected products or solutions may be stored in a volatile or non-volatile memory on the mobile device or simulation apparatus. In another embodiment of the invention, the selected products may be stored in the vendor's database.

After adding a product or solution to the customer's virtual shopping bag, the customer may decide to complete the sale from the mobile device. Using the software application's interface, the customer may provide payment information, such as their debit or credit card information, and place an order for the selected product or solution directly from the mobile device.

In another embodiment of the invention, the customer may decide to save the product or solution in their virtual shopping bag, and complete the purchase transaction at a later time. For example, the customer may decide to view more information about the products or solutions in the virtual shopping bag when they return home. From their home, the customer may then provide their payment information and place an order for the selected product or solution.

Referring to step 110, the mobile device and simulation apparatus may further allow the customer to configure post-sale services. From the same mobile device user interface, the customer may request post-sale services such as product delivery and product installation. Using the mobile device to complete the sale and satisfy requests for post-sale services allows vendors to yield higher conversion rates. Allowing the customer to place an order in the very same location the customer demonstrated the product or solution improves convenience for the customer and avoids forcing the customer to wait in a check-out line.

Figure 2:
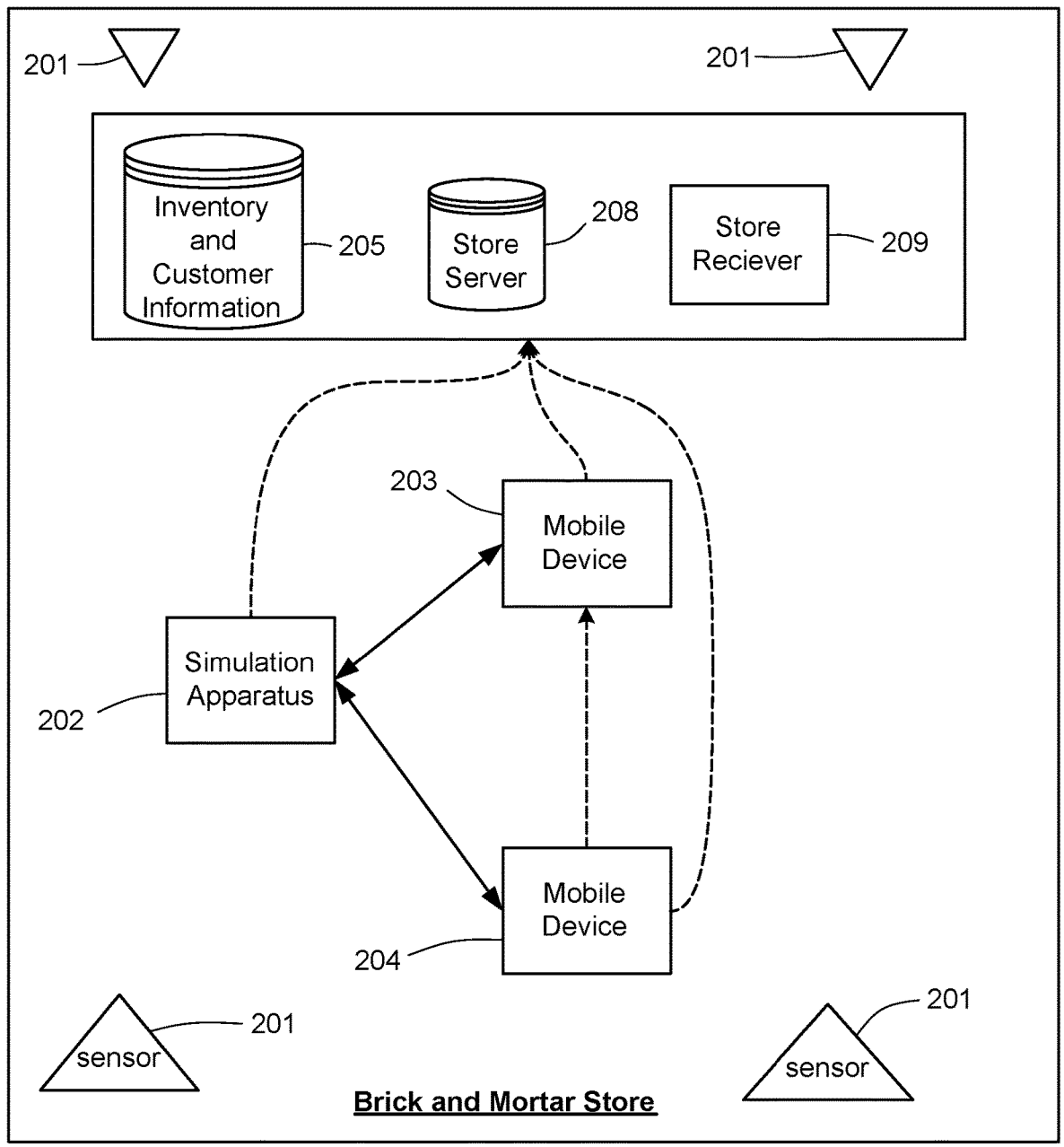
FIG. 2 is an exemplary system for customizing a vendor's sales experience for a customer with a mobile device and simulation apparatus according to another embodiment of the invention.

FIG. 2 is an exemplary system for customizing a vendor's sales experience for a customer according to one embodiment of the invention. The system comprises a brick and mortar store that may include sensors 201, a simulation apparatus 202, a first mobile device 203, a second mobile device 204, a database for storing inventory and customer information at the store 205, a store server 208, a store receiver 208; and an off-site location that may include a database for storing customer information remotely from the store 206, and a computer 207. The sensors 201 may monitor and record information about a customer located at the brick and mortar store. The sensors 201 may communicate the information to the store receiver 209 to be stored at the store server 208 or customer and inventory information database 205. Simulation apparatus 202 enables vendors to simulate different products as discussed above. The simulation apparatus 202 may be controlled by the first and second mobile devices 203 and 204. The first mobile device 203 may be a customer-operated mobile device. The second mobile device 204 may be a representative-operated mobile device. As described above, the representative can use his or her mobile device 204 to control what is displayed on the customer's mobile device. The representative may also use the second mobile device 204 to control the simulation apparatus 202. The first and second mobile devices 203 and 204 may communicate information to the store receiver 209, the store server 208, and the inventory and customer information database 205. The first and second mobile devices may communicate to the store receiver 209, the store server 208, and the inventory and customer information database 205 using one of the methods described above, such as Bluetooth, Wi-Fi or the mobile device's cellular connection. The computer 207 may be connected to the customer information database 206 and the brick and mortar store using a network connection such as an internet connection.

According to one embodiment of the invention, the brick and mortar store depicted in FIG. 2 may include in-store sales representatives to provide in store customer assistance, and to help customize the sales process to the customer's needs, preferences, and traits. However, as noted above, vendors may not employ enough sales representatives to assist each customer in a store, forcing some customers to wait until a sales representative becomes available. In accordance with one embodiment of the invention, different stages of the sales may be facilitated with a software application on a mobile device and/or on an intelligent display system. In one aspect of the invention, the software application performs many of the same functions as the sales representative; it answers questions, engages the customer, and asks the customer questions to determine the customer's needs, preferences, and traits. As described in more detail above, it may also collect personal, demographic and psychographic information about the customer. This allows vendors to engage each customer individually, without having customers wait in long lines for sales representatives to become available.

In one aspect of the invention, the sales representatives may complement the software-based sales processes on the mobile device. For example, the sales representatives may use their personal experience or expertise with certain products to provide more useful answers to questions that the application may provide. Thus, the vendor can benefit from the advantages of the personal, face-to-face assistance of human sales representatives, and the streamlined computerized processes of the mobile device.

In another embodiment of the invention, both the customer and the sales representative may have mobile devices, shown as 203 and 204 in FIG. 2 running software applications that communicate to the vendor. This allows the sales representative to change, modify, or supplement the information collected by the software application on the customer's mobile device. For example, using the sales representative's own mobile device, the sales representative can make specific recommendations of products or solutions to be displayed on the customer's mobile device. As another example, the sales representative can provide personal, demographic, or psychographic customer information to the software application, in addition to the customer information the vendor has stored in its databases. Thus, if the sales representative is able to discern a customer's preferences or characteristics based on general observations that the software application may not detect, such as the customer's body language, or conversation with the customer, the sales representative may enter this information into his or her own mobile device, which then relays this information to the software application on the customer's mobile device. The software application on the customer's mobile device may then make recommendations for certain products or solutions taking this additional information into account.

The vendor may collect this information from the store sales representatives or from sensors, depicted as 201 in FIG. 2, installed throughout the store. In one aspect of the invention, a store sales representative may collect this information from general observations about the customer and by engaging and interacting with the customer. For example, the representative can determine a customer's demographic information such as age or gender visually, while determining a customer's psychographic information, such as preferences or tastes, after interacting with the customer. This information can be entered into the Advisor's Tablet as described above. In another aspect of the invention, sensors 201 may be installed throughout the store to monitor the customer and electronically determine information about a customer using a computer. By way of example, and without limitation, these sensors may comprise part of a sensing system that may include optical and infrared sensors, video image processors, acoustic sensors, magnetic sensors, vibration sensors, and the like. Examples include Microsoft's Kinect™ product, Morpho Trust USA™ product, Wii Remote Plus™ product, PlayStation Move™/PlayStation Eye™ product, and similar sensor systems. These sensing systems may integrate associated software, such as the Kinect for Windows product, the Kinect Software Development Kit (SDK), and/or various open source drivers that are available to process data read by the sensors. These sensing systems may be used to monitor a customer's motion, such as their foot traffic patterns, or body language, throughout the store. These sensing systems may perform full-body 3D motion capture and voice recognition. These sensing systems may be programmed to recognize hand gestures and voice commands. One having ordinary skill in the art will appreciate that these sensors and programs may be used to analyze other features of the customer to determine demographic or psychographic information.

As described above, according to some embodiments of the invention, sensors may include facial recognition programs enabling vendors to determine demographic information about the customer. For example, systems such as the EyeSee Mannequin exist that build cameras, sensors, and computers into retail store mannequins. Cameras and sensors are discretely embedded into retail store mannequins to record and monitor video and audio of customers who view the mannequin. This information is then analyzed by a computer to determine demographic customer information such as age range, gender, race, number of people and time spent of the customers who have viewed the mannequin. According to some embodiments, Microsoft's Kinect™ product can be used to collect facial data, and analyzed in the manner described above with facial recognition processing.

According to one embodiment of the invention, programs on the vendor's computers may similarly analyze information received from sensors located throughout a store to determine demographic or psychographic information about the customer. As with the EyeSee mannequin, sensors may be used to determine demographic customer information such as age range, gender, race, number of people and time spent of the customers. Additionally, sensors may also determine what products or solutions the customer may be interested in based on the customer's psychographic information, such as the customer's foot traffic patterns. This information may be stored in the vendor's database 205 or 206, or communicated directly to the software application running on the customer's mobile device 203 to make a customized recommendation or a product or solution to the customer.

After a customer has downloaded the software application to the customer's mobile device, the software application engages the customer in a similar manner as the store sales representative, and collects personal, demographic, and/or psychographic information about the customer through an interactive mobile interface. For example, the software application may ask the customer questions about the customer's musical interests, preferences in music, or listening habits, such as where in the customer's house the customer prefers to listen to music. The customer may provide his or her musical interests by entering the name of an artist or song into the mobile device interface. In one aspect of the invention, the customer may describe how he/she prefers to listen to music by interacting with a blueprint of the customer's home on the mobile device. For example, the software application may allow the customer to describe the architectural layout of the customer's home, such as the location and dimensions of their bedrooms, living rooms, and entertainment areas. Using this blueprint, the customer may then visually specify where and how the customer would like to listen to music. For example, the customer may specify that they would like to have control over the music being played from their living room, but would like to listen to this music in common areas such as the pool and garage. In other embodiments of the invention, the software application may qualify other features about the customer and the customer's environment, such as what types of electronic capabilities they have in their house, what type of internet connectivity they have, where they listen to music, where they get their music, what devices they listen to music on in their house, and what type of computer systems and devices they have. The software application may store this information in the vendor's databases 205 or 206 for making recommendations for products or solutions to the customer.

In another aspect of the invention, the vendor may bridge the gap between physical retail stores and alternative channels of commerce, such as online retail websites, by allowing the software application to access information about the customer's out-of-store shopping history. This shopping history may include information such as the customer's online browsing and purchase history, and the history of any communications made to the vendor, such as by telephone or e-mail. For example, the information may include information about which products or solutions the customer viewed. As another example, the information may include information about what questions the customer may have asked to an online customer service representative.

According to one embodiment of the invention, a vendor may store this out-of-store information in a database 206 for later use when the customer visits the store. When the customer has been identified by the system, the vendor may retrieve this information from the database 206. This information may then be used to engage the customer during the sales process. For example, if the customer has been viewing a particular line of speakers or asked a particular question about the speakers on the vendor's online website from their home computer, the vendor may retrieve this information and use it to skip over the introduction or qualification steps of the sales process and directly engage the customer on the speakers the customer viewed and inquired about on the vendor's web site. In other embodiments of the invention, the customer's browser history may be stored locally on the customer's mobile device, instead of on the vendor's database. The software application may retrieve this information and communicate it to the system using the NFC, RFID, or cellular capabilities described above.

Referring to FIG. 3, in yet another embodiment of the invention, a customer, 301, may interact with a single interface, 302, such as an intelligent display system, without the use of a mobile device, or simulation apparatus. That is, a customer may perform steps 101 through 110 shown in FIG. 1 by interacting with a single interface, 302, such as an intelligent display system, described in more detail below, without the use of a mobile device or simulation apparatus.

In accordance with a single interface embodiment, customers may identify themselves by interacting with a user interface at the intelligent display system, in a similar manner as described in step 102 above in FIG. 1. Customers may, for example, identify themselves by entering identification information such as a name, address, phone number, e-mail, username and the like, or a customer ID, using an input such as a keyboard, mouse, or touchscreen or the like, at the intelligent display system. As discussed above, customers may also identify themselves with loyalty program device identifiers, such as loyalty club cards, magnetic stripe cards, or smart cards and the like, by providing these loyalty program identifiers to loyalty program device readers at the intelligent display system. In some embodiments, the customer identifiers may be associated with an awards program or marketing/advertising program that enables customers to view sales or loyalty points or discounts at an intelligent display 401 or touch panel 404. For example, the intelligent display can show how many loyalty points a customer has, the reduced price associated with the customer's loyalty points, or how many loyalty points may be earned with a particular purchase. Customers may also identify themselves using wireless communication devices such as RFID or near-field communication ("NFC") compatible devices, as discussed above.

After the vendor has identified the customer, the vendor may qualify the customer by collecting information about the customer at the intelligent display system, in a similar manner as described in step 103 above in FIG. 1. The intelligent display system interface may prompt the customer with a series of questions and elicit responses from the customers that allows the vendor to determine information about the customer's needs, preferences, and traits, as discussed above. The intelligent display system may also retrieve a customer's personal, demographic, or psychographic information stored in a database, 303, as noted above. For example, the intelligent display system may prompt the customer about the customer's musical interests, preferences in music, or listening habits, such as where in the customer's house the customer prefers to listen to music. The customer may provide his or her musical interests by entering the name of an artist or song into the intelligent display system interface. In one aspect of the invention, the customer may describe how they prefer to listen to music by interacting with a blueprint of the customer's home on the kiosk. For example, the kiosk may allow the customer to describe the architectural layout of the customer's home, such as the location and dimensions of their bedrooms, living rooms, and entertainment areas. Using this blueprint, the customer may then visually specify where and how the customer would like to listen to music. For example, the customer may specify that they would like to have control over the music being played from their living room, but would like to listen to this music in common areas such as the pool and garage. In other embodiments of the invention, the kiosk may qualify other features about the customer and the customer's environment, such as what types of electronic capabilities they have in their house, what type of internet connectivity they have, where they listen to music, where they get their music, what devices they listen to music on in their house, and what type of computer systems they have. The intelligent display system may store this information in the vendor's databases for making recommendations for products or solutions to the customer.

After the intelligent display system receives the customer information, the intelligent display system recommends products or solutions to the customer based on the personal, demographic, or psychographic information the vendor has collected, in a similar manner as described in step 104 above in FIG. 1. As discussed above, if, for example, the vendor has collected information about the customer's age, gender, residence, or personal tastes, the vendor may recommend a package of audio equipment that is tailored to the customer's specific age, gender or personal taste. As discussed above, the vendor may use information stored in its sales records to tailor a recommendation to the customer. Similarly, one of ordinary skill in the art would appreciate that the intelligent display system may base its recommendation off previous sales history using statistical or probabilistic algorithms.

The intelligent display system visually displays the recommended product or solution to the customer, in a similar manner as described in step 105 above in FIG. 1. The intelligent display system interface may allow the customer to zoom and pan to different parts of the product or solution, using, for example, a touch screen or input devices such as a mouse and keyboard, or the like. The intelligent display system interface may also allow the customer to rotate the image of the product or solution enabling the customer to view the product from different angles.

As discussed above, in another aspect of the invention, the intelligent display system may visually display detailed information about the recommended product or solution to the customer. This information may include a product description, features, specifications, dimensions, reviews, and category information.

After the customer has viewed the product or solution, and the detailed information about the product or solution, the vendor may then demonstrate the recommended products or solutions to the customer at the intelligent display system, in a similar manner as described in steps 106-108 above in FIG. 1. The intelligent display system may have simulation equipment that is configured to simulate an environment defined by the customer. For example, the simulation equipment may be a set of reference speakers that may be configured to simulate how the recommended audio equipment would sound in a bedroom, living room, or vehicle.

The characteristics of the simulation equipment can be programmed to reflect the physical characteristics of the customer's particular environment in a similar manner as described in step 107 above. As discussed above, the simulation equipment simulating a customer's bedroom can be programmed to simulate how audio equipment would actually sound in the customer's bedroom. By analyzing the physical dimensions of the customer's particular environment, the vendor may determine the acoustic characteristics of the customer's environment. The simulation equipment may then apply these acoustic characteristics to an audio input, such as a music track, reproducing how the audio input would sound in the customer's particular environment.

After demonstrating the recommended products and solutions, the vendor may then close the sale and the customer may purchase the product or solution directly from the intelligent display system in a similar manner as described in steps 109-110 above. Using the intelligent display system's interface, the customer may provide payment information, such as their debit or credit card information, and place an order for the selected product or solution directly from the intelligent display system. In another embodiment, the intelligent display system may allow the customer to save products and solutions in a virtual shopping bag that the customer may later retrieve from a mobile device or home desktop and decide to purchase. For example, the customer may decide to view more information about the products or solutions in the virtual shopping bag from a mobile device or desktop computer when they return home. From their home, the customer may then provide their payment information and place an order for the selected product or solution.

In another aspect of the invention, the customer may add the product to a virtual shopping bag, which the customer may later view or purchase from an off-site or computer, 307. The customer may save the product to a shopping bag, which the vendor may store in a database 303. Subsequently, the customer may later retrieve the product for viewing or purchasing from an off-site computer, 307 by identifying themselves with the vendor, and retrieving the product from database 303.

The intelligent display system may further allow the customer to configure post-sale services. From the intelligent display system interface, the customer may request post sale services such as product delivery and product installation.

Figure 4:
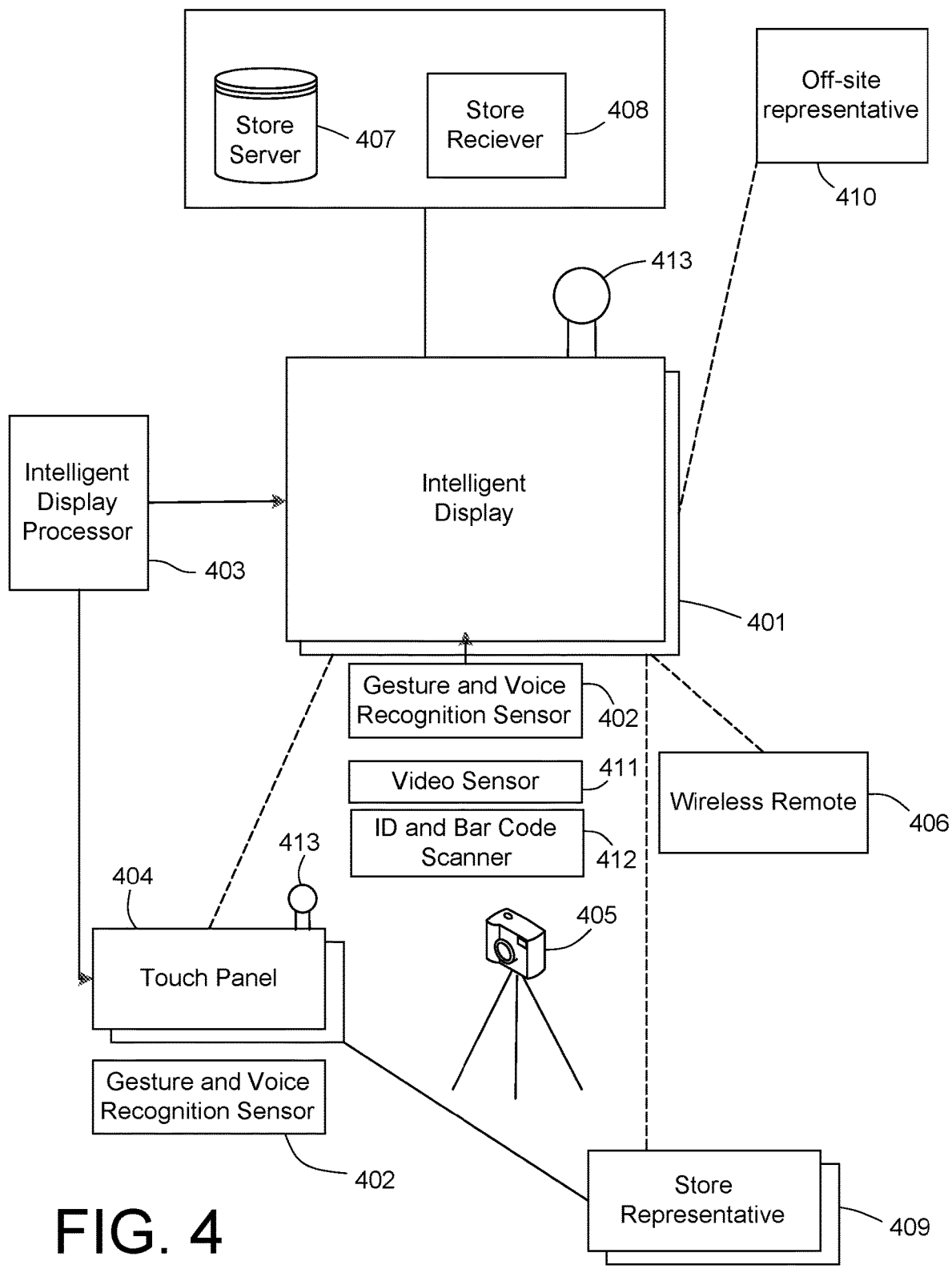
FIG. 4 is an exemplary system for customizing a sales experience for a customer using an intelligent display according to one embodiment of the invention.

In embodiments of the invention, the vendor can display products and solutions to the customer on displays or touch panels as depicted in FIG. 4 for providing an intuitive and visually compelling in-store shopping interface. Research has shown that customers respond to in-store shopping experiences that offer an intuitive shopping interface while simultaneously providing visually compelling images, videos, descriptions and other informational content about the products they are interested in. While touch screen interfaces for tablets, PCs, smartphones and other mobile devices can offer an intuitive interface for browsing and shopping for products, touch screen interfaces are not typically integrated into in-store shopping experiences because of their smaller size and limited display capabilities. This in turn, limits the type and quality of pictures, videos, and other product-related media content that vendors can display to customers. Likewise, while large screen devices, such as flat screen TVs, provide a way to display visually compelling images of a vendor's products, these devices do not typically offer customers an intuitive way to interact with and control what is displayed on the screen.

Embodiments of the present invention allow retailers to offer customers an intuitive interface for browsing and shopping for products while simultaneously creating a visually compelling shopping experience. The in-store embodiment may be referred to as an Intelligent Display System or Intelligent Fixture. As depicted in FIG. 4, an Intelligent Display System may include intelligent displays 401, an intelligent display processor 403, gesture and voice recognition sensors 402, touch panels 404, wireless remotes 406, video sensors 411, ID and Barcode Scanners 412, and product displays 405. Intelligent displays 401 are coupled to an intelligent display processor 403, gesture and voice recognition sensors 402, touch panels 404, wireless remotes 406, video sensors 411, and ID and Barcode Scanners 412 as depicted in FIG. 4. Intelligent displays 401 may be coupled to a light fixture 413 that illuminates when customers request assistance. Intelligent displays 401 may also be coupled to a store server 407 for receiving alerts, and a store receiver 408 for receiving information from an intelligent display 401 or intelligent display processor 403. The intelligent displays may also be coupled to off-site representatives 410 for providing customer assistance. Customers may interact with the intelligent displays 401 to view and shop for vendor products. The customer may control how the intelligent displays 401 are used to view and shop for information by providing input to gesture and voice recognition sensors 402, video sensors 411, ID and bar code scanners 412, or wireless remotes 406. The input is processed by the intelligent display processor 403. Customers may interact with the intelligent displays 401 to view and shop for vendor products. The customer may also view and shop for information using the touch panels 404. The touch panels be used independently from the intelligent displays 401. Similarly to the intelligent displays 401, customer may provide input to the touch panels 404 using gesture and voice recognition sensors 402, or a touch screen interface.

Generally, the intelligent display system depicted in FIG. 4 provides customers an intuitive interface for browsing and shopping for products by accepting input from the customer through the gesture or voice sensors, the touch panels, or wireless remotes. The intelligent display processor processes the input received through the gesture or voice sensors, touch panels, or wireless remotes, and controls what is displayed on the display based on the customer input.

In embodiments of the invention, the intelligent display 401 may be a large screen display (also known as "large format displays") for displaying visually compelling images, such as a monitor, a flat-screen TV, or a Smart TV. As described in more detail below, the intelligent display is used to interactively display menus and product information to a customer in response to customer input provided through a gesture and voice sensor, touch panel, or wireless remote. In a preferred embodiment, the intelligent display 401 is a 55" Samsung ME-B Series LED LCD Integrated TV Display, protected by a Samsung CY-TM55LBC 55" Touch Overlay. The menus and product information shown on the intelligent display are controlled by an intelligent display processor 403. According to some embodiments of the invention, the intelligent display processor is a desktop computer. In preferred embodiments of the invention, the computer processor is a Lenovo® ThinkCentre M82, connected to the intelligent display via VGA cable, DVI connection, HDMI connection or similar audio/video connection. The intelligent display processor 403 may be connected to a network, such as a wired or wireless local area network (LAN), wide area network (WAN), wireless personal area network (PAN) and other types of networks via a network adapter or switch or interface. In preferred embodiments of the invention, the network switch may be a Netgear® Prosafe 16-port Gigabit Desktop Switch GS116. In preferred embodiments, the Lenovo® ThinkCentre M82 may be connected to the Netgear® switch via a cat 5e network cable.

In one embodiment of the invention, the intelligent display processor 403 controls what information is viewed on the intelligent display 401 based on input received from a customer through the gesture and voice sensor 402. Thus, as described in more detail below, the customer may control what is viewed on the large screen display, navigate through menus, and/or select product information using gesture or voice commands. The gesture and voice commands issued by the customer are detected and processed by a gesture and voice recognition sensor 402 coupled to the intelligent display 401. (Alternatively, the sensor input from sensor 402 could be directed to intelligent display processor 403 where the sensor data could be processed by software interpreting and applying gestures and/or voice commands.) The gesture and voice recognition sensor 402 is a computer device that detects customer movement and/or speech. Examples of gesture and voice recognition sensors include the Microsoft's Kinect™ product, Morpho Trust USA™ product, Wii Remote Plus™ product, PlayStation Move™/PlayStation Eye™ product, and similar sensor systems. These sensing systems may integrate associated software, such as the Kinect for Windows product, the Kinect Software Development Kit (SDK), and/or various open source drivers that are available to process data read by the sensors Microsoft Kinect™ System, Playstation Move, and the Nintendo Wii™ System. In one aspect of the invention, the gesture and voice recognition sensor 402 may also detect customer attributes, such as height, for making recommendations or suggestions of products based on this information.

In addition to the gesture and voice recognition sensors, customers may interact with the intelligent display through one of the plurality of touch panels 404 or wireless remotes 406 peripherally positioned around the intelligent display. A touch panel 404 is a mobile device that comprises a computer and an interactive touch screen for displaying a graphical user interface or keyboard. The interactive touch screen may be integrated with the computer in a single casing, such as the HP Touch Smart™, or the touch screen may be in a separate casing from the computer, and coupled to a computer located externally to the touch screen. In embodiments where the touch screen is external to the computer, the touch screen is preferably a Planar® 22" Multi-Touch Widescreen LCD Monitor with Speakers or an Acer® 27" Full HD Touch Monitor with Speakers. The Planar® Multi-Touch Monitors and Acer®. Touch Monitors are preferably connected to a Lenovo ThinkCentre M72e desktop computer via USB and VGA cables. The integrated touch screens or external computers may be connected to a network, such as a wired or wireless local area network (LAN), wide area network (WAN), wireless personal area network (PAN) and other types of networks via a network adapter or switch or interface. In preferred embodiments of the invention, the network switch may be a Netgear® Prosafe 16-port Gigabit Desktop Switch GS116 or CISCO Campus LAN Switch. In preferred embodiments, the Lenovo® ThinkCentre M72e or HP Touch Smart™ may be connected to the Netgear® switch via a cat 5e network cable.

According to other embodiments, the touch panels may be mobile personal computers, such as laptops, notebooks, netbooks, tablets, PDAs (personal digital assistants), smart phones (e.g., the iPhone, Samsung Galaxy, Amazon Kindle and Kindle Fire, etc.), and other forms of portable computer devices.

Customers may use the touch panels 404 as remote controls or keyboards to control what is viewed on the large screen display. In other embodiments of the invention, customers may control the interface on an intelligent display 401 with a wireless remote 406. The wireless remotes 406 may contain motion sensing technology that enables customers to input gesture commands to control what is viewed on the intelligent display. The input a customer provides to the touch panels 404 or wireless remotes 406 are then communicated to the intelligent display processor to control what is viewed on the intelligent display. One advantage to using a wireless remote 406, is that wireless remotes allow customers control the intelligent display when customers cannot or prefer not to use the gesture and voice sensors 402. For example, the area surrounding the intelligent display may be overly crowded with customers, making it difficult to input gesture or voice commands to the intelligent display. As another example, some customer may not feel comfortable using a gesture or voice recognition sensor 402. Wireless remotes 406 provide customers with an intuitive and convenient alternative to gesture and voice recognition sensors 402 when customers cannot or prefer not to use the gesture and voice recognition sensors 402. Moreover, wireless remotes provide customers with a familiar way to interact with large monitor displays; the wireless remotes may be used in the same manner as television remotes may be used to control flat screen television displays. However, the wireless remotes 406 may provide customers with additional functionality that traditional television remotes cannot provide, such as controlling cursors and interacting graphical user interfaces.

In other embodiments of the invention, the touch panels 404 have menus and graphical user interfaces for shopping for products and displaying product information such as product images, videos, tutorials, descriptions, and reviews on the touch screen. Thus, while in some embodiments of the invention, customers may use the touch panel to control what is displayed on the intelligent display 401, in other embodiments, customers may use the touch panels to browse and shop for products independently from the intelligent display 401. This allows customers to browse and shop for products with a touch panel while the intelligent displays are in use by or for other customers.

In one aspect of the invention, the content displayed on the intelligent display 401 or touch panel 404 may be provided from a central repository stored on a store server 407. The central repository may store detailed information about products, such as product images, videos, tutorials, descriptions, and reviews. According to some embodiments of the invention, the intelligent displays 401 and touch panels 404 communicate to the store server 407 via a network connection. The intelligent displays 401 and touch panels 404 may retrieve this information from the store server 407 or may communicate via client/server protocols, such as for example, submitting a HTTP request from the server over the network. In preferred embodiments, the intelligent display 401 and touch panel 404 regularly send a request to the store server 407 (e.g., every day or on startup) to refresh the content to display. In this way, vendors may automate the management of the content displayed on the intelligent displays 401 and touch panels 404. One advantage to managing content this way is that vendors may display up-to-date information about products, such as the latest reviews and comments about a particular product, or in real-time.

In one aspect of the invention, customers shopping or browsing through products on a touch panel 404 or intelligent display 401 may also request the assistance of a store representative 409. In one embodiment of the invention, the graphical user interfaces on the touch panels 404 or intelligent displays 401 have a button for sending alerts to representatives throughout the store. The alerts may be communicated to the representative using an NFC, internet, or cellular communication connection as discussed above. The alerts may be sent to a store server 408, which then communicates the alert to a store representative 409, informing the representative which touch panel has requested assistance, and where the touch panel is located. In embodiments of the invention, the touch panels 404 or intelligent displays 401 have light fixtures 413 that illuminate when the button is pressed, indicating that the customer using that particular touch panel or intelligent display needs assistance. After the representative has located the customer seeking assistance, the representative may provide the customer with assistance in the same manner as described above. For example, the representative may use their mobile device to communicate information to the customer's touch panel or intelligent display. As described in more detail below, a representative may show the customer a particular product or product information on the customer's touch panel or intelligent display.

In one aspect of the invention, the representative may transfer the customer's shopping session information, such as which products the customer viewed or added to their shopping cart, between the smaller touch panel screens 404 and larger intelligent display screens 401. As explained in more detail below, some embodiments allow the representative to use their mobile device to control the transfer of shopping information between the touch panels and intelligent display. For example, a representative may transfer a customer's shopping session information from a touch panel to an intelligent display having a larger screen. This allows the representative to show the customer larger and higher quality images, videos, descriptions, and reviews of the products. In other embodiments described in more detail below, representatives can save the customer's shopping session information from either a touch panel or intelligent display in one area of the store, and transfer the shopping session information to another touch panel or intelligent display in another area of the store.

In one aspect of the invention, if there are no available representatives available in the store, the intelligent display 401 may be used to communicate to an off-site representative 410, using a video sensor 411. For example, the intelligent display may be used as a video screen to establish a video call (or alternatively, a chat without video) between the customer and an off-site representative 410 located at a call center. The intelligent display may capture video or audio of the customer with the gesture and voice sensor 402 and video sensor 411. The video sensor 411 may be an analog or digital video sensor that may be integrated into a computer network, such as the Logitech C920 HD Pro Webcam for recording video of customers interacting with the intelligent display 401. The intelligent display system may then transmit the video or audio of the customer recorded from video sensor 411 to the off-site representative 410 through a network connection, such as an internet connection, LAN, intranet, or telephone or cellular connection. Using the intelligent display as a video call screen, the off-site representative may provide assistance to the customer in the same manner as an in-store customer described above. The off-site representative may answer customer questions, control the products and information viewed on the intelligent display, and collect information about the customer. For example, the off-site representative may recommend a product by displaying information about the product on the intelligent display 401 for the customer to view. In another aspect of the invention, the off-site representative can view what is currently displayed on the customer's screen, and past items the customer has viewed. This improves the off-site representative's ability to assist and communicate with the customer.

Another advantage to connecting customers to off-site representatives is that vendors may enhance the assistance provided to customers by connecting with representatives that have particular expertise in the field of products the customer is interested in. For example, if a customer has a detailed or technical question about a camera or camera technology, the customer may connect to an off-site representative with particular expertise in camera technology.

In one aspect of the invention, the intelligent displays 401 and touch panels 404 operate in different modes that depend on the proximity of customers to the intelligent displays 401 or touch panels 404. For example, using the gesture and voice recognition sensor 402, the intelligent displays 401 may detect when there are no customers in close proximity or interacting with the displays 401, and operate in an attract mode. In the attract mode, the intelligent displays 401 show a series of images or videos relevant to a particular product being sold in that region of the store. For example, an intelligent display located in the camera and video equipment section of the store may display images or videos of the cameras and video recorders the store offers for sale, enticing customers to approach the display. Similarly, when there are no customers interacting with the touch panels 403, the touch panel 404 may operate in an attract mode. For example, there may be sensor circuitry 402/411 associated with each touch panel 404 to allow each to operate in an attract mode when not being used or attended to by somebody.

In another aspect of the invention, the gesture and voice recognition sensor 402 can likewise detect when customers approach an intelligent display 401 or touch panel 404, or are in close proximity, triggering the intelligent display or touch panel to switch to an interactive mode. In the interactive mode, the customer may interact with and control the intelligent display 401 or touch panel 404. In one aspect of the invention, the customer may use the intelligent display 401 or touch panel 404 to learn about products by navigating through menus featuring product descriptions, reviews, images and videos of products. For example, the customer may input gesture commands to pan through images or videos of a product, such as a camera, on the intelligent display. As another example, a customer may pantomime swipe movements with their hands and arms to "scroll" through images or videos being displayed on the screen of the intelligent display 401. Further, a customer may input a gesture command to zoom into pictures, or gesture to play and pause video clips. Similarly, a customer may provide voice commands to interact with the large screen, and browse through products or navigate through a menu.

In one aspect of the invention, images of the products displayed on the large screen of the intelligent display 401 may have hotspots that enlarge the image when a customer hovers over the hotspot with their arms and hands. For example, an image of a camera may have a hotspot on the camera lens, such that the image of the lens is enlarged when the customer hovers over the lens portion of the image. In another aspect of the invention, the hotspot may display a pop-up containing detailed information about a specific feature encompassed in the hotspot. For example, a hotspot on a camera lens may display a pop-up containing detailed information about the camera lens such as its zoom, focus and metering capabilities.

In the interactive mode, customers may also use the intelligent displays or touch panels to shop for the products. For example, customers may add products to a shopping cart, or save products to a wish-list with the intelligent display. FIGS. 6-11 illustrate graphical user interfaces for customers to shop for products on touch panels.

In one aspect of the invention, the customer's interaction with the intelligent display may be captured in a shopping session stored in memory at the intelligent display 401, touch panel 404, or intelligent display processor 403. Alternatively, or in addition, the customer's interaction information may be stored at store server 407. As described in more detail below, the information stored in the shopping session may include any information about the customer's interaction with the intelligent display 401, touch panel 404, product display 405, or wireless remote 406, such as which products the customer has viewed, and which products have been saved to a shopping cart.

In one aspect of the invention, the intelligent display processor 403 can detect when a customer (or representative) has stopped interacting with one of the elements in the intelligent display system, such as the intelligent display 401, or touch panel 404, and can transition into another mode, such as the attract mode. In one embodiment, the intelligent display processor 403 may determine whether there are customers interacting with the intelligent display system 401 based on the gesture and voice sensor 402, the touch panel 404, or information received from a representative 409. In another embodiment, the intelligent display processor may initiate a countdown timer that automatically switches to another mode after a specified amount of time has elapsed without user interaction. One advantage to detecting when a customer has stopped interacting with the intelligent display 401 or touch panel 404, is that the vendor may reset and clear stored shopping information left in memory from the previous customer using the intelligent display system. That is, after a customer stops using the intelligent display 401 or touch panel 404, the intelligent display system may reset and clear items the customer had added to the shopping cart, or items the customer wish-listed or viewed. This allows the intelligent display system to start a new shopping cart for the next customer to use the intelligent display system.

In one aspect of the invention, the touch panels 404 and intelligent display 401 may be used to detect when customers are interacting with physical products 405 placed near and around the intelligent display, and may display information about those physical products 405. For example, physical cameras or video recorders sold by the vendor may be put on a display table or fixture 405 near the intelligent display. The intelligent display may detect when customers pick up and examine the cameras, and may display information related to that particular camera. The information may be product descriptions, reviews, visually compelling images, videos or tutorials about the camera. In embodiments of the invention, the intelligent display may detect when a customer has picked up a product or is examining a product using proximity sensors, such as for example, magnetic clips sensors coupled to the camera (or other product). When a customer picks up a camera, the magnetic clip transmits a signal to the intelligent display processor indicating which camera the customer has picked up, allowing the intelligent display to then show information about that product. In a preferred embodiment of the invention, the magnetic switch is implemented with a Phidget® Magnetic Contact Switch and connected to the intelligent display processor with a Phidget® Interface Kit or Phidget® Network Interface Kit. The Phidget® Interface and Network Interface Kit may be installed in the external touch screen computers or intelligent display processors and may be connected to the proximity sensors via an interface connection such as a USB connection. The intelligent display system may detect which products the customer is examining using other proximity sensors, such as touch sensors, force and pressure sensors, weight bearing sensors, IR sensors, RFID sensors, or capacitive sensors. In preferred embodiments of the invention the IR sensors may be implemented with a Phidget® IR Distance Sensor and Distance Adapter, the capacitive sensor may be implemented with a Phidget® Capacitive Touch Sensor, and the RFID sensor may be implemented with a Phidget® RFID Sensor. In other embodiments, customer examination of a product may be detected using gesture sensor 402 or video sensor 411. In yet other embodiments, the retail product display may have a button the customer may press that will display information about the product. In one aspect of the invention, the information about which products are picked up or examined by customers may be captured by the vendor. For example, information about which products were picked up and examined may be detected by the intelligent display processor and communicated to the store server. This allows vendors to determine which products customers have interacted with the most. In another aspect of the invention, the sensors may allow customers to save images, recordings and other media captured with the products. For example, a customer may take a picture using an SLR camera on display. The image captured by that SLR camera may then be displayed on the intelligent display 401 or touch panel 404 via the sensor connection to the external computer or intelligent display processor. The customer may then e-mail this picture to himself or herself as described below.

In another aspect of the invention, the display table or fixture 405 for displaying products may include an LED system that illuminates products on display in coordination with information that is displayed on the touch panels 404 or intelligent displays 401. For example, the touchscreens or intelligent displays may display multimedia about different products, such as product images, videos, sounds, or descriptions. As the touch panels 404 or intelligent displays 401 rotate through the multimedia of these products, the intelligent display 401, intelligent display processor 402, or touch panels 404 may send a signal to illuminate an LED beneath the product that is being displayed. For example, when the intelligent display or touch panel displays an image of an SLR camera being displayed on the product display table, an LED beneath that particular SLR camera may light up. In preferred embodiments of the invention, the LEDs may be a Phidget® Blue LED, connected to the intelligent display 401, intelligent display processor 402, or touch panels 404 via a Phidget® Interface or Network Interface Kit.

In one aspect of the invention, the intelligent displays 401, intelligent display processor 402, touch panels 404, wireless remotes 406, gesture and voice recognition sensors 402, video sensors 411, and ID and Bar code scanner 412 may be affixed to a modular Intelligent Display System (a.k.a. Intelligent Fixture). Heretofore, retail stores have typically designed and installed interactive retail fixtures that are unique to each retail layout space. For example, interactive retail fixtures built for fashion and department stores typically require designing a fixture and installing sensors that are unique to the physical layout of each store. For example, "Perch Displays" developed by Perch Interactive use projected light and motion sensors to display products positioned on retail tabletop counters. While these displays can sense when and where a product is touched and examined, the sensors must be installed based on the physical layout of the store, tabletop and products. Thus, vendors typically design an interactive fixture for every store, without reusing the designs for fixtures already created. According to one embodiment of the invention, components that comprise the interactive retail display 405 may be affixed to a modular intelligent fixture that can be reused in multiple stores with minimal redesign and installation. In embodiments of the invention, the components that customers interact with, such as the intelligent display 401, intelligent display processor 402, touch panels 404, wireless remote 406, gesture and voice recognition sensor 402, video sensor 411, and ID and Bar code scanner 412, may be affixed to a modular intelligent fixture as depicted in FIGS. 11-14. As FIGS. 12-16 illustrate, the fixtures are modular, allowing vendors to reuse the fixtures in multiple stores, with minimal redesign.

As discussed above, store representatives may have mobile devices, such as Advisor Tablets, to assist customers throughout the sales process. In embodiments of the present invention, the representative may use their mobile device to communicate with the touch panel 404 in the same manner as discussed above, with respect to representatives communicating to mobile devices owned by the customer. For example, representatives may communicate to the touch panels 404 or intelligent displays 401 using NFC enabled devices. In one embodiment, a representative may have an RFID enabled device, such as an RFID tag, that the representative may scan at a touch panel or intelligent display to identify himself or herself. The representative may be identified, for example, using by his or her employee ID, or name. After the representative is identified by the intelligent display or touch panel, the representative's identification information may be associated with the customer's current shopping session. For example, shopping session information, such as which items were added to a shopping cart, which items wish-listed, and which items were viewed by the customer may be saved by the intelligent display processor by communicating the information to the store server 407 and store receiver 408, or wirelessly communicating the information directly to the representative's mobile device. With the representative's information associated with the customer's shopping session information, the representative may bring the customer to other parts of the store and load the shopping information at touch panels or intelligent displays 401 throughout the store. In one embodiment of the invention, the representative may save this information, and then bring the customer to a different location in the store, such as a demonstration room with simulation apparatuses for simulating various different products. As described in more detail below the representative may then load the customer's shopping session information and simulate the performance of each product that was saved in the customer's shopping session.

In one aspect of the invention, the representatives may use their mobile devices to interact with the intelligent displays 401 or touch panels 404 and control what the customer views. For example, a representative assisting a customer may determine that a particular camera is best suited to a customer based on the customer's needs. The representative may then show information about the particular camera, such as pictures, videos, specifications, and reviews, on the intelligent display 401 or touch panel 404.

In one aspect of the invention, the representative's interaction with the customer, such as which products were recommended and what information was displayed, is captured by the intelligent display processor 403 and associated with the customer's shopping session. Associating this information with the shopping session allows the vendor to keep track of what was previously recommended and suggested to a customer, and which representative recommended or suggested these products. As discussed in more detail below, the customer may decide to save the shopping information and continue the shopping off-site through the vendor's online website, by scanning or sending the information to themselves via e-mail, or text message. This information may include information about the representative that assisted the customer in the store. In this way, if the customer later decides to purchase items suggested by the representative, the representative may be attributed with the sale of those items. Thus, vendors may use this information to track and analyze employee performance. For example, the vendor may determine from the sales records, that a particular representative exhibits higher closing ratios for particular products, such as cameras. The vendor may then use this information to optimize the assignment of representatives to customers. For example, the vendor may decide to assign that particular representative to customers seeking assistance with cameras. As another example, the vendor could determine that a representative does better with women and older people. Again, the vendor may use this information to assign the representative to assist with this particular audience of customers. Thus, the vendor may use this information to optimize the use of its sales force by aligning the representative with the customer audiences they are most effective with.

In another aspect of the invention, the representative may retrieve the customer's shopping session information from the intelligent display or touch panel in real-time while assisting the customer. In some embodiments of the invention, the shopping session information may include which products the customer viewed, which products are in the customer's shopping cart, or which products the customer added to a wish-list. The representative may then use this information to shape the conversation with the customer, and improve the assistance to the customer in the same manner as described above.

According to some embodiments of the invention, the representative may interact with the intelligent displays 401 or touch panels 404 from their Advisor Tablet or mobile device using point-to-point communications. For example, the intelligent displays 401, touch panels 404, Advisor Tablet, or representative mobile device may communicate via network sockets. An Advisor Tablet may, for example, send a network message to the particular socket address of a touch panel to display information about a particular product. The intelligent displays 401, touch panels 404, Advisor Tablet, or representative mobile device may be configured to listen on certain ports or addresses to receive commands from other devices such as the Advisor Tablets.

As described above, in one aspect of the invention, the vendor may bridge the gap between physical retail stores and alternative channels of commerce, such as online retail websites, and access information about the customer's out-of-store shopping history. In one embodiment of the invention, the customer's out-of-store shopping history, such as their online browsing history, may be saved by the vendor and associated with an identification code, such as an alphanumerical ID or barcode. For example, a customer browsing the vendor's online website at home may add several items to a shopping cart. The vendor may then save the items in the customer's shopping cart and associate the list of items with an ID, such as an alphanumeric code, or a barcode, such as a QR Code. The shopping information and ID may be saved in a remote database or server (not pictured). The customer may then bring this ID or barcode to the store and input the ID or barcode into the intelligent display or touch panel. The intelligent display or touch panel may then load the saved shopping cart items onto the screen, and allow the customer to continue the shopping experience with the intelligent display or touch panel.

In embodiments of the invention, the customer's out-of-store shopping history may be saved by associating the information with a barcode. Barcodes may be linear barcodes, or two-dimensional barcodes, such as DataMatrix codes, QR codes, Aztec codes, or Microsoft Tags. After the vendor has associated the customer's out-of-store shopping history with a barcode or ID, the vendor may then display the barcode or ID on the customer's browser for the customer to scan and save. For example, the vendor may associate the customer's shopping list with a QR code and display the QR code on the customer's browser. The customer may then scan and save the barcode with a mobile device, such as a smartphone or tablet.

In one aspect of the invention, after the customer saves the ID or barcode, the customer may then use this ID or barcode to reload the information that was associated with the ID or barcode, such as the contents of the customer's shopping cart. In one embodiment of the invention, the customer may input the ID on the vendor's online retail website to reload the information, such as the shopping cart contents. After inputting the ID or barcode into the online website, the vendor may retrieve the information associated with the ID or barcode from the database or server. In another embodiment, the customer may bring the ID or barcode into the vendor's store and scan the ID or barcode into the ID and barcode scanner 412, which is coupled to the intelligent display processor and intelligent display. After scanning the ID or barcode, the intelligent display processor 403 communicates with a store receiver to retrieve the information associated with the ID or barcode from a database or server.

In one embodiment, the out-of-store shopping information includes information such as which items the customer has viewed, which items they added to their shopping cart, items they have added to wish-lists, or which advertisements or promotions the customer may have clicked on. In other embodiments, this information may further include whether the customer received assistance from a representative, such as an online chat agent, while shopping. For example, a customer shopping online may ask questions to a representative via a chat or instant messaging interface. In other embodiments, the representative may also assist the customer by telephone or video chat while the customer is shopping. Information about what questions the customer asked, and what assistance the representative provided may also be captured and associated with the ID or barcode. This information may be used to later attribute any subsequent purchases by the customer to the representative, as described above.

In one aspect of the invention, customers may save shopping information from the customer's in-store shopping experience, and load the information elsewhere. For example, the customer's in-store shopping session, such as shopping cart contents, browsing history, and wish-list items may be saved by the vendor and associated with an ID or barcode. As described above, the information may further include which representatives assisted them, and which products they recommended or suggested. In this way, if the customer later decides to purchase items suggested by the representative, the representative may be attributed with the sale of those items. Customers may also use the information about the in-store representative in the event they return to the store and would like to return to the particular representative that assisted them.

In other embodiments, the customer may save their in-store shopping session information by inputting their personal information, such as e-mail address or phone number, into the intelligent display or touch panel. The intelligent display or touch panel may then send the saved shopping information to the customer by email or text message. In embodiments of the invention, the customer may input their personal information with a barcode, such as a QR code, that encodes their e-mail or phone information. In other embodiments of the invention, the shopping session may be wirelessly communicated to the customer using NFC enabled devices as described above. For example, a touch panel may wirelessly transmit the shopping session to a customer's smartphone via Bluetooth. The customer's mobile device may receive and save the information with a mobile app or by launching a mobile browser to download the vendor's mobile website.

According to some embodiments of the invention, the customer may save their shopping session from one part of a store and then reload this information in another part of the store. For example, a customer may browse through various speakers at an intelligent display 401 or touch panel 404, and save a list of speakers the customer viewed. (Alternatively, an Advisor may assist a customer browsing through speakers with their Advisor Tablet and save the customer's shopping session with their Advisor Tablet). The customer may then proceed to a different location in the store, such as a demonstration room that simulates the performance of the speakers offered by the vendor. At the demonstration room, the customer may then load the list of speakers the customer viewed, and compare the difference in the performance of each speaker. The vendor may simulate the performance of audio speakers using an audio simulation as described and/or claimed in U.S. Pat. Nos. 7,069,169 and 7,899,656, each entitled "Virtual Speaker Demonstration System and Virtual Noise Simulation" and assigned to Crutchfield Corp., and herein incorporated by reference in their entirety.

In one aspect of the invention, the customer's interaction with the intelligent display 401, touch panels 404, product displays 405, and wireless remotes 406 is captured and recorded by the vendor. For example, which products were viewed, added to a shopping cart, and/or wish-listed, throughout an entire day may be captured by the intelligent display processor and saved for later analysis. Other interaction information, such as how many times and how frequently customers approach a display may also be captured and recorded. Importantly, this information allows vendors to create analytics related to the use of the intelligent displays, touch panels, and the products being sold. For example, this information may be used to determine which products are viewed the most, or added to their shopping cart the most at an intelligent display or touch panel. This information may further indicate which representatives assist customers the most, and cause the most customers to purchase products or save their shopping session for later use. While analytics packages exist, these analytics packages are typically designed for analyzing a user's internet activity on a web browser, and generally do not apply to analyzing a customer's browsing activity on an intelligent display or touch panel in the store.

As described in more detail below, after browsing and reviewing products, the customer may also purchase the products from an intelligent display, touch panel, or with a representative's mobile device. In one embodiment, a representative's mobile device includes a magnetic stripe reader for reading a customer's payment card information. In other embodiments customers may input their payment information into the intelligent display or touch panels. After the payment has completed, the intelligent display processor may generate a pick list of the purchased items and communicate the pick list to the vendor's warehouse. Purchased items that are stocked in the warehouse may then be retrieved and delivered to the customer in the store. In other embodiments of the invention described in more detail below, the customer may also coordinate and schedule the delivery of purchased items.

Figure 5:
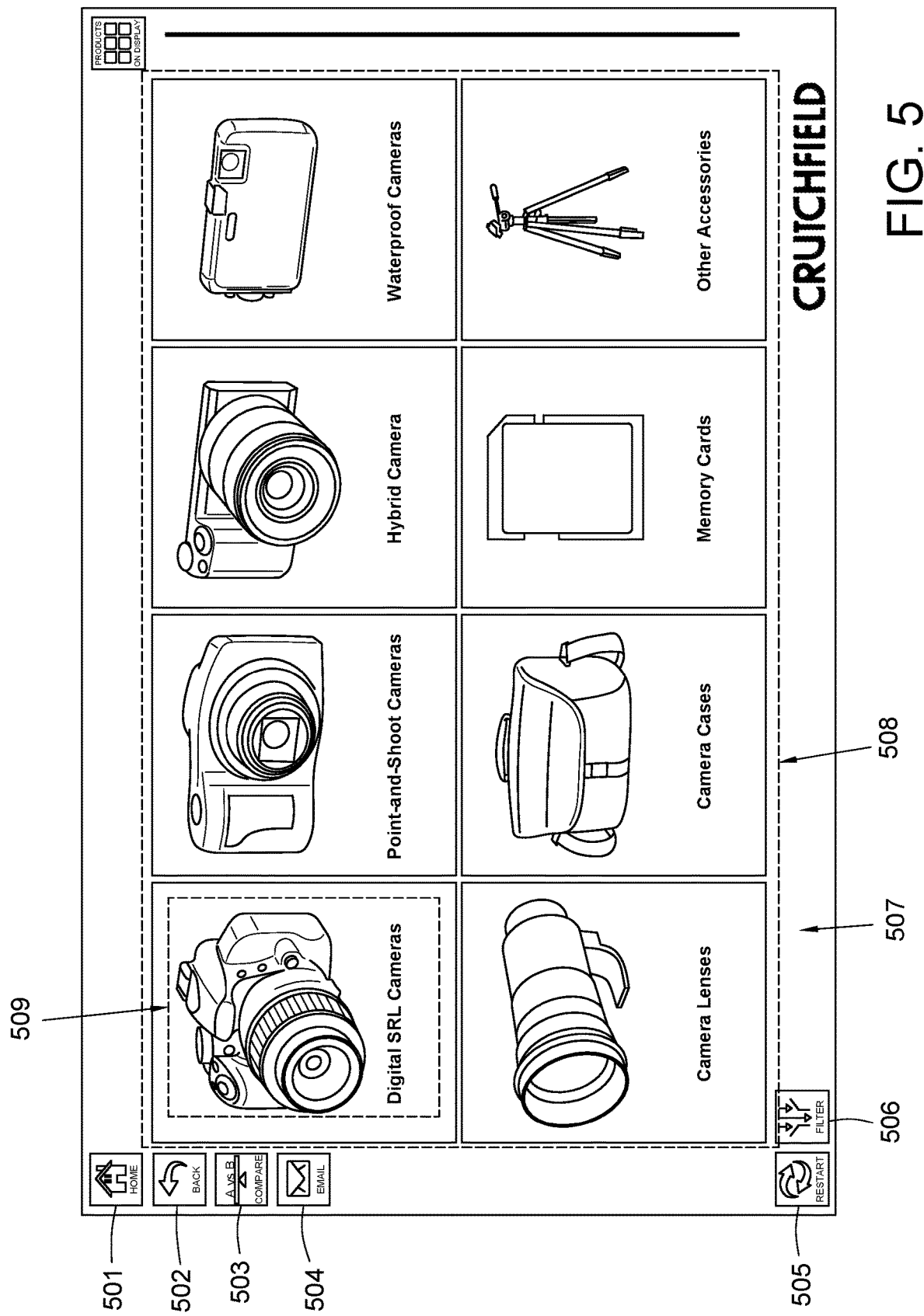
FIG. 5 is an illustration of a user interface for interacting with an intelligent display according to one embodiment of the invention.

FIG. 5 is an illustration of a user interface for interacting with elements of an intelligent display system according to one embodiment of the invention. The user interface may include a home icon 501, a back icon 502, a compare icon 503, an e-mail icon 504, a restart icon 505, a filter icon 506, an icon border 507, an intelligent screen interior 508 and intelligent screen tiles 509. The user interface may be the interface displayed on the touch panel or intelligent display components of the intelligent display system described in FIG. 4 above. Icons 501 through 506 are placed in an icon border 507 that is continuously visible, and may be accessed by customers at any time. Icons 501 through 507 enable the customer to input navigational commands for controlling what is displayed in the intelligent screen interior 508. For example, the home icon 501 enables a customer to return to the home screen of the intelligent display or touch panel; the back icon 502 enables a customer to return to the previous screen; the compare icon 503 enables a customer to compare different products; the email icon 504 enables a customer to e-mail himself or herself shopping session information stored at the touch panel or intelligent display as described above; the restart icon 505 enables a customer to reset and clear shopping session information stored at the touch panel or intelligent display as described above; and the filter icon 506 for filtering products according to customer defined criteria. In embodiments where the user interface is displayed on a touch panel, customers may interact with icons 501 through 506 by pressing the icons on the touch panel's touch screen. In embodiments where the user interface is displayed on an intelligent display, customers may interact with icons 501 through 506 using a wireless remote, keyboard, or by providing gesture and voice input through the gesture and voice sensor described above. The intelligent screen tiles 509 enable the customer to browse a category of products offered by the vendor. After selecting an intelligent screen tile 509, the user interface displays a screen of products associated with the selected product category in the interior 508.

According to one embodiment of the invention, the icons 501-506 and tiles 509 may be Apps or Tiles implemented in a touch design development platform, such as the Windows 8 development platform, using C++, C#, Visual Basic, Java, HTML, CSS, Javascript, XML, XAML, or similar programming languages. One advantage to implementing the icons and tiles with a touch design development platform, such as the Windows 8 development platform, is the ability to enable customers to provide input using touch or gestures. Another advantage to implementing the icons and tiles with a touch design development platform is the ability to implement a single user interface for different device types. For example, the same basic user interface may be implemented for both a touch panel and intelligent display.

Figure 6:
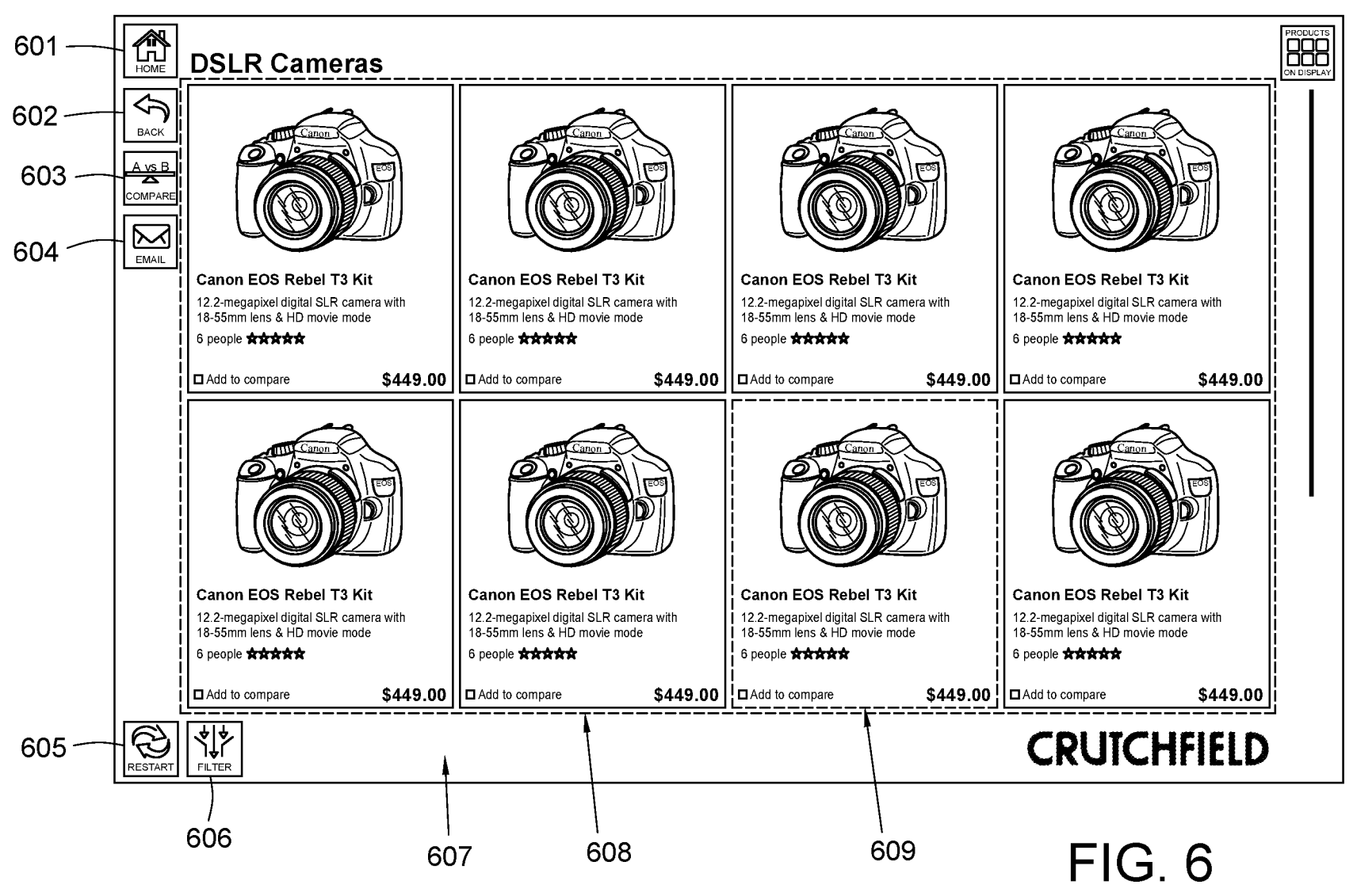

FIG. 6 is an illustration of a user interface for displaying vendor products in an intelligent display system according to one embodiment of the invention. Similar to the user interface described above, the user interface depicted in FIG. 6 may include a home icon 601, a back icon 602, a compare icon 603, an e-mail icon 604, a restart icon 605, a filter icon 606, an icon border 607, an intelligent screen interior 608 and intelligent screen tiles 609. According to the embodiment depicted in FIG. 6, the intelligent screen tiles 609 are tiles that represent the different brands and models of a particular category of a product. Selecting an intelligent screen tile 609 changes the screen interior 608 to display information about the particular brand and model of product selected. As described above, icons 601 through 606 may be placed in an icon border 607 and enable the customer to input navigational commands for controlling what is displayed in the intelligent screen interior 608.

In one embodiment, the intelligent screen tiles 609 may be tiles of the particular product category the customer has selected in the screen depicted in FIG. 5. For example, a customer selecting the Digital SLR Camera tile 509 may change the screen to display a variety of different Digital SLR Cameras, as depicted in FIG. 6.

Figure 7:
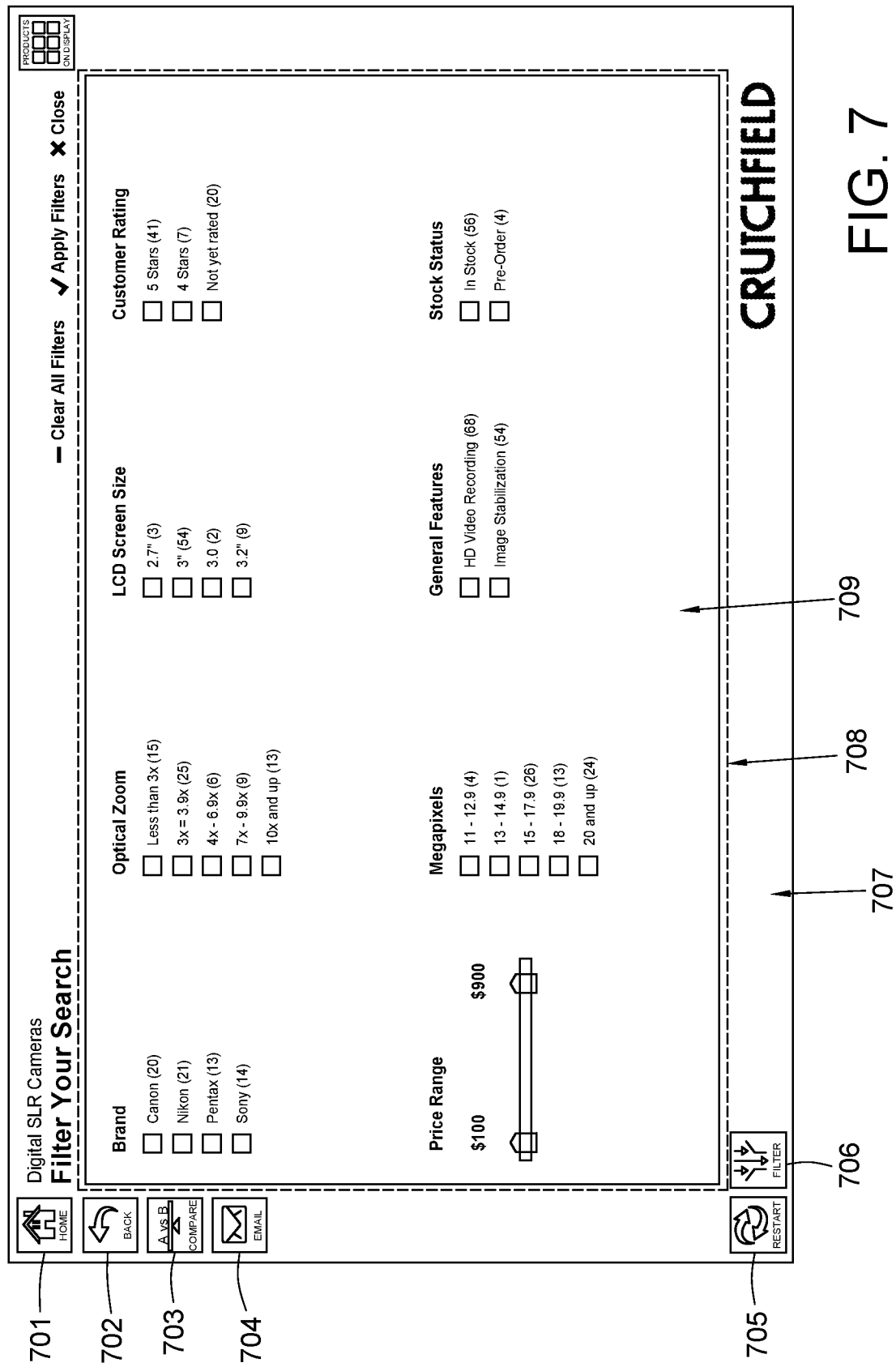
FIG. 7 is an illustration of a user interface for interacting with an intelligent display according to another embodiment of the invention.

FIG. 7 is an illustration of a user interface for filtering vendor products in an intelligent display system according to one embodiment of the invention. Similar to the user interface described above, the user interface depicted in FIG. 7 may include a home icon 701, a back icon 702, a compare icon 703, an e-mail icon 704, a restart icon 705, a filter icon 706, an icon border 707, an intelligent screen interior 708 and product filters 709. The user interface depicted in FIG. 7 allows customers to filter the products displayed in the intelligent screen interior. The user interface depicted in FIG. 7 may be displayed by selecting the filter icon 706.

According to embodiments of the invention, the customer may filter the products according to retail information such as brand, price, and stock status; technical specifications, such as optical zoom, megapixels, and screen size; and vendor-provided information, such as customer ratings, customer reviews, vendor ratings, and vendor reviews.

Figure 8:
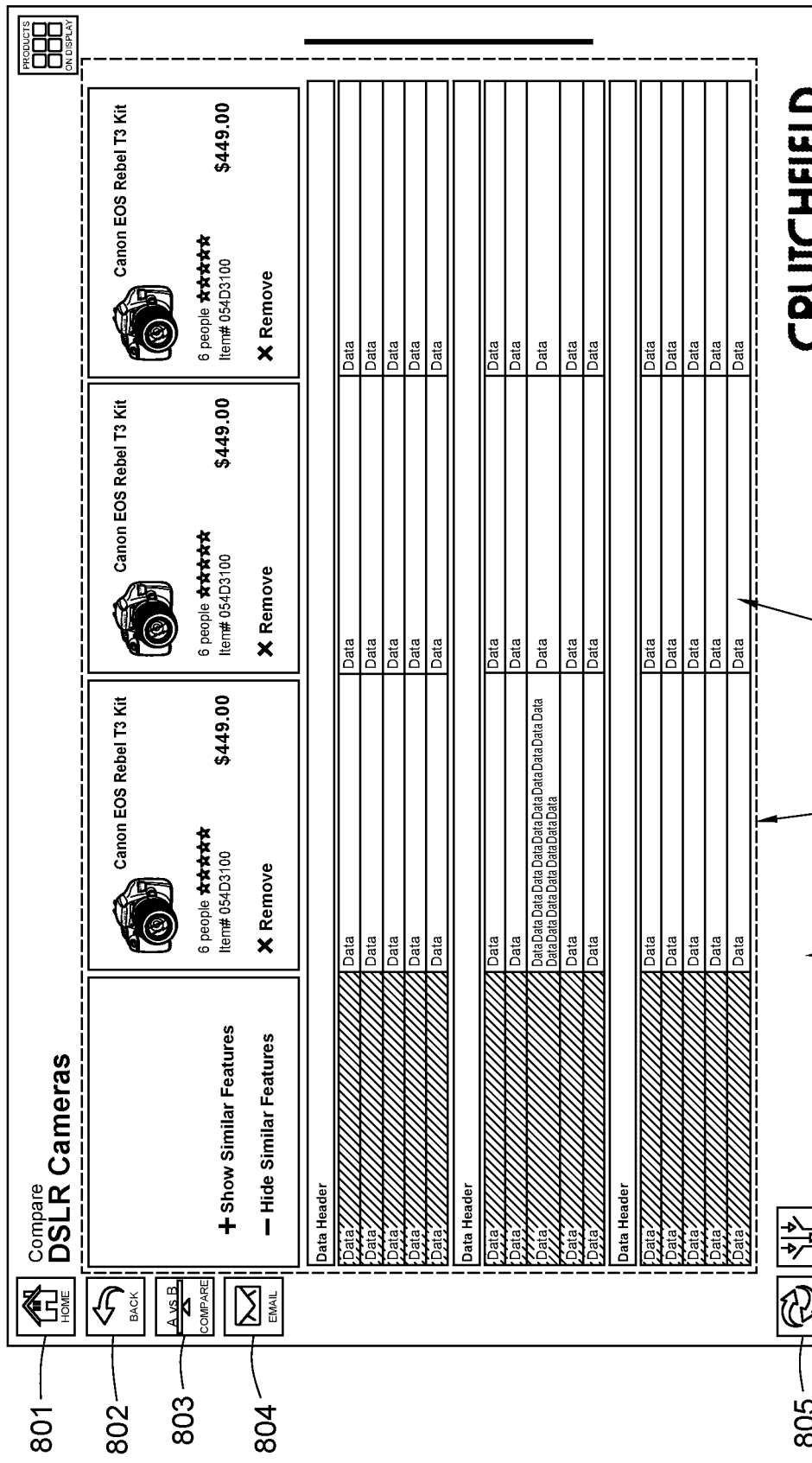
FIG. 8 is an illustration of a user interface for interacting with an intelligent display according to another embodiment of the invention.

FIG. 8 is an illustration of a user interface for comparing vendor products in an intelligent display system according to one embodiment of the invention. Similar to the user interface described above, the user interface depicted in FIG. 8 may include a home icon 801, a back icon 802, a compare icon 803, an e-mail icon 804, a restart icon 805, a filter icon 806, an icon border 807, an intelligent screen interior 808 and product information tables 809. The user interface depicted in FIG. 8 displays information tables 809 that allow customers to compare different products displayed in the intelligent screen interior 808. The user interface depicted in FIG. 8 may be displayed by selecting the filter icon 803.

According to embodiments of the invention, the information tables 809 enable a customer to compare the information between different products, such as retail information, technical specifications, and vendor-provided information, such as ratings and reviews.

Figure 9:
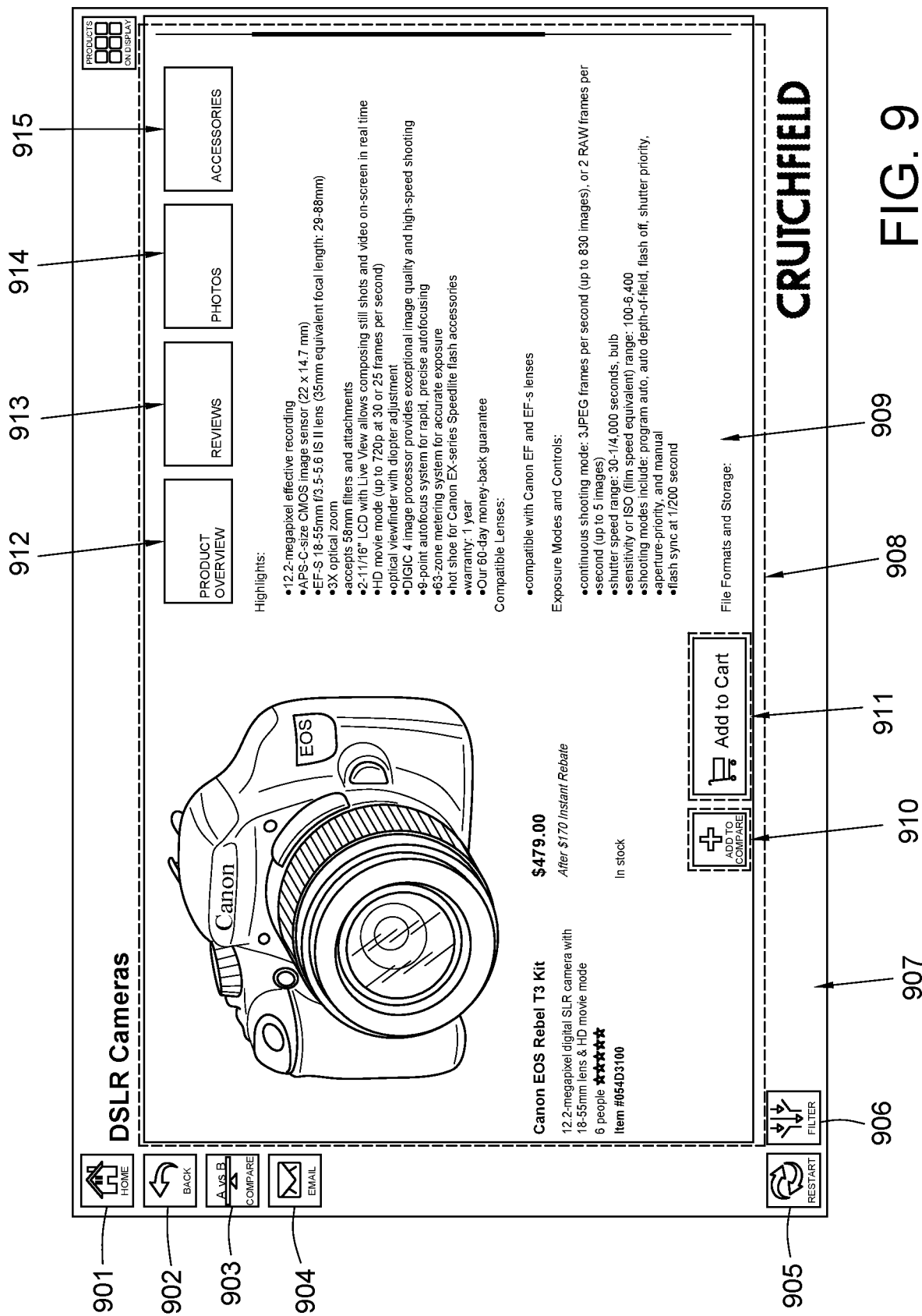
FIG. 9 is an illustration of a user interface for interacting with an intelligent display according to another embodiment of the invention.

FIG. 9 is an illustration of a user interface for viewing detail product information and making product purchases in an intelligent display system according to another embodiment of the invention. Similar to the user interface described above, the user interface depicted in FIG. 9 may include a home icon 901, a back icon 902, a compare icon 903, an e-mail icon 904, a restart icon 905, a filter icon 906, an icon border 907, and an intelligent screen interior 908. The user interface for viewing detailed product information may further include detailed product information 909, an "add to compare" icon 910, a purchase icon 911, a product overview menu 912, a reviews menu 913, a photos menu 914, and an accessories menu 915. The user interface depicted in FIG. 9 displays detail information 909 about a particular product in the intelligent screen interior 908. As FIG. 9 illustrates, the detailed product information may include product high-level descriptions of the product features, technical specifications, price, and stock status. More detailed information about the product may be accessed by selecting one of the product menus 912-915 displayed on the top of the screen. The user interface enables the customer to purchase the product by providing a purchase icon 911. Selecting the purchase icon adds the product to the customer's shopping cart, which is stored in the customer's shopping session, as discussed in more detail above. The user interface further enables the customer to compare the currently displayed product to other products, by selecting the "add to compare" icon 910. Selecting this icon adds the product to a product comparison table, as explained above with respect to FIG. 8.

Figure 10:
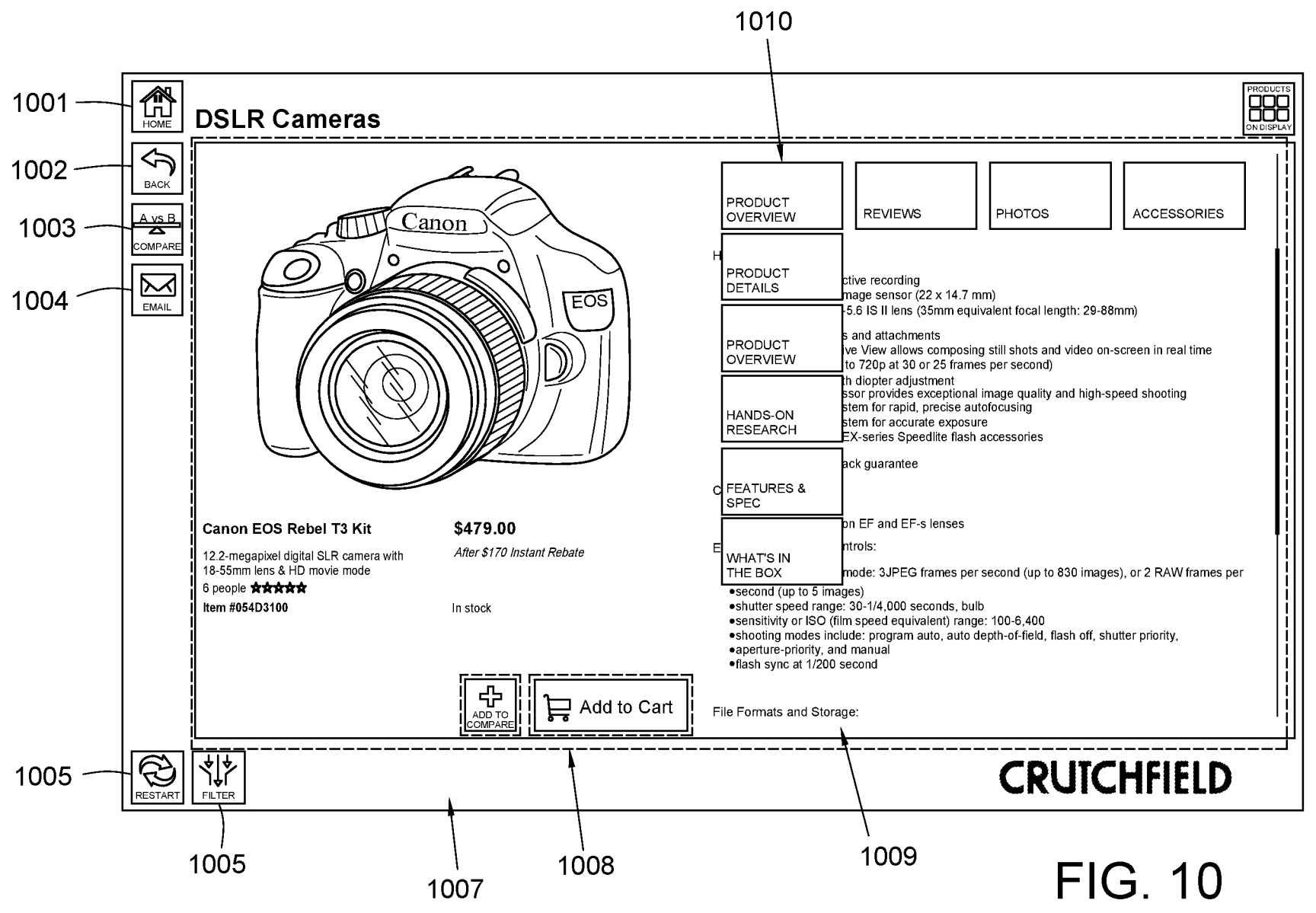

FIG. 10 is an illustration of a user interface for viewing detailed product information and purchasing products in an intelligent display system according to another embodiment of the invention. Similar to the user interface described above, the user interface depicted in FIG. 10 may include a home icon 1001, a back icon 1002, a compare icon 1003, an e-mail icon 1004, a restart icon 1005, a filter icon 1006, an icon border 1007, and an intelligent screen interior 1008. The user interface for viewing detailed product information may further include expandable menus 1010. The expandable menus allow customers to accessed detailed information about a specific topic. As FIG. 10 illustrates, the expandable menus may enable customers to access detailed information such as the research conducted on the product, a complete list of features and specifications of the product, or what materials are typically shipped with the product (shown as "what's in the box").

Figure 11:
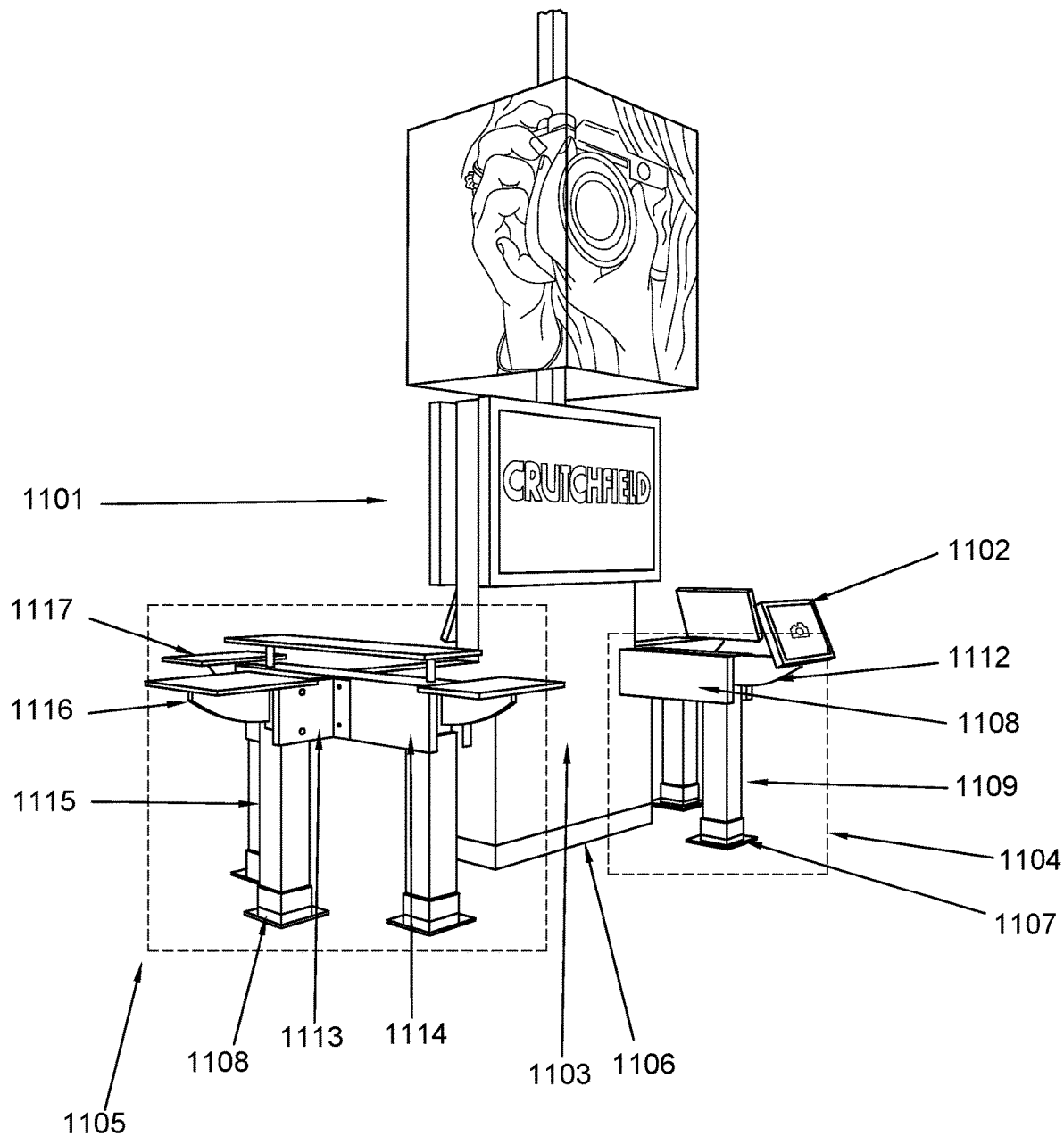
FIG. 11 is an illustration of a modular intelligent display system for affixing intelligent display system components according to one embodiment of the invention.

FIG. 11 is an illustration of a modular intelligent display assembly for affixing intelligent display system components according to one embodiment of the invention. A modular intelligent display assembly for affixing intelligent display system components may include an intelligent display 1101, touch panel 1102, intelligent display stand 1103 for supporting an intelligent display, touch panel stand 1104 for supporting touch panels, product stand 1105 for supporting products, intelligent display base 1106 for supporting the intelligent display stand, touch panel base 1107 for supporting the touch panel stand, and product base 1108 for supporting the product stand. The intelligent display stand 1103, touch panel stand 1104, and product stand 1105 may be supported by their respective bases, intelligent display base 1106, touch panel base 1107, and product base 1108. For reasons that will become apparent from the description below, the intelligent display stand 1103, touch panel stand 1104, and product stand 1105 allow vendors to support and assemble the elements of the intelligent display system, such as the products, the intelligent displays, and touch panels, in a modular fashion, and into an integrated retail unit.

An intelligent display stand 1103 is generally a rectangular-shaped stand vertically disposed and extending upwardly from an intelligent display base 1106 for stabilizing and securing the stand to the floor. Generally, the intelligent display stand 1103 may have two opposing broadsides for mounting wide-screen displays such as the flat-screen televisions described above, and two opposing narrow lateral sides. The intelligent display 1101 may be affixed to the intelligent display stand 1103 with a television wall mount connecting the backside of the wide-screen display to the broadside of the intelligent display stand 1103 as shown in FIG. 11. In preferred embodiments of the invention, the intelligent displays may be mounted to the intelligent display stands with Sanus® LL11-B1 Wall Mounts. The intelligent display stand is secured to a base 1106 that stabilizes and secures the intelligent display stand 1103 to the floor. In embodiments of the invention, the intelligent display stand 1103 may be hallowed to provide for an encasing for electrical connections to the intelligent display 1101, and sensors (not shown), such as the gesture, voice, and video sensors described above. A touch panel stand 1104 may include a first beam 1108 horizontally disposed, extending laterally from the intelligent display stand 1103. According to some embodiments of the invention, the first beam 1108 may be affixed to the intelligent display stand 1103 by suitable mechanical fastening means, such as a plate or bracket with bolts and nuts, adhesive bonding, or any other suitable process. The first beam 1108 may be supported by a second beam 1109 vertically disposed, extending upwardly from the floor. The second beam 1109 may be secured to a base 1107 that stabilizes and secures the second beam 1109 to the floor. According to some embodiments of the invention, the second beam 1109 may be fastened to the first beam 1108 suitable mechanical fastening means, such as a plate or bracket with bolts and nuts, adhesive bonding, or any other suitable process. Generally, the first and second beams 1108 and 1109 are rectangular-shaped. The end of the first beam 1108 opposite the intelligent display 1103 may be attached to a mount 1112 for supporting a touch panel 1102. In preferred embodiments of the invention, the mounts for supporting a touch panel may be Sanus VisionMount VST15-B1 Tilting Wall Mounts. The mount may be attached to the first beam 1108 by suitable mechanical fastening means, such as a plate or bracket with bolts and nuts, adhesive bonding, or any other suitable process. According to some embodiments, the mount 1112 may be shaped to have a fin-like or half-trapezoidal shape, as depicted in the Figure. The mount 1112 may be flexibly affixed to the backside of a touch panel 1102 with a suitable mechanical fastening means, such as a plate or bracket with bolts and nuts, adhesive bonding, or any other suitable process, to allow customers to adjust the angle of the touch panel 1102.

Product stand 1105 enables customers to interact with physical demonstrative products in conjunction with other elements of the intelligent display system as described above. A product stand 1104 may include a first beam 1113 horizontally disposed, extending laterally from the intelligent display stand 1103. The first beam 1113 may be affixed to the intelligent display stand 1103 by suitable mechanical fastening means, such as a plate or bracket with bolts and nuts, adhesive bonding, or any other suitable process. The first beam 1113 may be supported by a second beam 1115 vertically disposed, extending upwardly from the floor. The second beam 1115 may be fastened to the first beam 1113 by suitable mechanical fastening means, such as a plate or bracket with bolts and nuts, adhesive bonding, or any other suitable process. The second beam 1115 may be secured to a base 1108 that stabilizes and secures the second beam 1115 to the floor. A third beam 1114 may be traversely affixed across the end of the first beam 1113, and similarly supported by vertically disposed beams 1115 extending upwardly from the floor. The end of the first beam 1113 opposite the intelligent display 1103, and the ends of the third rectangular beam 1114 may be attached to mounts 1116 for supporting a platform 1117 that enables vendors to display and demonstrate physical products. The mount may be attached to the first and third beams 1113 and 1114, by suitable mechanical fastening means, such as a plate or bracket with bolts and nuts, adhesive bonding, or any other suitable process. Generally, the first, second, and third beams 1113, 1114, and 1115 are rectangular-shaped. According to some embodiments, the mount 1116 may be shaped to have a fin-like or half-trapezoidal shape, as depicted in the Figure.

The intelligent display stand 1103, touch panel stand 1104, and product stand 1105 may be constructed of any suitable material in any suitable manner. Some variations may be comprised of a polymeric material that is filled or unfilled. Other variations may be comprised of a composite wood product. Yet other variations may be comprised of a composite material such as a polymeric base including a high loading of fiberglass. Variations may also be comprised of metallic materials. In certain variations the stands are integrally formed using a molding process such as injection molding or rotomolding. In other variations the stands may comprise separate pieces or sections that are joined together by mechanical fastening adhesive bonding welding or any other suitable process.

One advantage to affixing the intelligent display system components to a modular intelligent display assembly is that the intelligent display stand 1103, touch panel stand 1104, and product stand 1105 may be reused in a modular manner to adapt to retail spaces of varying different shapes and sizes with relatively little effort. In one aspect of the invention, the stands are modular by allowing the vendor to link each stand to multiple other stands. For example, a touch panel stand 1104 may be linked to two additional touch panel stands, by adjoining a new touch panel stand 1104 at the end of each lateral beam 1108. In another aspect of the invention, the product stand 1105 and touch panel stand 1104 may be assembled in different spatial configurations. For example, in one embodiment, a series of product stands may be linked together to form an L-shape; a first series of product stands may be linked together in one direction, for example from left-to-right, and connected to a second series of product stands linked together in another direction, for example from forward to backward. According to other embodiments, the product stand 1105 and touch panel stand 1102 may be adjoined to the narrow sides of the intelligent display stand 1103. In other embodiments, the product stand 1105 and touch panel stand 1104 may be adjoined to the broad sides of the intelligent display stand 1103. In another aspect of the invention, the dimensions of the intelligent display stand 1103, touch panel stand 1104, and product stand 1105 are easily scalable, allowing vendors to adjust the dimensions these elements to fit retail spaces of varying different sizes.

Another advantage to affixing the intelligent display system components to a modular intelligent display assembly is that multiple customers may interact with different elements of the intelligent display system simultaneously. For example, according to some embodiments of the invention, the product stand 1105 and touch panel stand 1104 may be adjoined laterally to the intelligent display stand 1103, enabling one customer to interact with a touch panel 1102 while another customer may interact with the intelligent display 1101.

Figure 12:
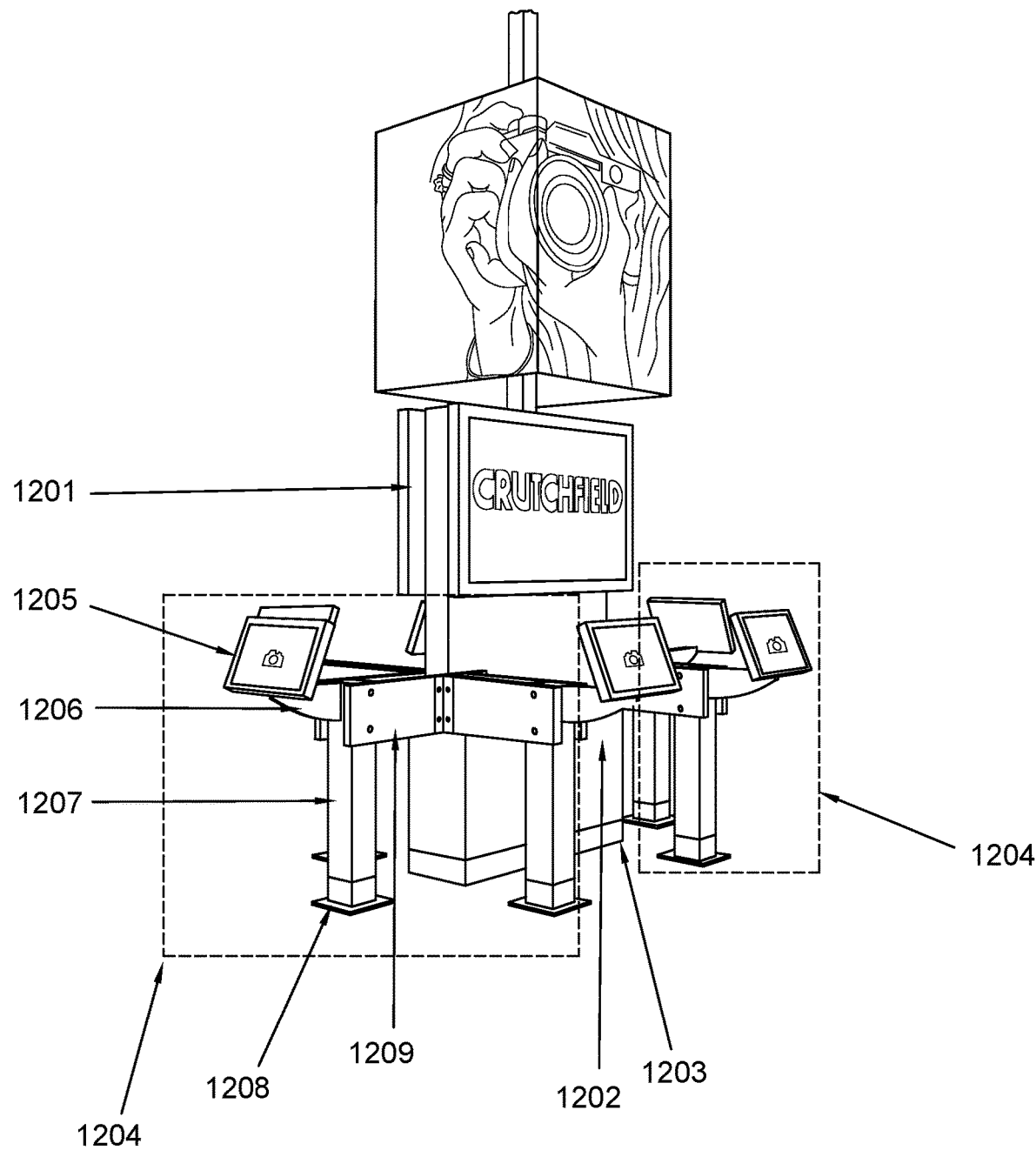
FIG. 12 is an illustration of a modular intelligent display system for affixing intelligent display system components according to another embodiment of the invention.

FIG. 12 illustrates how the modular intelligent display system assembly may be configured with any number or combination of stands. For example, FIG. 12 includes an intelligent display 1201, intelligent stand 1202, and base 1203, similar to the intelligent display, stand and base described above with respect to FIG. 11. The system in FIG. 12 further includes a touch panel stand 1204 similar to the touch panel stand described above with respect to FIG. 11. The touch panel stand 1204 may include a first beam 1209 horizontally disposed, extending laterally from the intelligent display stand 1202. According to some embodiments of the invention, the first beam 1209 may be affixed to the intelligent display stand 1202 by suitable mechanical fastening means, such as a plate or bracket with bolts and nuts, adhesive bonding, or any other suitable process. The first beam 1209 may be supported by a second beam 1207 vertically disposed, extending upwardly from the floor. The second beam 1207 may be secured to a base 1208 that stabilizes and secures the second beam 1207 to the floor. According to some embodiments of the invention, the second beam 1207 may be fastened to the first beam 1209 by suitable mechanical fastening means, such as a plate or bracket with bolts and nuts, adhesive bonding, or any other suitable process. Generally, the first and second beams 1207 and 1209 are rectangular-shaped. The end of the first beam 1209 opposite the intelligent display 1202 may be attached to a mount 1206 for supporting a touch panel 1205. The mount may be attached to the first beam 1209 by suitable mechanical fastening means, such as a plate or bracket with bolts and nuts, adhesive bonding, or any other suitable process.

In embodiments of the invention, the combination of the first beam 1209, second beam 1207, base 1208, mount 1206, and touch panel 1205 may be adjoined laterally to the narrow side of the intelligent display stand 1202, as well as adjoined to the front and back facing broad sides of the intelligent display stand 1202.

In contrast to the system depicted in FIG. 11, the intelligent display stand 1202 may be laterally adjoined by a touch panel stand 1204 on each side. The touch panel stand may be adjoined to the intelligent display stand in the same manner as described above with respect to FIG. 11. According to other embodiments of the invention, the intelligent display stand 1202 may adjoined by product stands on each side. In other variations, different combinations of touch panel stands and product stands may be used.

Figure 13:
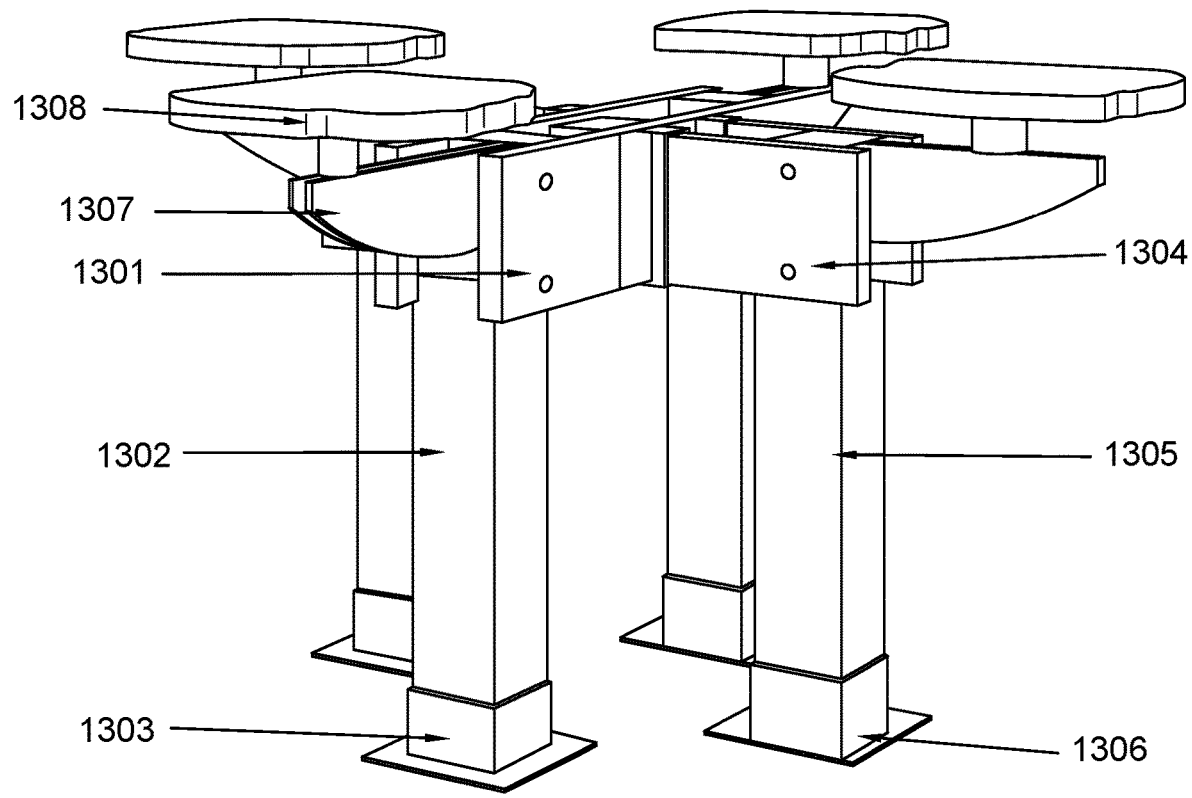
FIG. 13 is an illustration of a modular intelligent display system for affixing intelligent display system components according to another embodiment of the invention.

FIG. 13 is an illustration of a modular intelligent display system assembly according to another embodiment of the invention. The system in FIG. 13 may include a first horizontal beam 1301, supports 1302 for supporting the opposing ends of the first horizontal beam 1301, support bases 1303 for stabilizing and securing supports 1302 to the floor, a second horizontal beam 1304 traverse to the first horizontal beam 1301, supports 1304 for supporting the opposing ends of the second horizontal beam 1304, support bases 1306 for stabilizing and securing supports 1305 to the floor, mounts 1307 attached to the outward facing ends of the first and second beams 1301 and 1304, and platforms 1308 for displaying physical products to customers. The first beam 1301 may be horizontally disposed, supported on each opposing end by a vertically disposed support beam 1302 extending upwardly from bases 1303 grounded to the floor. According to some embodiments of the invention, the support beams 1302 may be fastened to the first beam 1301 by suitable fastening means, such as a metal plate or bracket, and screws, bolts and nuts, or bonding adhesive. A second beam 1304 may horizontally traverse the center of the first beam 1301, and may similarly be supported by support beams 1305 at opposing ends of the second beams 1304, which extend upwardly from bases 1306 grounded to the floor. The ends of the first beam 1301, and the ends of the second beam 1304 may be attached to mounts 1307 for supporting a platform 1308 that displays physical demonstrative products. The mount may be attached to the first and second beams 1301 and 1304, by suitable fastening means, such as plates or brackets, and screws, nails, or bonding adhesive. According to some embodiments, the mounts 1307 may be shaped to have a fin-like or half-trapezoidal shape, as depicted in the Figure.

The stand depicted in FIG. 13 provides a fixture for vendors to display physical products in a manner that is integrated into the intelligent display system. Vendors may place physical products on platforms 1308 for customers to examine and interact with. As described above, an intelligent display (not pictured) may use various sensors, such as magnetic or weight sensors, to detect which product a customer is interacting with, and display information related to that product. According to some embodiments of the invention, the product stand depicted in FIG. 13 may be adjoined to an intelligent display, as illustrated in FIG. 11. In other embodiments, the product stand may be free-standing, as depicted in FIG. 13. Vendors may preferably place the free-standing stand in close proximity to an intelligent display, to enable the intelligent display to engage with customers interacting with the physical products being displayed, as described above. The stand depicted in FIG. 13 may communicate information about which products a customer is interacting, using a wireless or wired connection, as described above.

In one embodiment of the invention, the platforms 1308 may be rectangular-shaped. Other variations may include oval, circular, trapezoidal or similar shapes. In some embodiments of the invention, the platform 1308 may extend along the entire length of the first or second horizontal beams 1301 or 1304, as described in more detail below.

Similar to elements depicted in FIG. 11, the beams 1301, 1302, 1304, 1305, mounts 1307, and platforms 1308 may be constructed of any suitable material in any suitable manner. Some variations may be comprised of a polymeric material that is filled or unfilled. Other variations may be comprised of a composite wood product. Yet other variations may be comprised of a composite material such as a polymeric base including a high loading of fiberglass. Variations may also be comprised of metallic materials. Certain variations are integrally formed using a molding process such as injection molding or rotomolding. Other variations may comprise separate pieces or sections that are joined together by mechanical fastening adhesive bonding welding or any other suitable process.

Figure 14:
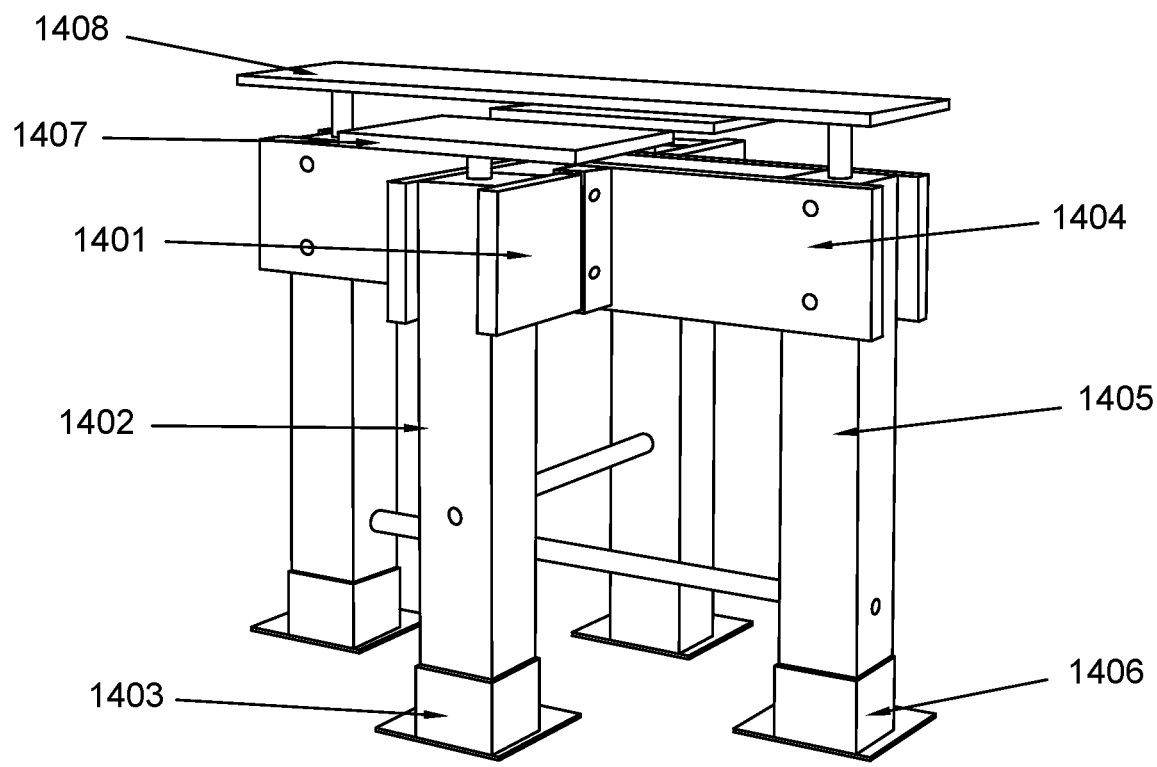
FIG. 14 is an illustration of a modular intelligent display system for affixing intelligent display system components according to another embodiment of the invention.

FIG. 14 is an illustration of a modular intelligent display system for affixing intelligent display system components according to another embodiment of the invention. Similar to the system illustrated in FIG. 13, the system depicted in FIG. 14 may include a first horizontal beam 1401, supports 1402 for supporting the opposing ends of the first horizontal beam 1401, support bases 1403 for stabilizing and securing supports 1402 to the floor, a second horizontal beam 1404 traverse to the first horizontal beam 1401, supports 1404 for supporting the opposing ends of the second horizontal beam 1404, support bases 1406 for stabilizing and securing supports 1405 to the floor, a first platform 1407 attached to the outward facing ends of the first beam 1401, and a second platform 1408 attached to the second beam 1404 for displaying physical products to customers. The first beam 1401 may be horizontally disposed, supported on each opposing end by a vertically disposed support beam 1402 extending upwardly from bases 1403 grounded to the floor. According to some embodiments of the invention, the support beams 1402 may be fastened to the first beam 1401 by suitable fastening means, such as a metal plate or bracket, and screws, bolts and nuts, or bonding adhesive. A second beam 1404 may horizontally traverse the center of the first beam 1401, and may similarly be supported by support beams 1405 at opposing ends of the second beams 1404, which extend upwardly from bases 1406 grounded to the floor. The ends of the first beam 1401, and the ends of the second beam 1404 may be attached to mounts 1407 for supporting a platform 1408 that displays physical demonstrative products. The mount may be attached to the first and second beams 1401 and 1404, by suitable fastening means, such as plates or brackets, and screws, nails, or bonding adhesive. According to some embodiments, the mounts 1407 may be shaped to have a fin-like or half-trapezoidal shape, as depicted in the Figure.

According to one aspect of the invention, the platforms 1407 and 1408 may be of varying different sizes and shapes. For example, as FIG. 14 illustrates, the second beam 1404 may support a platform 1408 that extends along the entire length of the beam. This enables vendors to display products of varying different sizes and types.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Mobile computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or iOS operating systems, Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Further embodiments of the present invention are directed to a two-way, server-side management tool, referred to as "Passport," that provides the shopper with a personalized shopping experience and seamless transitions between all customer experiences on any device the customer chooses to use (current and future), whether it is a desktop, mobile device, or store device, and regardless of whether it is a website, App, etc. The Passport tool may also provide the retailer's sales advisors with data relevant to understanding the customer's needs and buying behavior, including purchase history, recent activity, tutorials related to topics of interest to the customer, etc. And, the Passport tool may further facilitate collecting and organizing data obtained from shopper behavior to be used in marketing analytics.

According to embodiments of the present invention, Passport achieves the above functions by controlling what information the retail merchant collects, retrieves, collates and disseminates in order to provide the finest personalized shopping experience. The controlled dissemination is made at one level to the shopper and at another level to the sales advisor. For the shopper, Passport organizes the digital tools that allow for personalized product solutions while seamlessly traveling between Apps, websites, interactions with the retail merchant via various communication channels (for example, phone, chat or email) and technology-enabled store devices (e.g., intelligent fixtures, virtual listening rooms, smart kiosks, etc.). The Passport tool may also enable operational functions (e.g., checkout, post-sale service scheduling, etc.). Passport may allow any advisor assisting a customer to retrieve and/or be pushed relevant information pertaining to that particular customer in order to facilitate more personalized assistance based on data known about the customer and through the use of predictive logic. For the company's marketing function, Passport may collect and organize key analytics.

Currently, retailers employ a number of schemes for shopper and customer accounting. For example, for a retailer's website, one or more of the following shopper accounting schemes may be used. An encoded cookie, referred to as "System ID," may be placed on an online shopper's computer. The System ID relates to the computer (on which the System ID may remain for 365 days) and not to any browsing history. If multiple people use the same machine, and in the absence of other information (e.g., email address), the System ID does not identify the shopper. A derivative of System ID is referred to by one retailer as "Connect ID." Session ID, which is another encoded cookie that could be placed on a shopper's machine, relates to the browsing history of the individual shopper within the past two hours or as long as the shopper remains actively connected to the retailer's website. In the absence of other information (e.g., email address), the Session ID does not identify the shopper.

For intelligent fixtures in a retailer's physical store(s) (or kiosks or showrooms), similar schemes of System ID and Session ID could also be employed. For the intelligent fixtures, a System ID may be encoded data received from a fixture's computer, which only relates to the machine and not to browsing history. If multiple people use the same intelligent fixture, there is no way to distinguish between them. In the absence of other information (e.g., email address), the System ID of the intelligent fixture does not identify the shopper. The System ID is defined by the period between when the intelligent fixture PC starts up to when it shuts down. For the intelligent fixtures, a Session ID is encoded data received from a fixture's computer, which relates to the browsing history of an individual shopper between the time that shopper selects "touch" and "restart." If "restart" is not selected within a certain time frame, the session will time out. In the absence of other information (e.g., email address), the Session ID does not identify the shopper. The shopper can be identified when an email address is entered, or by scanning a QR code, or with other identification schemes.

As compared to the general "shopper" population, which include many prospects who may have never made any purchases, a retailer's "customers" may be those who have already made purchases or are in the process of completing purchase transactions. The retailer may be currently employing any one or more of the following schemes of customer accounting. For example, a rewards card number may be tied to a generated number that requires an email address. A customer with multiple Rewards Cards will need multiple corresponding email addresses. A CID number may be a generated number that is tied to a customer's physical address information. The CID may be the main depository of customer information. However, the CID does not contain any session tracking data. My Account is another customer accounting scheme which requires an email address and a password. A control number associated with My Account is internal and not transparent to the customer. My Account may contain the customer's physical address and payment information as well as order history and other information relative to their experience with the retailer (e.g., Master Sheets, Manuals, Advisor, etc.).

According to various embodiments of the present invention, operation of the Passport tool with respect to each individual customer/shopper may be controlled by a unique identifier that links to the customer/shopper information in the retailer's other accounts (e.g., System ID, Session ID, Connect ID, Rewards Card, CID, and My Account). Passport may verify and optimize the complete virtual shopping cart process including, for example, the pre-selection of speakers to be demonstrated in the virtual listening rooms and/or at headphone kiosks. Passport may manage cart maintenance, email optimization and homepage optimization across customer devices. Furthermore, Passport may facilitate customer operational functions (e.g., checkout, post-sale service scheduling, etc.). Additionally, the Passport tool may provide sales advisors with relevant information about the shopper and, through the use of predictive logic, help guide the sales advisor through the sales process. And, the Passport tool may enable a more effective system of managing marketing analytics.

With the Passport tool, a retailer may be able to (a) track or log consumer activities on its website before they ever step into a store and (b) link the logged online activities to the person once he/she enters the store. This allows the online activity to be linked with consumer activity in the store. When a shopper enters the store, some data is used to detect the shopper and link him/her to the online log. For example, an intelligent fixture, beacon detector, or other store devices could detect the shopper's presence by sensing his/her mobile device, or causing him/her to read a QR code, perform a biometric scan, or enter an email address, for example, at the fixture, etc. As a result, regardless of the customer touch point or communication channel, the retailer can effectively unify and enhance the shopping experience and create more opportunity for sales.

Figure 15:
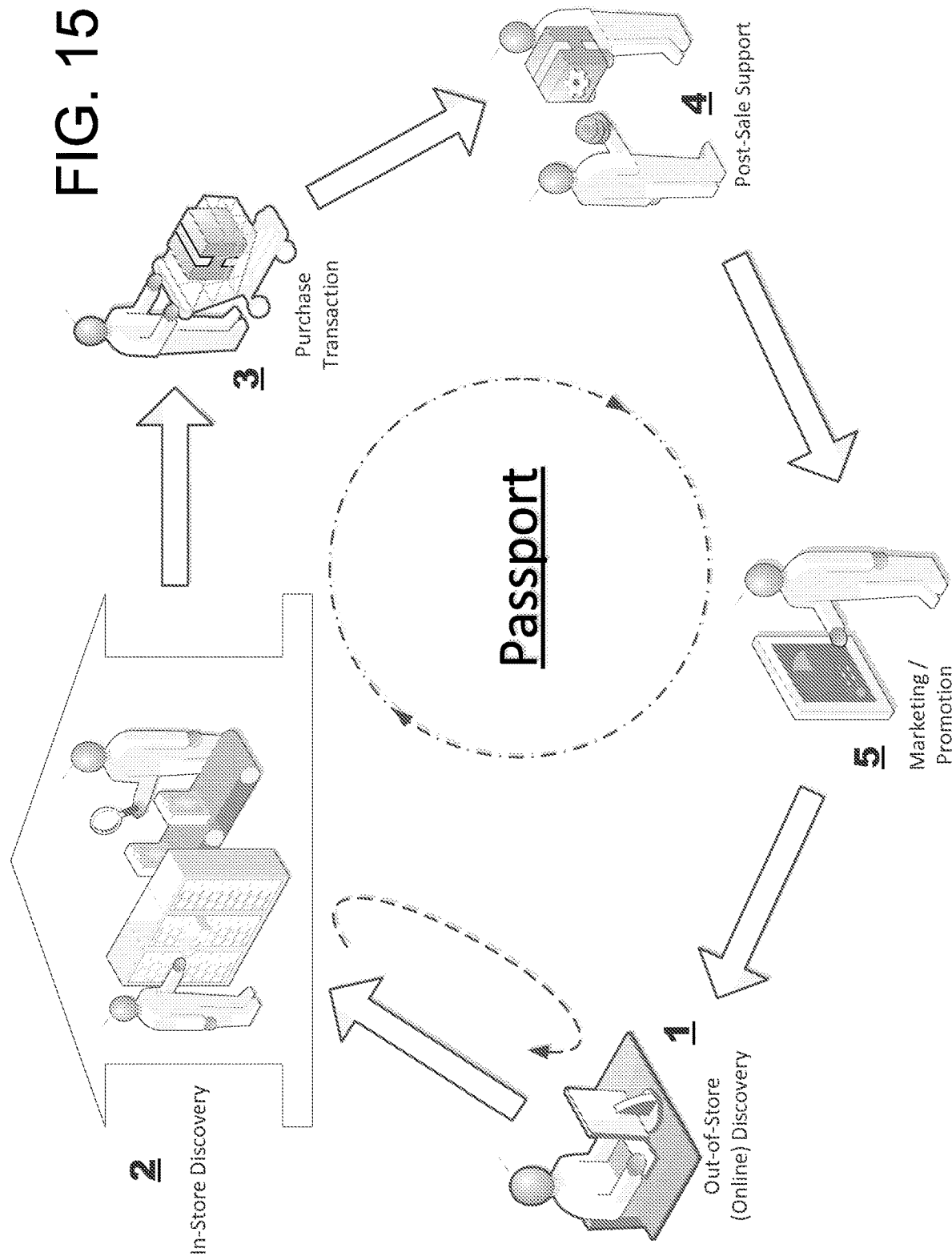
FIG. 15 is a block diagram illustrating the use of a Passport tool in providing an improved retail shopping experience according to an embodiment of the present invention.

FIG. 15 is a block diagram illustrating the use of a Passport tool in providing an improved retail shopping experience according to an embodiment of the present invention.

As shown in FIG. 15, from the moment a retail shopper starts his/her product discovery ("Out-of-Store (Online) Discovery" 1), for example, by researching a product or product category online, the Passport tool is to be involved in identifying the shopper and his/her interest, keeping track of the interactions with a retailer's website and sales personnel, and/or making recommendation of relevant information and products.

As the shopper moves on to research the product(s) in the retailer's physical store, the Passport tool facilitates a smooth transition to In-Store Discovery (2) by linking the shopper's Out-of-Store Discovery (1) session and using that and other shopper-specific information to provide customized data, guidance, and recommendations concerning the contemplated purchase. Sometimes, the Out-of-Store Discovery (1) and In-Store Discovery (2) sessions may be repeated a few times before any final purchase decision is made and carried out. The shopper's Passport account may be used to track and transition among these sessions and to organize the information collected therefrom for personalized shopping assistance.

When the shopper reaches the Purchase Transaction (3) stage, the Passport account may again be employed for arranging check-out, payment, delivery, installation, and/or any other related transactional functions. The Passport account may provide a digital wallet function to fill in all the necessary payment and personal data. In connection with a newly purchased product, Passport may automatically submit product or warranty registration on behalf of the shopper and collect all warranty information in his/her Passport account.

For Post-Sale Support (4), all relevant or helpful product literature, such as manuals, guides, or other documentation, may be automatically collected into the shopper's Passport account, and all post-sale interactions with the retailer's store, website, or support staff may be recorded in connection with the Passport account. Product recall, software update, routine maintenance notifications may be automatically directed to the shopper based on product purchases recorded in the Passport account.

Furthermore, the retailer may leverage the Passport account information for Marketing/Promotion (5). The shopper's purchase history and product discovery history, as well as many other personal data, may reveal a lot about which products the shopper needs or wants. Therefore, a number of targeted marketing or promotion leads may be generated and presented to the shopper based on his/her Passport account data.

Thus, throughout an entire shopping cycle and at every point of contact with the retailer, the shopper/customer may be engaged by the Passport system. The Passport account ensures that the shopper's initial interest in any product gets the retailer's attention, that the shopper's product discovery process is seamlessly integrated whether it takes place online or in store, and that the shopper's interactions with the retailer's servers, intelligent displays/fixtures, or personnel are monitored and fruitful. The potency of the Passport account extends well beyond the moment when a purchase is completed and further into various post-sale functions and activities, may facilitate targeted marketing and promotion which can lead to more future sales.

Figure 16:
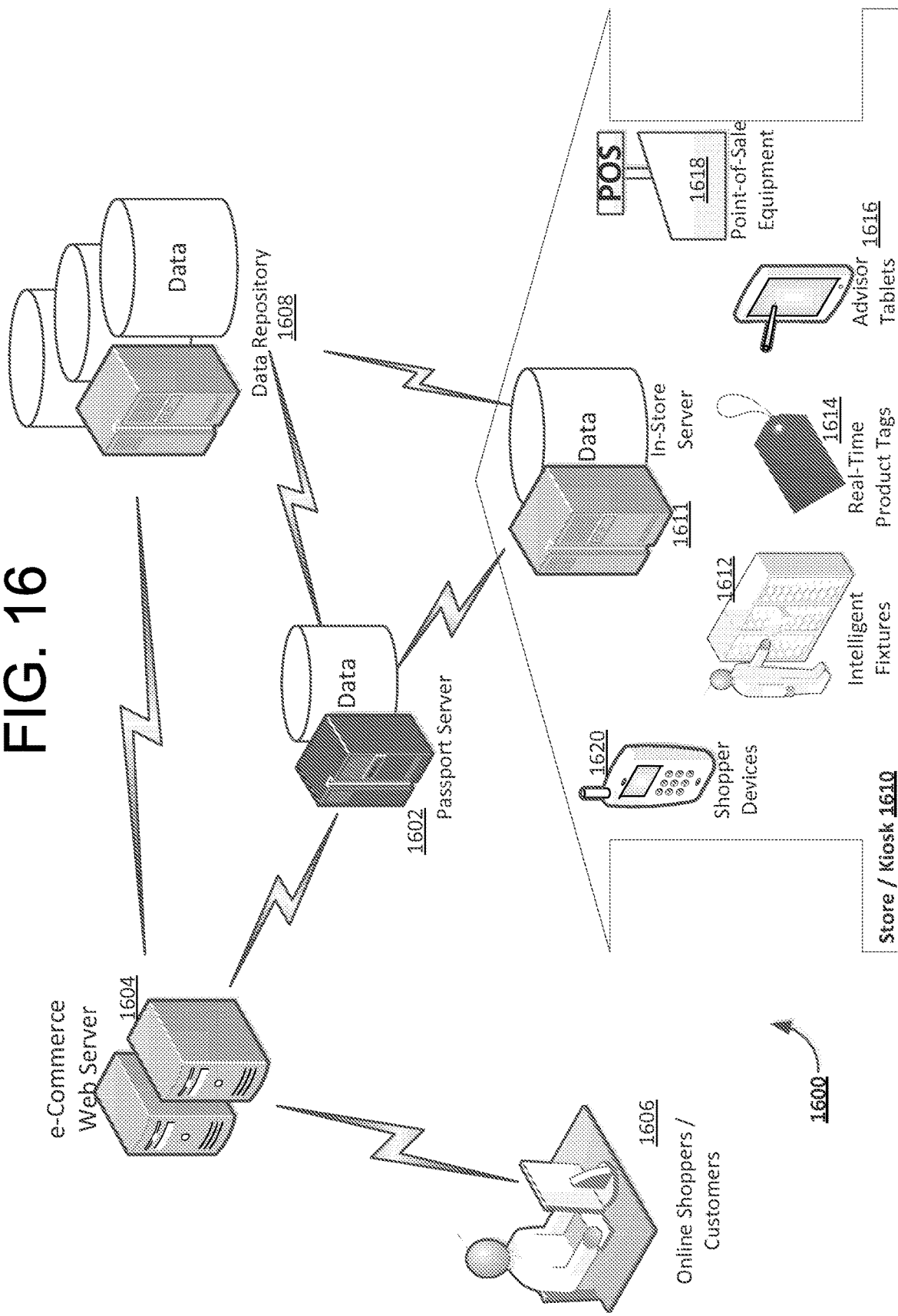
FIG. 16 is a system diagram illustrating a retail merchant's operations according to an embodiment of the present invention.

FIG. 16 is a system diagram illustrating a retail merchant's operations according to an embodiment of the present invention. FIG. 16 shows from a system point of view how the Passport tool is implemented in a retailer's operations to improve shopping experience. In the center of the system 1600 may be a Passport server 1602 that is networked and communicates with various computing equipment operated by or for the retailer.

As applied to a retail merchant, the Passport server 1602 may be embodied in a "big data" system that accounts for every pertinent piece of customer information. It is preferable to link as much data as practical with Passport where the pertinent data may include but are not limited to: data in existing customer relationship management (CRM) schemes (e.g., System ID, Session ID, Connect ID, CID, Rewards Card and My Account); the retailer's historic demographic and psychographic information on shoppers and customers; vehicle ownership data used in product fit determination and for modeling in the virtual listening rooms/kiosks; listening area characteristics of their homes used in modeling in our virtual listening rooms/kiosks; shopping patterns in retail stores as determined by various in-store sensors; sales advisors, customer service agents and technical experts with which they have had past contact; phone numbers and smart phone identifier such as iPhone UDID (Unique Device ID); credit card data; rewards points earned and the nature of redemptions in the retailer's rewards program; returns behavior; products contained in a shopper's virtual shopping cart; newly available or meaningful demographic, psychographic, and technology ID information on shoppers and their devices; engagement and email click/open rates; social media information (including emails from the retailer that a customer forwards to a friend). As shown in FIG. 16, the Passport server 1602 is in communication with a data repository 1608 which may contain a variety of data such as shopper/customer data (including shopping history, purchase history, and other individual-specific information organized by Passport accounts), product data (including product description, pricing, support documentation, etc.), shopper/customer communications or interactions data, and so on.

The retailer may operate an e-commerce web server 1604 to support its online store. The Passport server 1602 may communicate and coordinate with e-commerce web server 1604 to identify an online shopper/customer who visits the online store from a personal computing device 1606 (e.g., desktop computer, laptop computer, tablet, or smart phone). Whether the shopper accesses the online store website via a web browser or mobile app, the Passport server 1602 may become alerted to the shopper's presence and activities, identify and link the shopper's Passport account, and provide the most relevant, customized information to the shopper directly and/or via the e-commerce web server 1604.

The retailer may also operate an in-store server 1611 in each of the retailer's physical store or shopping kiosk 1610. In coordination with the Passport server 1602, the in-store server 1611 may control or communicate with a number of equipment such as intelligent fixtures (or displays) 1612, real-time product tags 1614, advisory tablets 1616, and point-of-sale (POS) equipment 1618. In connection with the intelligent fixtures (or displays) 1612 or standing alone, one or more sensors (not shown) may be deployed in the store/kiosk 1610 to detect or interact with shoppers' devices 1620 such as smart phones (or mobile apps thereon) and Passport identifier card. For example, when a shopper starts interacting with an intelligent fixture 1612, the shopper's identification and/or other information may be forwarded from the intelligent fixture 1612 to the Passport server 1602 via the in-store server 1611. The Passport server 1602 may select and forward to the in-store server 1611 the most relevant information and sales strategy personalized for the shopper. The in-store server 1611 could then control the intelligent fixture 1612, real-time product tags 1614, and/or advisor tablet 1616 to provide personalized assistance and recommendation to the shopper. For instance, the intelligent fixture 1612 may be instructed to pull up product information of most interest or use to the shopper based on the shopper's prior product discovery session information. The real-time pricing tag 1614 of a recommended product could display a special sale price or personalized message or highlight an important selling point related to the product. The shopper's information and recommended sales approaches may be forwarded to the advisor tablet 1616 such that a sales advisor may provide targeted, in-person assistance to the shopper.

It should be noted that, although many components in system 1600 are shown as being separated from one another, those skilled in the art would appreciate that some of the components may be combined, merged, or co-located without sacrificing their functions or effectiveness. For example, the Passport server 1602 might be co-located with the e-commerce web server 1604 and/or the data repository 1610.

Figure 17:
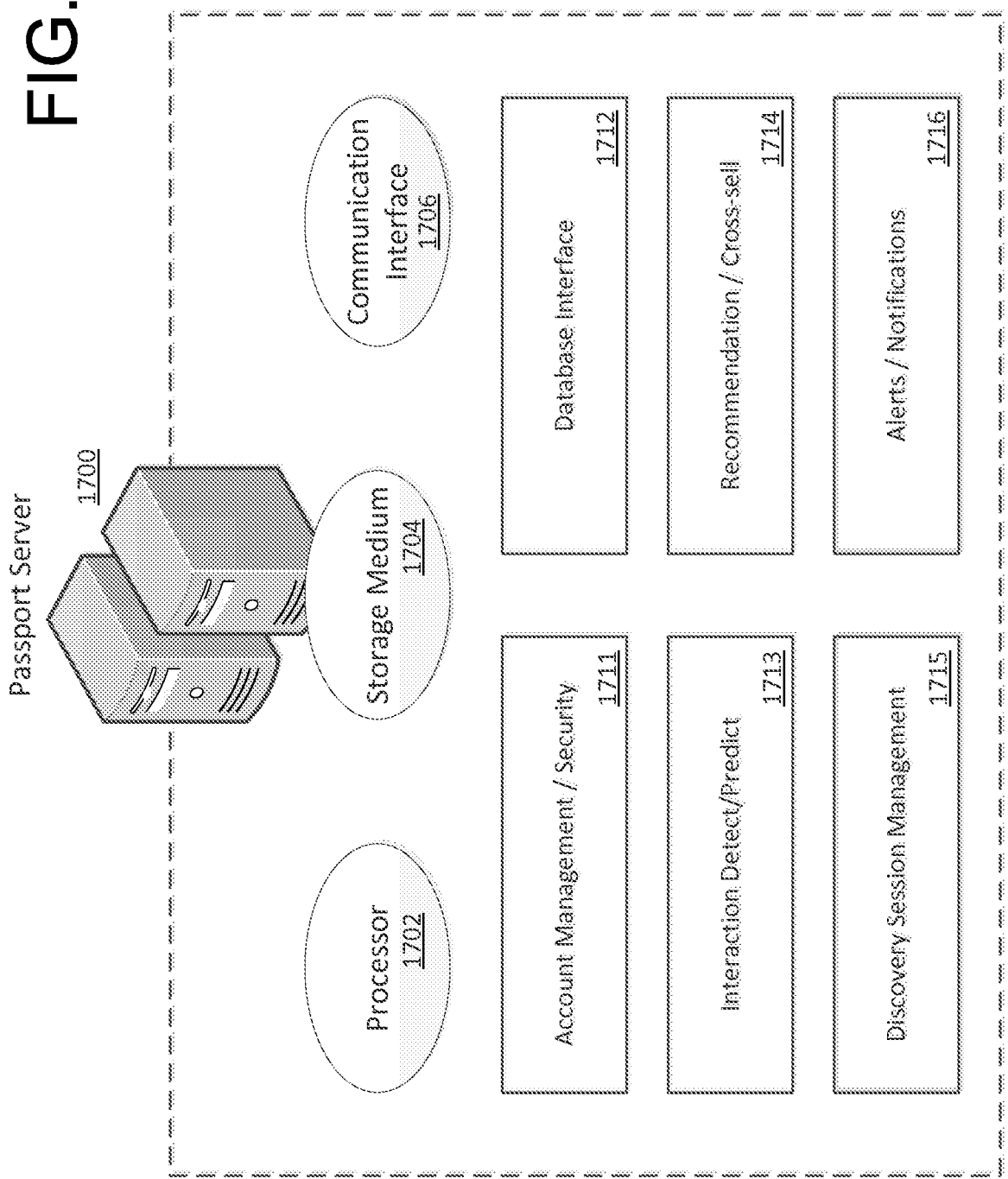
FIG. 17 is a block diagram illustrating an exemplary Passport server according to an embodiment of the present invention.

FIG. 17 is a block diagram illustrating an exemplary Passport server 1700 according to an embodiment of the present invention. In terms of hardware, the Passport server 1700 may comprise a processor 1702, a storage medium 1704, and a communication interface 1706. In terms of software, the Passport server 1700 may include or run a number of functional modules such as Account Management/Security (1711), Database Interface (1712), Interaction Detect/Predict (1713), Recommendation/Cross-Sell (1714), Discovery Session Management (1715), and Alerts/Notifications (1716). Although these functions are shown here as discrete modules, those skilled in the art may appreciate that at least some of these functions may be merged together or further divided into finer modules without substantively changing the intended effects.

In general, the Passport account may be provided to a retail shopper in any of several physical and digital ways. For example, a physical card and/or a digital App may be issued to each retail customer. Unlike previous rewards card programs, one does not have to be an actual customer to qualify for Passport. The Passport account could make it available to shoppers (i.e., prospects) which may include people who have requested catalogs, spoken to telephone sales advisors, used chat, taken part in email dialogs, and visited the retailer's stores.

According to another embodiment, a person does not have to register with the retailer before he or she starts using Passport. A shopper may start benefit from Passport without providing personal information (e.g., name, email address, etc.). However, as more personal information is provided, more features of the Passport tool may become possible.

Figure 18:
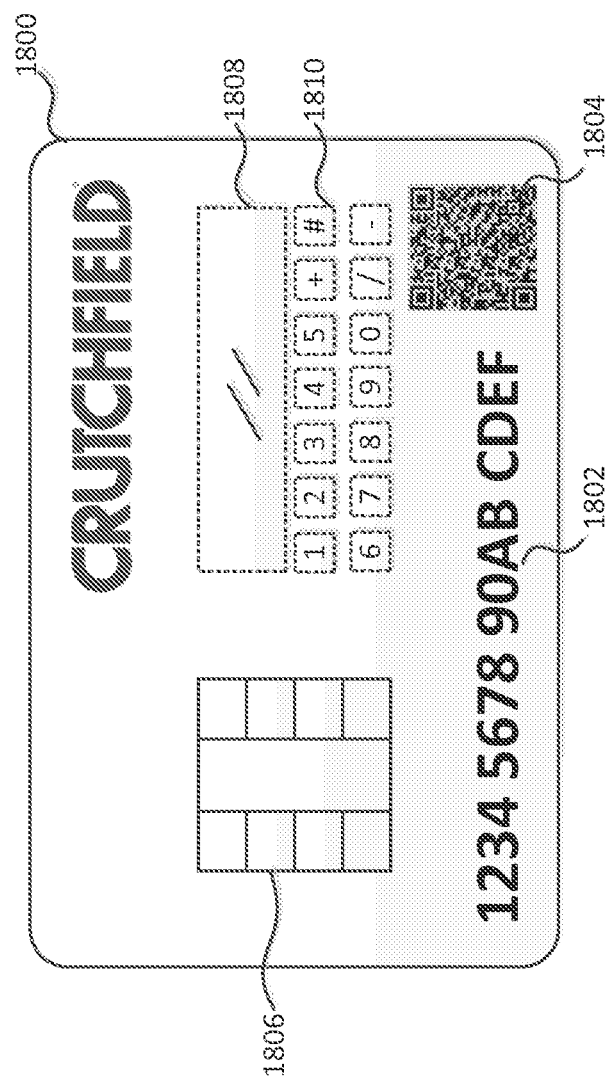
FIG. 18 shows an exemplary Passport card according to an embodiment of the present invention.

FIG. 18 shows an exemplary Passport card according to an embodiment of the present invention. The physical Passport card 1800 may be as prestigious-looking as most "platinum" credit cards although it may be of a different size than a typical credit card. The card 1800 may have visual identifiers (e.g., alphanumerical account number 1802, QR code or barcode 1804, etc.) printed on it. The card 1800 may alternatively or additionally have recognition technology embedded therein such as a smart chip 1806 or other electronic or magnetic sensing/detection mechanism such as near-field communications (NFC), radio-frequency (RF) scanning, or Bluetooth Low Energy (BLE). These features may make it extremely simple for cardholders to start the Passport process. For example, rather than entering information, a cardholder may photograph the QR code with a portable device. Also, logging on with a desktop computer or store device (e.g., Intelligent Display) could be made simple with technologies such as NFC or the like. The Passport card numbers may be linked to legacy rewards card numbers by the addition of a simple prefix or suffix which distinguishes the different databases. According to additional embodiments of the present invention, the smart card 1800 may further include a simple user interface such as an LCD screen 1808 and buttons 1810. For instance, the cardholder may need to enter a correct code via the user interface in order to generate a secure RSA string for use with Passport account related transactions.

Figure 19:
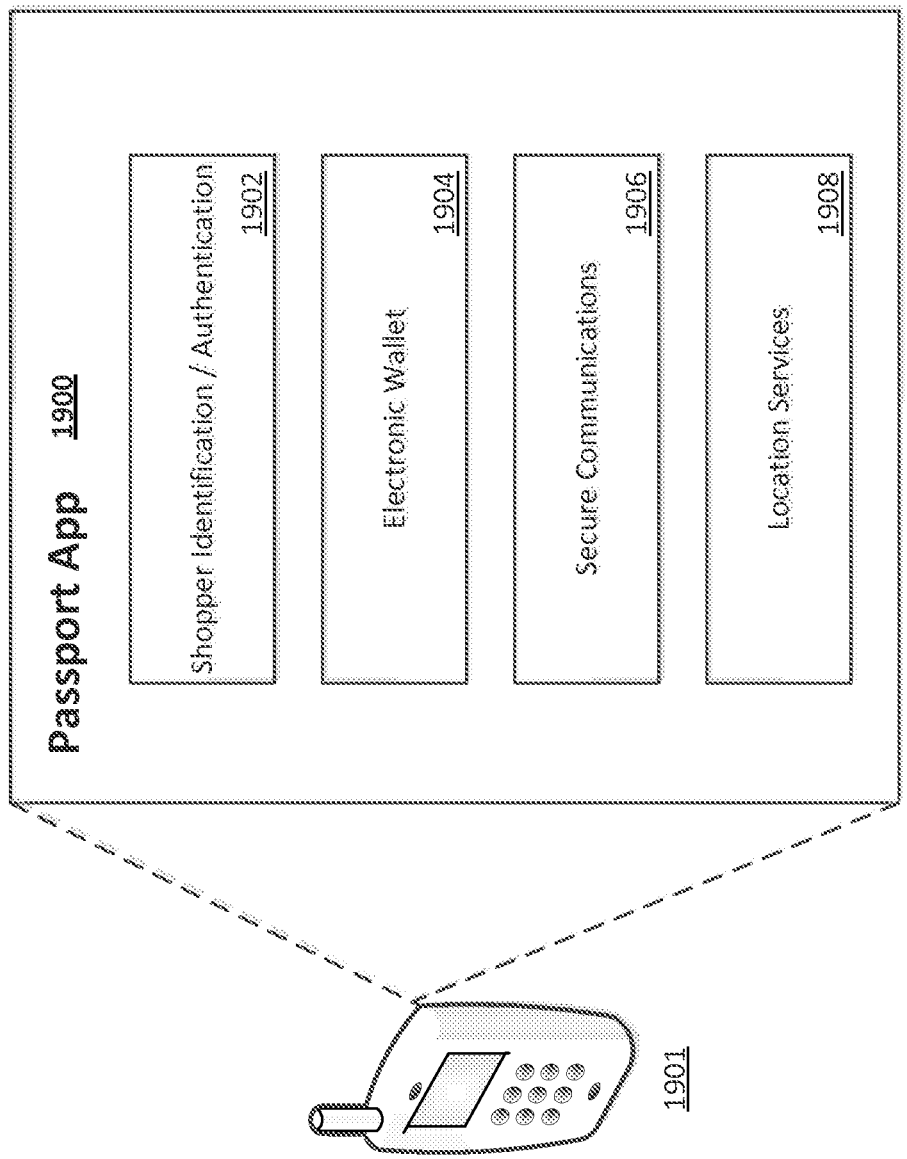
FIG. 19 shows an exemplary Passport App and its functional modules according to an embodiment of the present invention.

FIG. 19 shows an exemplary Passport App 1900 and its functional modules according to an embodiment of the present invention. The Passport App 1900 may be downloaded to and installed on a personal computing device 1901 such as a desktop or laptop computer, handheld or tablet computer, smart phone, or a wearable device. Passport could recognize multiple devices that the shopper may use. The shopper's personal computing device 1901 may employ a combination of technologies such as QR codes, iBeacon, BLE (Bluetooth Low Energy), and NFC (near field communications) to provide secure communications with a retailer's computing equipment such as Passport server or intelligent fixtures. A Secure Communications module 1906 of the Passport App 1900 may facilitate and/or take advantage of these communications. The Passport App 1900 may use conventional Bluetooth and Wi-Fi for less-secure, more robust communications. SMS/text could be accommodated as well.

The most important function of the Passport App 1900 may be Shopper Identification/Authentication (1902) which identifies the associated Passport account when communicating with a retailer's computing equipment such as Passport server or intelligent fixtures. A user of the device 1901 may supply a Passport account identifier to the Passport App 1900 or have the user's Passport account recognized through an authentication procedure.

The Passport App 1900 may also provide an Electronic Wallet (or e-Wallet) function (1904) in connection with the Shopper Identification/Authentication function (1902). For example, with the e-Wallet (1904), the shopper may pre-store or pre-designate payment information or set up payment options for online and store purchases in the App 1900 and/or in connection with the shopper's Passport account. When the shopper is ready for a purchase transaction, the e-Wallet (1904) may accelerate store checkout and/or post-sale scheduling process. Passport could also provide a server-side, digital wallet. To accelerate checkout, a customer may allow Passport to retain their credit card information. Then, only the Passport number would be used for checkout.

The Passport App 1900 may further comprise or use a Location Services (1908) function or module which uses the device 1901's current physical location (e.g., determined via GPS, cellular triangulation, Wi-Fi positioning, or other methods) to serve a number of purposes such as shopper detection or authentication, in-store tracking/navigation, and message dissemination etc.

According to one embodiment of the present invention, the physical Passport card 1800 may be phased out after a period of time when only the App 1900 will be supported.

Figure 20:
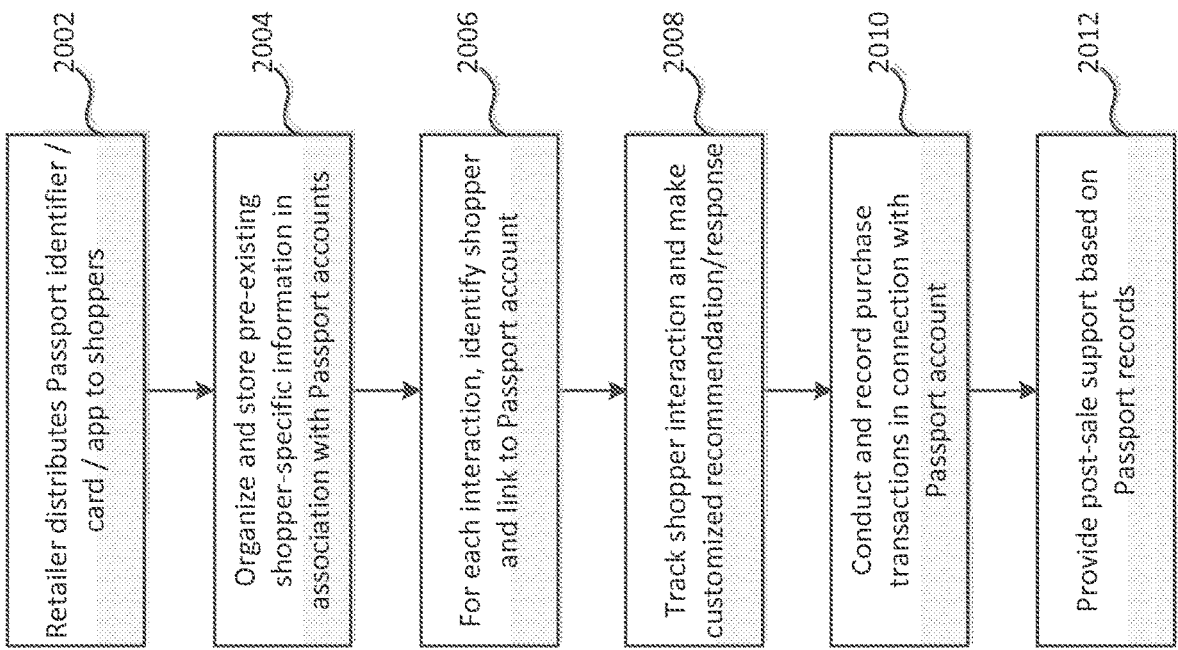
FIG. 20 is a flow chart illustrating an exemplary method for providing an improved retail shopping experience according to an embodiment of the present invention.

FIG. 20 is a flow chart illustrating an exemplary method for providing an improved retail shopping experience according to an embodiment of the present invention.

In Step 2002, a retail merchant may distribute Passport identifiers, cards, or apps to shoppers. For existing or known shoppers/customers of the retailer, the distribution or establishment of Passport accounts may take place in batch based on the shopper/customer data and via established communication channels (e.g., emails, text messages, and mails). The preexisting schemes of shopper accounting or customer accounting (e.g., based on rewards cards, CID or My Account) may be used for issuing new Passport account credentials. New shoppers and customers may be enrolled on an ongoing basis.

In Step 2004, preexisting shopper-specific information, such as related to previous schemes of shopper/customer accounting, may be organized and stored in association with the Passport accounts. With one unified database or through a number of related databases, shopper-specific data of each Passport account holder may be maintained, including, for example, personal information (e.g., name, address, contact), family information, employment/income data, home/automobile data, prior purchases, shopping/discovery behavioral data, product preferences, and prior interactions with retailer's sales/support personnel.

In Step 2006, for each interaction a shopper (Passport account holder) has with the retailer, whether it is online or in store and whether it is with the retailer's computing equipment or personnel, the shopper may be identified and linked to his/her Passport account. This way, additional shopper-specific data may be collected and associated with the corresponding Passport account. Passport may store documents that resulted from the in-store consultation process (e.g., sketches of the customer's living room and optimal speaker placement). For example, the in-store devices or App may have a "draw" capability that allows one to basically "finger paint" notes and diagrams on one of the existing product images. Passport may also be a depository for information regarding purchases made through other retailers, which information could help the retailer's sales advisors recommend products compatible with equipment purchased elsewhere.

In Step 2008, all the shopper-retailer interactions may be tracked and customized recommendations or responses may be provided to the shopper. With the Passport account, the shopper's product discovery sessions may be monitored and coordinated so that the shopping experience could seamlessly transition between the various communication media and platforms. Furthermore, the most contextually relevant assistance and information may be provided to the shopper. For example, as the shopper just started research on a product category, the shopper's needs and wants may be predicted based on information in the shopper's Passport account and specific products may be recommended accordingly. As the shopper continues the product research, information from the shopper's previous research session(s) may be leveraged to further help compare products and make selection for final purchase.

In Step 2010, the purchase transaction(s) may be conducted and recorded in connection with the shopper's Passport account. Once the shopper is authenticated, the shopper's Passport account may be used to provide payment information (e.g., credit card data) and any other information needed for online or store checkout. All information related to the purchase may also be recorded in the Passport account for future uses by both the shopper and the retailer.

In Step 2012, post-sale support and other information (e.g., marketing and promotional information) may be provided to the shopper based on Passport records. For example, the Passport tool may provide a data filing and recordkeeping system for the retailer's customers. Passport may file warranty registrations, provide a depository of all warranty information including expiration dates, notify owners of any product recalls and suggested software upgrades, and retain invoices in a format acceptable to insurance companies (such that the information would be available when a customer needs to file a claim). Electronic files of product manuals for the customers' products and Master Sheets for their cars could be retained in the customer's Passport account. It could further retain transcripts of emails and chats with the retailer's technical support personnel.

According to some embodiments, to encourage the use of Passport for online shopping, cardholders may be granted special information on the retailer's website (e.g., store inventory, store specials, upcoming promotions, etc.) which is not otherwise available to non-Passport-cardholders. Also, the cardholders may be offered special promotions and, possibly, a special emailed newsletter. The digital wallet capability could accelerate store checkout and post-sale scheduling (e.g., home and car stereo installations). However, it should be noted the most important benefit for the Passport holder is ensuring that he or she receives the most relevant shopping experience possible while seamlessly traveling through every conceivable current and future shopping medium.

Figure 21:
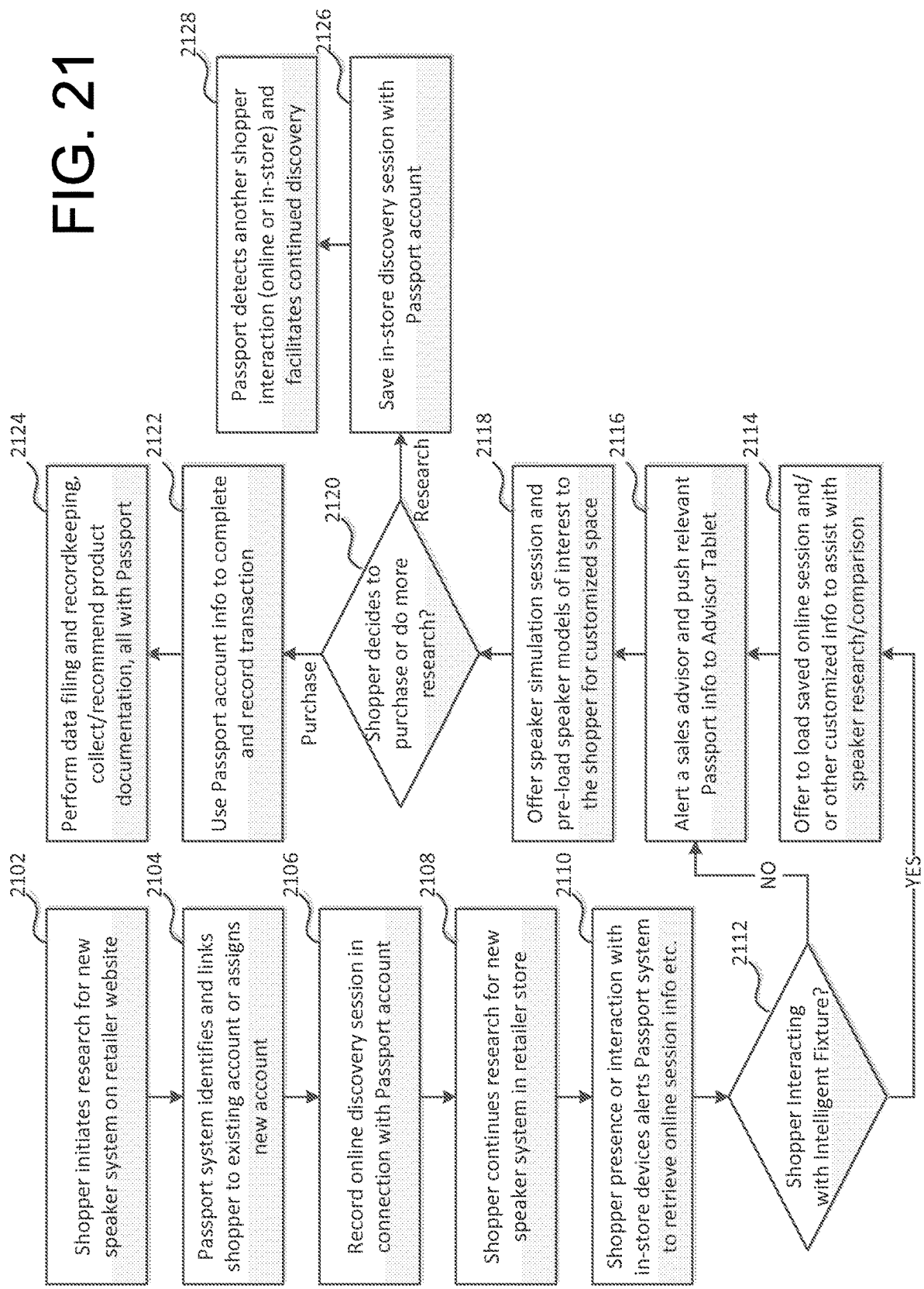
FIG. 21 is a flow chart illustrating an exemplary retail shopping process according to an embodiment of the present invention.

FIG. 21 is a flow chart illustrating an exemplary retail shopping process according to an embodiment of the present invention.

As a specific example, in Step 2102, a shopper may initiate research for a speaker system on a retailer's website. For example, the shopper may be generally interested in a home theater speaker system or a set of in-car speakers.

In Step 2104, the Passport system may identify and link the shopper to his/her existing account or assign/create a new Passport account if this is a new shopper. If the shopper has logged in on the retailer's website, then the login credentials may be used to identify the shopper and the corresponding Passport account. If not already logged in and identified, the shopper may be prompted to log in with a Passport smart card or Passport App or self-identify to the system. Alternatively, the shopper may be automatically identified and matched to a Passport account based on information about the shopper's computing device, network connection, physical location, etc.

In Step 2106, information of the shopper's online discovery session may be recorded in connection with the shopper's Passport account. In addition to the shopper's identity, the identity of the product(s) or product category in which the shopper has expressed interest may be determined based on the webpages visited and the product literature read. For example, it may be decided quickly that the shopper is looking to purchase automotive speakers instead of home theater speakers based on the shopper's keyword searches and product browsing history. In that case, the vehicle data provided by the shopper or already on file in the Passport account may be associated with the online session and could be used to assist the shopper and make recommendations. To the extent the shopper engages in any online chat or telephone call with the retailer's sales personnel, such communications may also be stored in the shopper's Passport account.

In Step 2108, the shopper may choose to continue the research on automotive speakers in one of the retailer's stores. As is the case for more expensive or more complex merchandise such as audio equipment, the product discovery may take more than one online or in-store visit to complete.

In Step 2110, the shopper's presence in store or interaction with in-store devices/personnel may alert the Passport system to retrieve the online session information (as saved in Step 2106) along with any other shopper or product information. A number of techniques may be employed to detect the shopper's presence at a retail location. For example, beacons, Bluetooth on the consumer's mobile device, and other types of wireless communication technology (including "near field communication" or "NFC") can be used to sense the shopper's mobile device, Passport card or device, wearable wireless device (e.g., a smart watch from Samsung, Pebble, or Sony; a fitness or wellness tracker band like Fitbit. Polar, or Misfit, an eye-wear such as Google Glass), or other device. In particular, an indoor proximity system, such as Apple's iBeacon system with Bluetooth low energy proximity sensing, may be one option of detecting and identifying the shopper in store, so as to link the online with the in-store aspects of shopping experience, and for communicating with the shopper as he or she wanders on or around the retail premises.

According to some embodiments, the beacon or other shopper-sensing or -detection system can trigger certain types of informational or promotional messages to be pushed to the shopper's mobile device. For example, as soon as a shopper with his or her beacon-compatible device comes within transmission or detection range of a retail store, the shopper's presence may be sensed and related activity data identified based on which a personalized greeting message may be sent to the shopper's device. For instance, the greeting message may address the shopper by name, welcome him or her to the store, and/or remind the shopper of prior researches or provide alerts of products or deals of interest to the particular shopper. A special discount, rebate, or reward may be offered to the shopper to entice him or her to enter the store and make a purchase.

In Step 2112, it may be determined whether the shopper is already interacting with an intelligent fixture (e.g., a speaker display stand or a car audio simulation booth/chamber). If so, then in Step 2214, the intelligent fixture may be caused to offer to load the saved online session and/or other customized information to assist the shopper with the speaker research/comparison. For example, based on the progress of the shopper's online research and vehicle information, the displayed information or product simulation may be narrowed down to a handful of speaker models. According to one embodiment of the present invention, the personalized recommendations may have already been formulated after the shopper's online discovery session and prior to the shopper's visit to the retail store.

Next, or if the shopper is not interacting with any intelligent fixture, an in-store sales advisor may be discreetly alerted in Step 2116 and the relevant Passport information concerning the shopper and his/her shopping endeavor may be pushed to an advisor tablet. With the custom tailored information, the sales advisor may then approach the shopper to provide personalized assistance. According to embodiments of the present invention, the advisor tablet and its data connection to the in-store server and ultimately the Passport server may allow the sales advisor to access the retailer's vast database of product and educational information without leaving the shopper. Since all the information needed to assist the shopper and make a sale is available and accessible via the advisor tablet at the advisor's fingertips, the advisor tablet can serve as a complete information resource for both the sales advisor and shopper, thereby reducing the training requirements of sales advisors. With little training, a sales advisor can perform with the same level of professionalism and expertise that a highly experienced sales advisor performs in a conventional retail environment. During peak times or when more expertise is required, the in-store advisor tablets and/or intelligent fixtures may facilitate the shopper's video conferencing with additional sales or technical support people at a central location. Also, the advisor tablet may allow the sales advisors to perform all the store's sales and service function at one location.

In Step 2118, a speaker simulation session may be offered to the shopper (via the intelligent fixture or by the sales advisor), and speaker simulation data for the speaker models of particular interest to the shopper may be pre-loaded to the simulation system and configured for demonstration in an interior space customized according to the shopper's vehicle.

In Step 2120, after completing in-store discovery, the shopper may decide to either make a purchase or do more research.

If the shopper decides to purchase a particular set of speakers, then in Step 2122 the shopper's Passport account information may be used to complete the checkout. The previously collected person information and vehicle information may also be used in scheduling an installation of the new speakers. All information related to this purchase may be stored in the shopper's Passport account. In Step 2124, data filing and recordkeeping may be performed on behalf of the shopper and product documentation may be collected and recommended, all based on and in connection with the Passport account.

If the shopper decided to do more research (Step 2120), then in Step 2126 the in-store discovery session may be saved in the shopper's Passport account much like saving the online session in Step 2106. After shopper leaves the store, the Intelligent Fixture/Passport system preferably makes a follow-up contact with the shopper based on what transpired in the store. This follow-up contact may be via email, web (e.g., next time the consumer accesses the retailer's website), telephone, text message(s), etc. According to some embodiments, the Passport tool may integrate a shopper's online and in-store activities over a number of online and offline (in-store) cycles.

In Step 2128, when another interaction is detected between the shopper and the retailer (online or in-store), continued discovery concerning automotive speakers may be facilitated. The system may leverage data collected from previous sessions to provide the shopper with more personalized information and recommendations.

Figure 22:
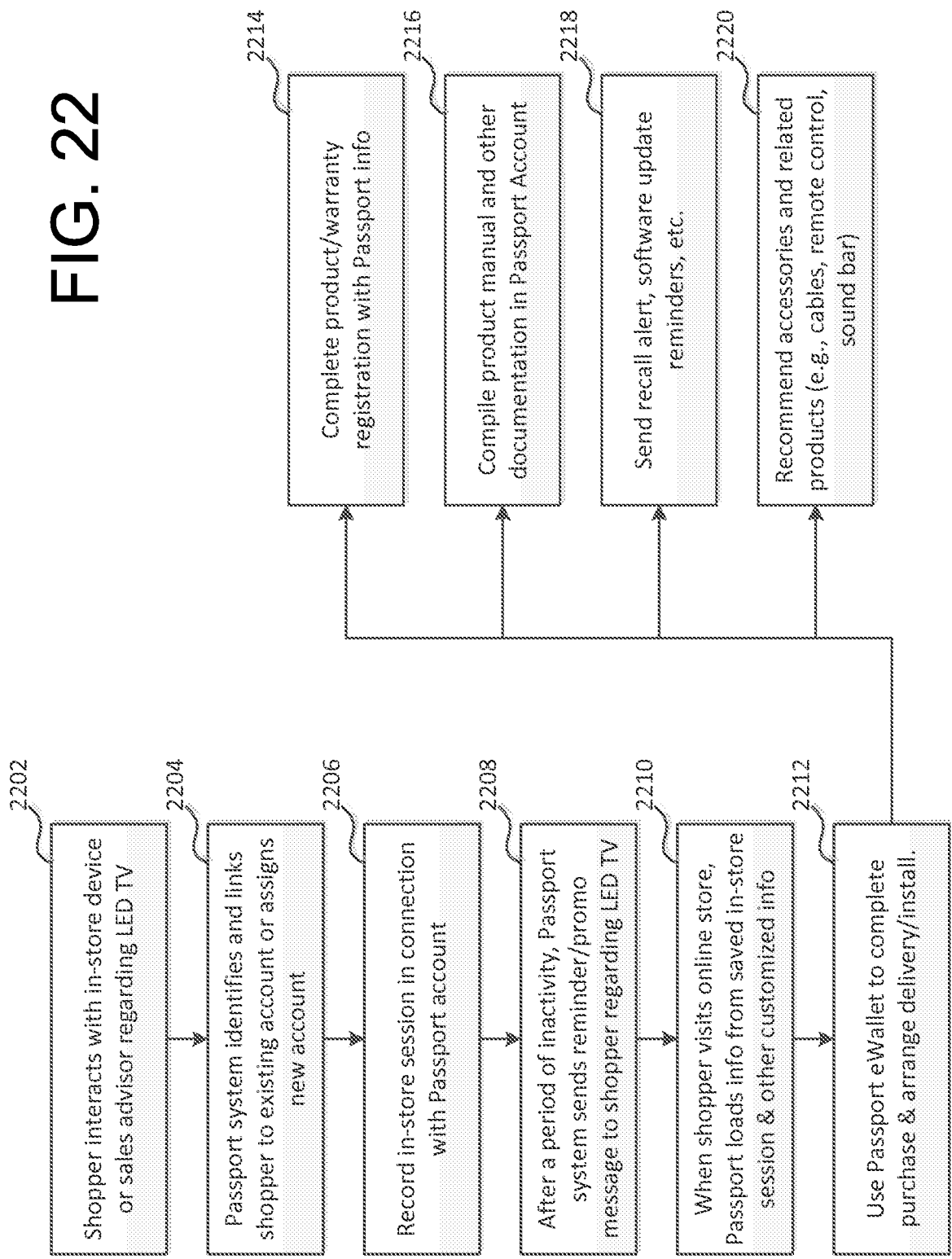
FIG. 22 is a flow chart illustrating another exemplary retail shopping process according to another embodiment of the present invention.

FIG. 22 is a flow chart illustrating another exemplary retail shopping process according to another embodiment of the present invention.

In this particular example, a shopper may be interested in purchasing an LED HDTV. In Step 2202, the shopper may start by interacting with a retailer's in-store device or sales advisor regarding LED TV sets.

In Step 2204, the Passport system may identify and link the shopper to his/her existing Passport account or assign a new Passport account if this is a new shopper.

In Step 2206, after the shopper completes the visit to the retail store, the in-store discovery session may be recorded in connection with the shopper's Passport account. The saved session may include such information as to which LED TV models the shopper searched for, viewed, or inquired about and what technological features the shopper cares about.

In Step 2208, if the shopper does not resume the research of LED TV for a while, then, after a period of inactivity, the Passport system may send reminders or promotional messages to the shopper regarding LED TV offerings.

In Step 2210, when the shopper visits the retailer's online store for further research, information from the saved in-store discovery session and other customized information may be loaded to the shopper's web interface. For example, the shopper may be reminded of the TV models previously viewed or compared in store and may be presented with information of new products that might match the shopper's preferences. In response to the shopper's concerns or confusions, educational information may be selectively presented to the shopper concerning TV products, such as a comparison between 4K Ultra HD vs. 1080P Full HD, 3D vs. non-3D, LCD vs. OLED vs. plasma display technologies, and smart/networked vs. non-networked.

If the shopper decides to purchase one of the LED TV products, then in Step 2212 the Passport e-Wallet may be used to complete the online checkout and arrange for delivery and/or installation.

After the sale, a number of Passport functions may be performed. For example, in Step 2214, the product registration or warranty registration may be automatically completed for the purchased TV set based on information of the product as well as the shopper's information maintained in the Passport account. In Step 2216, the product manual, setup guide, and other related documentation may be compiled and stored in the shopper's Passport account. In Step 2218, the Passport system may forward any manufacturer communications such as recall alert and software update reminders to the shopper. In Step 2220, the Passport system may further identify and recommend accessories and related products for the purchase TV model such as cables, remote control, and sound bar.

An important component of the Passport system is real-time product tagging (RTPT) which is used to disseminate personalized shopping information at the store's product level. Like with every other aspect of Passport, RTPT is designed to provide the shopper with the most individualized shopping experience.

Figure 23:
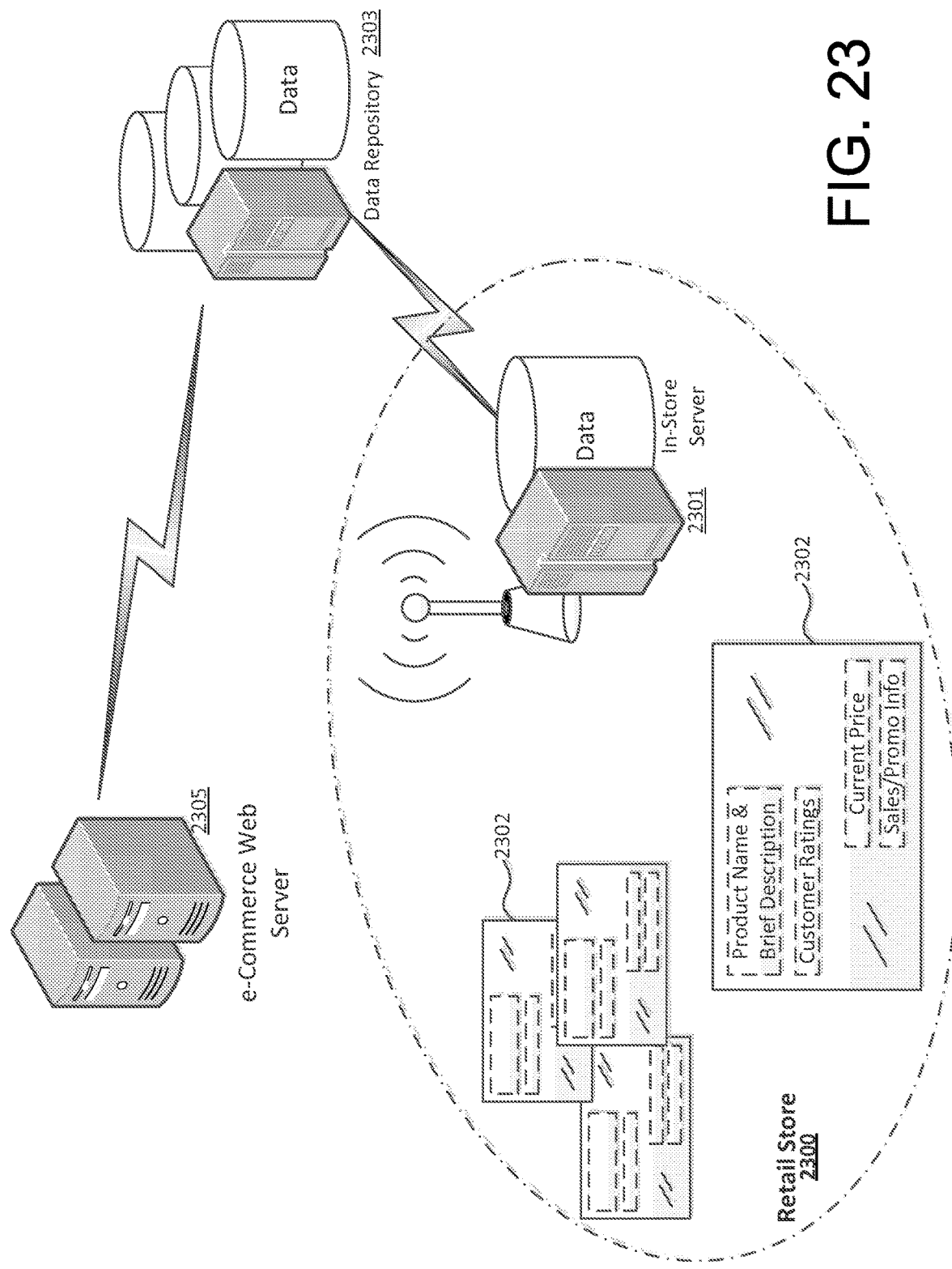
FIG. 23 is a block diagram illustrating an exemplary use of real-time product tagging according to an embodiment of the present invention.

FIG. 23 is a block diagram illustrating an exemplary use of real-time product tagging according to an embodiment of the present invention. In a retail store 2300, a number of electronic price tags 2302 may be deployed to show information next to corresponding products. According to one particular embodiment, eSignage tags manufactured by ZBD Solutions may be used for the electronic price tags 2302. Unlike conventional price tags which merely show static pricing data, each electronic price tag 2302 may be caused to display a variety of static and dynamic data such as product name & brief description, customer (online) ratings, current price, and sales or promotion information.

An in-store server 2301 with wireless capabilities may communicate with the electronic price tags 2302. Since it is also in communication with a data repository 2303 and/or an e-commerce web server 2305, the in-store server 2301 may ensure the dynamic data shown on the electronic price tag 2302 are synchronized with and therefore remain the same as those data shown in the retailer's online store.

According to one embodiment, the data shown on the electronic price tags 2302 may be continuously updated whenever any change is made to the dynamic data in the data repository 2303 and/or e-commerce web server 2305. According to another embodiment, for a period of time (e.g., 1-2 hours) before a retail store opens for business, a batch update of the electronic price tags 2302 may be performed, where the tags may be first switched to an Update mode and then any data that have changed since the last time the tags were put in Update mode may be pushed to the tags. After the update is complete, the electronic price tags 2302 may be may switched to Store (or Display) mode. According to a further embodiment, both the in-store electronic price tags 2302 and the e-commerce web server 2305 may be scheduled for periodic, simultaneous updates, for example, every one hour, every two hours, or every four hours, when both the online and in-store data are synchronously updated and refreshed.

Figure 24:
FIG. 24 shows an exemplary real-time pricing tag according to an embodiment of the present invention.

FIG. 24 shows an exemplary real-time pricing tag according to an embodiment of the present invention. In this example, the electronic price tag has a black-and-white, fully graphic display with e-paper technology, which shows the product name ("Nikon D5200 Kit"), item number, customer ratings of the product (i.e., five stars), the number of reviews, current price ("$799.95"), and current sales information ("Was $899.95, Save $100.00").

According to other embodiments of the present invention, the electronic price tags may also be used to provide shoppers with real-time, personalized information displayed alongside a featured physical product. For example, the shopper's name may be displayed on the tag welcoming him or her to the product display. For another example, an electronic price tag may display to a shopper the actual cost of the product after the shopper's rewards points are subtracted and, for car audio products, whether they will fit in the shopper's particular vehicle.

According to some embodiments, in addition to displaying personalized shopping information in real time on the electronic price tags, similar information can be displayed on the shopper's personal device or on the intelligent fixture's display which is in closest proximity to the shopper. To protect confidentiality, proximity sensors may detect the shopper and an electronic price tag may only show personalized message(s) when the shopper is sufficiently close to a particular product display. The displayed information could be secured through the use of technology like NFC. For instance, personalized information may only be displayed when the shopper's portable device is on an intelligent fixture.

It should be noted that, although many of the examples are described herein in reference to consumer electronics (CE) products, the Passport tool and intelligent fixtures in accordance with embodiments of the present invention are not limited to the retail sale of CE merchandise but may be extended to numerous other product types.

According to further embodiments of the present invention, the intelligent fixture user interface (e.g., a large-screen display or touch-screen panel) could be tailored to each shopper's mobile device. For example, the intelligent fixture can detect (or recall from data of prior online or in-store interaction) the type and version of operating system (e.g., iOS vs. Android vs. Windows, etc.) on the shopper's mobile device. Then, the intelligent fixture UI may be configured to have a "look and feel" and functionality consistent with the OS that the shopper is already familiar with. For another example, the intelligent fixture can detect (or recall from data of prior online or in-store interaction) the language setting or preference of the shopper's mobile device (or sense from voice recognition of the shopper's speech) and present in a proper language on the large screen accordingly. Other characteristics of the shopper or the shopper's device may also be detected and used to tailor the presentation on the large screen.

According to yet further embodiments of the present invention, shopper authentication may be achieved using fingerprint scans, retina scans, or other biometrics through an interface with the intelligent fixture and/or Passport app. They can also be used as authentication factors for check-out operations.

According to yet further embodiments of the present invention, the intelligent fixture(s) and/or related beacon or sensor devices may gather data to provide at least gross statistics on store performance, such as foot traffic patterns in the store, activity levels in the store for different days of the week and/or times of day, advisory conversion rate, website return conversion rate (i.e., how often a consumer viewing a product in the store returns home and purchases it online), and so on.

According to other embodiments of the present invention, shoppers' in-store navigation may be significantly improved in a number of ways. For example, the Passport app may work with in-store wireless beacons or other indoor positioning or geo-location solutions to provide better navigational assistance to shoppers, such as an interactive (2-D or 3-D) store map that provides walking directions to guide the shopper to where the items on his/her shopping list are located. The navigation instructions could accommodate multiple waypoints and might subtly direct foot traffic to where the retailer wants shoppers to be. According to one embodiment, the interactive store map could preferably provide a function similar to Google Map Street View such that a shopper planning an in-store visit could even preview where he or she is going to be and potentially start browsing the shelves or displays even before physically coming into the store.

For another example, since many shoppers often use their smart phones in store to get product information or compare prices, the retailer may find it desirable to design its own web portal to make its product data more accessible with data highlights that promote its own sales. As a shopper browses one product, one or more related products may be suggested on the smart phone along with navigational aids which could be invoked to guide the shopper to the physical location of the related product(s).

Figure 25:
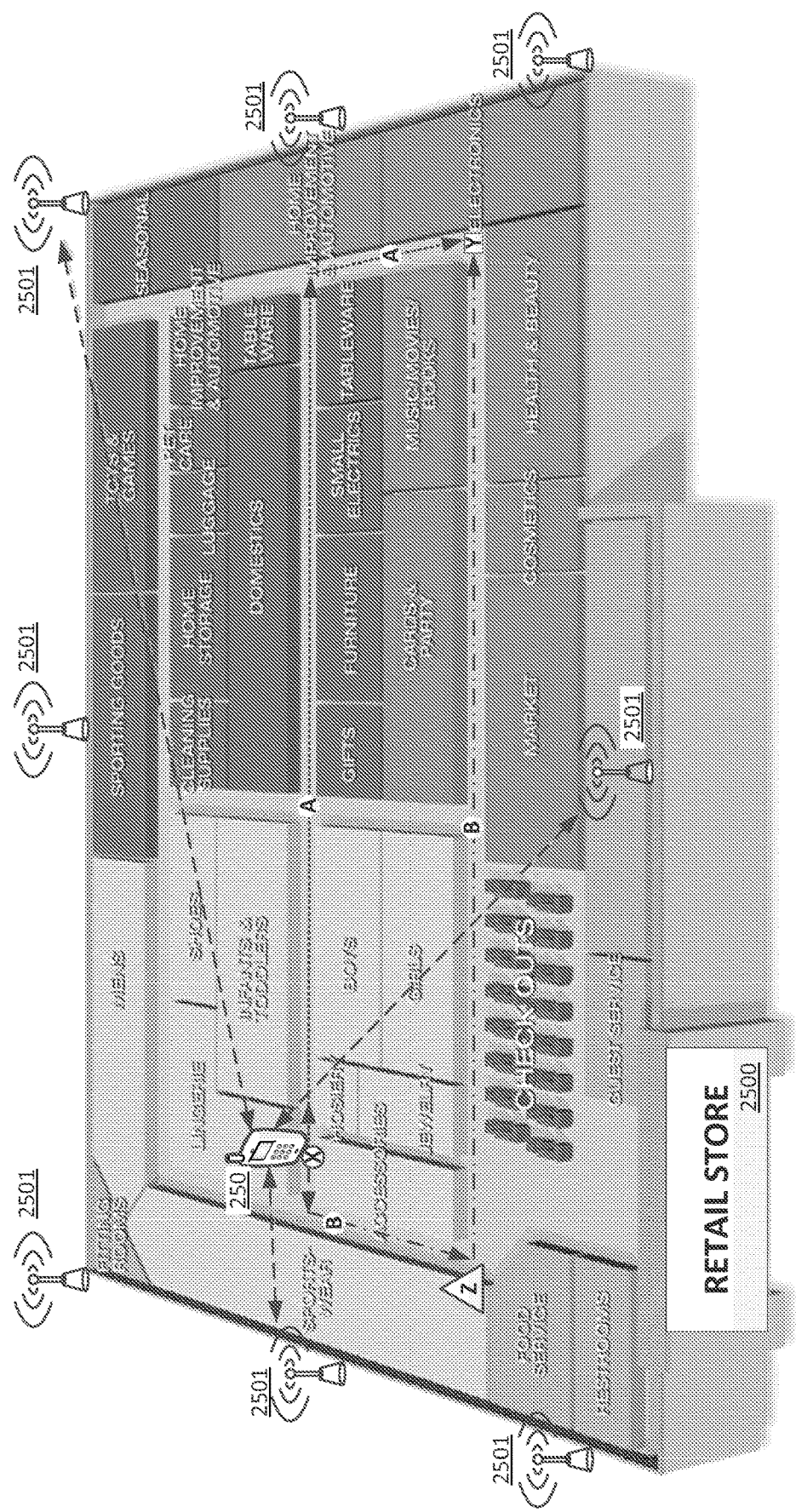
FIG. 25 shows an exemplary use of wireless technology in a retail store according to an embodiment of the present invention.

FIG. 25 shows an exemplary use of wireless technology in a retail store according to an embodiment of the present invention. In the retail store 2500, a number of wireless transceiver devices 2501 may be deployed to form an indoor proximity and/or navigation system. While a shopper carrying a smart phone or other wireless device 250 is moving around in the store, the location of the shopper (or the device 250) may be determined, for example, through signal triangulation, proximity sensing, or other techniques.

As the shopper's presence, identity, and in-store location is confirmed, the retailer's in-store server could have one-way or two-way communications with the shopper's device 250 in a variety of manners.

For example, by pulling up the shopper's account history and prior shopping/browsing activities, it may be determined what the shopper is currently interested in buying and proactively provide descriptive and promotional information as well as in-store location of the product(s) of interest. As shown in FIG. 25, the shopper is currently walking in an isle between the Lingerie section and the Accessories section, at Location X. If it is determined that the shopper came into the store specifically to browse or purchase a digital camera (e.g., based on the fact that the shopper spent a significant amount of time in the past 24 hours researching digital photography webpages on the retailer's website), an alert message may be pushed to the shopper's device 250 or an app (e.g., Passport app) on the device 250 could generate a message telling the shopper how to get to the Electronics section (Location Y) from the shopper's current location (Location X). For instance, an in-store map with turn-by-turn directions might be automatically presented on the device 250 showing Route A. It may also be determined what the shopper is likely to be interested in and attempt to guide the shopper to or past certain merchandise location(s). In the example shown in FIG. 25, if it is determined that the shopper might be interested in some sporting goods located close to the main isle near Location Z, the shopper may be guided from Location X to Location Y via Route B (which passes by or through Location Z) instead of Route A.

For another example, the Passport app on the shopper's device 250 may have access to a shopping list and, with geo-location and navigation capabilities, could generate a most efficient route which, for example, starts from the store entrance or the shopper's current in-store location and ends at the checkout registers, with multiple waypoints each corresponding to one or more items on the shopping list. Such a shopping-list-based navigation route could also be somewhat modified so that the shopper gets more exposure to certain merchandise chosen by the retailer.

In addition, various incentives such as discount coupons, reward points, and rebate offers could be generated and pushed to the shopper's device 250 in substantial real-time, for example, to boost the shopper's interest in certain products and/or to extend the shopper's stay in the store. The generation and communication of incentives may be based on the detection and measurement of the shopper's in-store activities such as navigation and dwell time with products and departments.

Another type of in-store wireless technology may embed small chips, such as RFID tags or a more active type of wireless chips, into displayed merchandise (e.g., clothing and electronics) or as part of security or anti-theft devices routinely attached to the merchandise. Such small chips may emit signals to or allow detection by the shopper's device 250 so that the shopper could more easily locate the individual pieces of merchandise in the store without asking for assistance.

Figure 26:
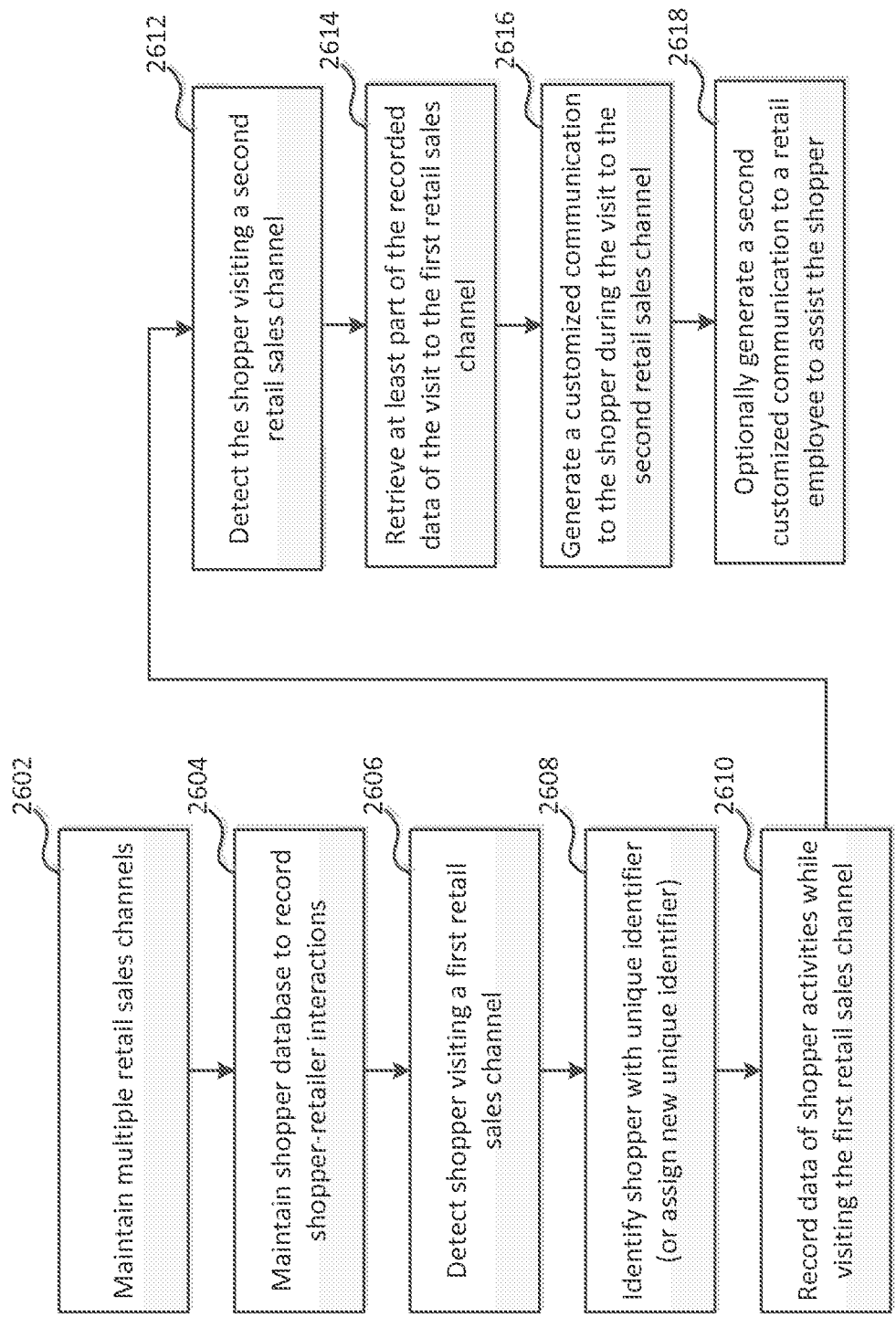
FIG. 26 is a flow chart illustrating another exemplary method for providing an improved retail shopping experience according to an embodiment of the present invention.

FIG. 26 is a flow chart illustrating another exemplary method for providing an improved retail shopping experience according to an embodiment of the present invention.

In Step 2602, a retailer, such as a department store, clothing/fashion shop, electronics boutique, or home improvement store, may maintain multiple retail sales channels. For example, a retailer specializing in consumer electronics may set up a first (online) channel by establishing an Internet web portal and/or distributing a mobile application both of which could provide an interactive user interface for shoppers to browse, research, and/or purchase products from the electronics retailer. The same electronics retailer may also have a second (offline) channel by running one or more physical stores, stands, or kiosks which shoppers could visit in person.

In Step 2604, the retailer may maintain one or more shopper databases to record data related to the interactions between the shoppers and the retailer. The interactions could take place over any of the retail sales channels and may include the shoppers' browsing, product research, purchase, return/exchange, post-sales service/support, and other activities. The database(s) may organize the activities data and personal information for each shopper (whether or not the shopper has previously made any purchase from the retailer).

In Step 2606, a shopper's visit to a first retail sales channel may be detected. For example, the shopper may visit the first (online) channel by shopping on the Internet web portal via a standard web browser or with the mobile app distributed by the retailer or a third party. The shopper could be detected based on an identifier of the shopper's computing device, its network address (e.g., IP address, mobile phone number), or login credentials or other personal information supplied by the shopper. Alternatively, the shopper may be detected based on a cookie or token stored on the shopper's computing device during a previous visit to one of the retail sales channels.

In Step 2608, the shopper may be identified with a unique identifier that serves to distinguish each shopper from other visitors or customers of the retailer. If prior interactions between the shopper and the retailer can be confirmed, the shopper may already have been associated with a unique identifier and that identifier may continue to be used. If no prior interaction with the retailer can be confirmed or no identifier exists for this shopper, then a new unique identifier may be assigned to the newly detected shopper.

Next, in Step 2610, data associated with the shopper's activities while visiting the first retail sales channel may be recorded and stored in the shopper database. For example, one or more of the following pieces of information may be recorded: the product information browsed; URL links followed; dwell time for each webpage or product; product(s) added to wish list; shopping list, or shopping cart; product(s) or information saved for later; product(s) purchased; the amount spent; interactions with sales representative(s) (e.g., via online chat or email); and so on. The recorded data may provide indications and clues as to what products and/or information the shopper is interested in, has already possessed, or is likely to need in the future.

Sometime later, in Step 2612, the shopper's visit to a second retail sales channel may be detected. For example, the shopper may visit the second (offline) channel by coming into or near one of the retailer's stores, stands, or kiosks. The shopper's presence in or near a physical retail location may be detected in a number of ways. For instance, with a Passport app or other mobile app on the shopper's mobile device, either the app or an in-store device, fixture, or server could sense and identify the shopper. The mobile app may be configured (e.g., through shopper opt-in) to announce the presence and identity of the shopper or the mobile device. Alternatively, the shopper may enter his or her name, email address, login name, or other identifier (e.g., loyalty or rewards card number) or perform a biometric scan at an intelligent fixture, or initiate a contact or contactless communication between the shopper's mobile device and an in-store device (e.g., via NFC or Bluetooth communications).

Once the shopper has been identified, at least some of the recorded data of the shopper's visit to the first retail sales channel may be retrieved from the database(s) in Step 2614. With the shopper's unique identifier, the shopper database(s) may be quickly queried for any information that might be useful to improve the shopper's current experience in the second retail sales channel. The recorded data may include additional information derived from the raw activity data previously recorded. Although not shown in FIG. 26, data associated with the shopper's activities while visiting the second retail sales channel may also be recorded and stored into the shopper database(s) in connection with the shopper's unique identifier.

Then, in Step 2616, a customized communication may be generated and conveyed to the shopper during the visit to the second retail sales channel. The customized communication may be formulated for a number of purposes and delivered in a number of ways. For example, based on the shopper's recently visit to the online store, it may be determined what the shopper plans to see or buy on the current shopping trip, and informational and/or promotional messages may be generated accordingly to help the shopper with product research and/or to entice the shopper to make a purchase. The informational message could remind the shopper of the product(s) previously researched, provide the physical in-store location of the product(s) and navigation instructions, and/or alert the shopper to newer or comparable products. The promotional message may include general or personalized incentives such as coupons, rewards, or rebates. The customized communication may be transmitted to the shopper's mobile device, for example, pushed by in-store beacon devices, emailed/texted; or the customized message(s) may be displayed on a screen of an intelligent fixture or announced by the audio output of the intelligent fixture; or in some case the personalized notes could be printed out and handed to the shopper. According to some embodiments, the customized communication may be generated based on recorded data about a prior visit in combination with data collected during the current visit.

Although in this example just described the shopper visits the online store first and then the physical store, those skilled in the art would appreciate that a shopper may choose to visit any of the retail sales channels and in any chosen order regardless of which the method of improving shopping experience described herein could still be applied.

Optionally, in Step 2618, one or more second customized communications may also be generated for a retail employee to assist the shopper. For example, based on the recorded data about the shopper's prior and/or current visits, the retailer's in-store or online server may determine that the shopper would benefit from personal assistance of a sales representative. Accordingly, the server may put together, and push to one or more chosen employee (e.g., to his/her advisor tablet or computer terminal), a set of information about the shopper, the shopper's needs, and recommended strategy on how to help the shopper. The retail employee may then approach and assist the shopper most effectively in person (if the shopper is in store) or via online chat (if the shopper is online) based on the second customized communication(s).

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A computer-implemented method for improving shopper experience, the method comprising:
maintaining for a retailer at least two different retail sales channels including: (a) a first retail sales channel based on an Internet web portal or mobile application, and (b) a second retail sales channel based on a physical store, stand, or kiosk;
detecting, by at least one first processor, a shopper visiting said first retail sales channel;
identifying, by the at least one first processor, said shopper with a unique identifier that distinguishes said shopper from other customers of said retailer;
recording, in a storage medium associated with the at least one first processor, data associated with said shopper's activities while visiting said first retail sales channel, said data including information of an online discovery session comprising at least one product or product category in which said shopper has expressed interest thus saving the online discovery session;
monitoring real-time foot traffic of shoppers visiting said second retail sales channel;
detecting, by at least one sensor and in real-time, a physical presence of said shopper subsequently visiting said second retail sales channel and interacting with an intelligent fixture;
retrieving, in real-time and in response to detecting the physical presence of said shopper subsequently visiting said second retail sales channel, at least a copy of at least part of the recorded data associated with said shopper's activities while visiting said first retail sales channel said at least part of the recorded data including said information of said saved online discovery session; and
reloading, by at least one second processor, and presenting via said intelligent fixture to said shopper said saved online discovery session in real-time during said shopper's visit to said second retail sales channel based on the retrieved at least part of the recorded data said reloaded online discovery session facilitating said shopper's continued discovery concerning said at least one product or product category.

2. The computer-implemented method of claim 1, further comprising:
determining, upon detecting said shopper visiting said first retail sales channel, whether said shopper has had a prior contact with said retailer; and
assigning a new unique identifier to said shopper when no such prior contact can be confirmed.

3. The computer-implemented method of claim 1, further comprising:
maintaining an electronic database that stores data associated with interactions between said retailer and its customers over said at least two different retail sales channels.

4. The computer-implemented method of claim 1, further comprising:
generating a customized communication to at least one employee of said retailer during said shopper's visit to said second retail sales channel based on the retrieved at least part of the recorded data, such that the at least one employee can assist said shopper.

5. The computer-implemented method of claim 1, wherein said shopper is detected and identified as visiting the retail sales channel of an Internet web portal or mobile application based on one or more of:
an identifier or network address of said shopper's computing device;
login credentials or personal information supplied by said shopper to the Internet web portal or mobile application; or
a cookie or token stored on said shopper's computing device.

6. The computer-implemented method of claim 1, wherein said shopper is detected and identified as visiting the retail sales channel of a physical store, stand, or kiosk based on a detection of or communication with said shopper's mobile device.

7. The computer-implemented method of claim 1, further comprising:
recording additional data associated with said shopper's activities while visiting said second retail sales channel.

8. The computer-implemented method of claim 7, wherein a customized communication is generated based further on said recorded additional data.

9. The computer-implemented method of claim 1, further comprising:
transmitting said customized communication to said shopper's mobile device.

10. The computer-implemented method of claim 1, further comprising:
displaying a customized communication to said shopper on said intelligent fixture.

11. The computer-implemented method of claim 1, further comprising:
communicating with said shopper's mobile device with an in-store beacon system.

* * * * *

UNITED STATES PATENT AND TRADEMARK OFFICE
CERTIFICATE OF CORRECTION

PATENT NO. : 10,977,701 B2
APPLICATION NO. : 14/580373
DATED : April 13, 2021
INVENTOR(S) : William G. Crutchfield, Jr.

Page 1 of 1

It is certified that error appears in the above-identified patent and that said Letters Patent is hereby corrected as shown below:

In the Claims

In Column 70, Line 42, in Claim 9, delete "said customized communication" and insert --a customized communication--

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*